(12) United States Patent
Talley

(10) Patent No.: US 9,742,753 B2
(45) Date of Patent: Aug. 22, 2017

(54) MULTIMEDIA PERSONAL HISTORICAL INFORMATION SYSTEM AND METHOD

(71) Applicant: HJ Holdings, LLC, Houston, TX (US)

(72) Inventor: Patrick L. Talley, Houston, TX (US)

(73) Assignee: HJ Holdings LLC, Houston, TX (US)

( * ) Notice: Subject to any disclaimer, the term of this patent is extended or adjusted under 35 U.S.C. 154(b) by 379 days.

(21) Appl. No.: 14/331,209

(22) Filed: Jul. 14, 2014

(65) Prior Publication Data

US 2015/0020170 A1 Jan. 15, 2015

Related U.S. Application Data

(60) Provisional application No. 61/845,746, filed on Jul. 12, 2013, provisional application No. 61/921,403, filed on Dec. 27, 2013.

(51) Int. Cl.
G06F 15/18 (2006.01)
H04L 29/06 (2006.01)
(Continued)

(52) U.S. Cl.
CPC ............ *H04L 63/08* (2013.01); *G06F 3/0481* (2013.01); *H04L 67/1097* (2013.01); *H04L 67/306* (2013.01)

(58) Field of Classification Search
USPC .......................................................... 706/14
See application file for complete search history.

(56) References Cited

U.S. PATENT DOCUMENTS 8,103,947 B2 1/2012 Lunt et al.

8,589,440 B1* 11/2013 Chaganti ................. H04L 29/06
707/783
(Continued)

FOREIGN PATENT DOCUMENTS

KR 1020010057329 7/2001

OTHER PUBLICATIONS

CoMobile: Collaborative Learning with Mobile Devices Duc Phuong Nguyen; M. Guggisberg; H. Burkhart Sixth IEEE International Conference on Advanced Learning Technologies (ICALT'06) Year: 2006 pp. 355-359, DOI: 10.1109/ICALT.2006.1652443 IEEE Conference Publications.*

(Continued)

*Primary Examiner* — Michael B Holmes
(74) *Attorney, Agent, or Firm* — Gordon G. Waggett, P.C.

(57) ABSTRACT

Disclosed is a mobile and web-based personal history capture-store-retrieval process and system intended to be used by individuals or groups (including companies and educational institutions) to record personal historical information in multimedia file format from any source, such as the individual's smartphone, tablet, or personal computer. The system will assist individuals in the recording and storage and retrieval of the individual's (or group's) personal histories. The system employs an artificial intelligence engine to analyze user content (e.g., information, data, metadata, and historical content associated with such user) and design prompts to the user to input additional information. The system also provides a method for creating an e-book from the content, either by a single user or by collaboration among multiple users. Disclosed also is a computer implemented method and system and related computer program product for capturing, storing, retrieving and disseminating personal and/or group legacy and history information.

36 Claims, 48 Drawing Sheets

(51) Int. Cl.
  *G06F 3/0481* (2013.01)
  *H04L 29/08* (2006.01)

(56) References Cited

U.S. PATENT DOCUMENTS

| | | | |
|---|---|---|---|
| 8,775,951 B2 | 7/2014 | Halliday et al. | |
| 8,793,579 B2 | 7/2014 | Halliday et al. | |
| 8,856,638 B2* | 10/2014 | Evans | G06F 17/30017 715/206 |
| 9,183,560 B2* | 11/2015 | Abelow | G06Q 10/067 |
| 9,477,380 B2* | 10/2016 | Amijee | G06F 3/0482 |
| 9,569,467 B1* | 2/2017 | Schechter | G06F 17/30283 |
| 9,600,919 B1* | 3/2017 | Imbruce | G06F 17/30905 |
| 9,619,128 B2* | 4/2017 | Edge | G06F 3/04847 |
| 2007/0261071 A1 | 11/2007 | Lunt et al. | |
| 2009/0238538 A1 | 9/2009 | Fink | |
| 2011/0137817 A1* | 6/2011 | Roumeliotis | G06Q 50/265 705/325 |
| 2012/0210200 A1 | 8/2012 | Berger et al. | |
| 2012/0324373 A1 | 12/2012 | Halliday et al. | |
| 2013/0073387 A1* | 3/2013 | Heath | G06Q 50/01 705/14.53 |

OTHER PUBLICATIONS

Developing a mobile instant messaging system for problem-based learning activity Yu-Lin Jeng; Tien-Chi Huang; Chia-Chen Chen; Yu Shu; Yong-Ming Huang 2015 International Conference on Interactive Collaborative Learning (ICL) Year: 2015 pp. 313-316, DOI: 10.1109/ICL.2015.7318044 IEEE Conference Publications.*

STOP: Socio-Temporal Opportunistic Patching of short range mobile malware John Tang; Hyoungshick Kim; Cecilia Mascolo; Mirco Musolesi 2012 IEEE International Symposium on a World of Wireless, Mobile and Multimedia Networks (WoWMoM) Year: 2012 pp. 1-9, DOI: 10.1109/WoWMoM.2012.6263711 IEEE Conference Publications.*

An Automatic Video Reinforcing System Based on Popularity Rating of Scenes and Level of Detail Controlling Yuanyuan Wang; Yukiko Kawai; Kazutoshi Sumiya; Yoshiharu Ishikawa 2015 IEEE International Symposium on Multimedia (ISM) Year: 2015 pp. 529-534, DOI: 10.1109/ISM.2015.31 IEEE Conference Publications.*

Mombo Labs, Inc.—U.S. Patent & Trademark Office TSDR file history for the Steller trademark application Serial No. 86223199 (last accessed Sep. 1, 2014) indicating date of first use of Mar. 14, 2014. 25 pages.

Apple Inc.—iTunes App Store Preview Screenshots for Steller App. (Version 2.0.0 update of Aug. 21, 2014) (by Mombo Labs LLC) Accessed Sep. 1, 2014. 3 pages.

Mombo Labs, Inc.—screenshot from Support page for Steller App, http://steller.co/support. 3 pages. Last accessed Sep. 1, 2014.

Apple Inc.—iTunes App Store Preview Screenshots for Steller App. (Version 4.2.1 update of Feb. 19, 2016) (by Mombo Labs LLC) including Version history to Version 1.1 introducing the Stellar App on Feb. 22, 2014. Accessed Feb. 28, 2016. 9 pages.

Apple Inc.—iTunes App Store Screenshots for StoryCorps App Revision History (Version 4.2.1 update of Feb. 19, 2016) (by StoryCorps, Inc.) Accessed Feb. 28, 2016. 4 pages.

Apple Inc.—iTunes App Store Screenshots for StoryCorps App Customer Reviews (by StoryCorps, Inc.) Accessed Feb. 28, 2016. 28 pages.

Apple Inc.—iTunes App Store Screenshots for StoryCorps App (by StoryCorps, Inc.) Accessed Feb. 28, 2016. 1 page.

StoryCorps, Inc.—Screenshot from https://storycorps.me. Printed Feb. 28, 2016. 7 pages.

PCT Counterpart Application No. PCT/US2014/046571—Notification of Search Report (2 pages); International Search Report (3 pages); Written Opinion of the International Searching Authority (9 pages)—(Oct. 21, 2014) 14 total pages.

Roots Magic, Inc.—"Personal Historian"—Personal and Family History Writing Software, archived screenshots dated Dec. 30, 2011 and Jan. 3, 2012 from www.rootsmagic.com (via web.archive.org) 8 pages.

Eagle Trading Co.—WriteMyMemoirs.com webpage screenshots (15 pages)(internet archives of May 7, 2012).

Eagle Trading Co.—WriteMyMemoirs.com video tour screenshots, 2012. 24 pages (from internet archives dated Dec. 22, 2014).

Flipagram, Inc.—Press page screenshot, http://flipagram.com/press. Accessed Jul. 9, 2015. 3 pages.

Flipagram, Inc.—Screenshot http://flipagram.tumblr.com/, "Narrate your Flipagrams in your own voice!" Blog dated Feb. 8, 2014. Accessed Jul. 9, 2015. 1 page.

Apple Inc.—iTunes App Store Screenshots for Flipagram App. (by Flipagram, Inc.) Accessed Jul. 28, 2015. 8 pages.

Apple Inc.—iTunes Preview page for Memoir App. (by Veri, Inc.) , version 2.3 released Apr. 11, 2015. Accessed Jan. 28, 2015. 8 pages.

Apple Inc.—Memoir App. (by Veri, Inc.) iTunes App Store Screenshots for Memoir App. accessed Jul. 28, 2015. 9 pages.

* cited by examiner

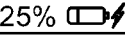

Log-in and Register

Settings

Settings

Home

Create a Text Story

Create Audio Story

Create Audio Story
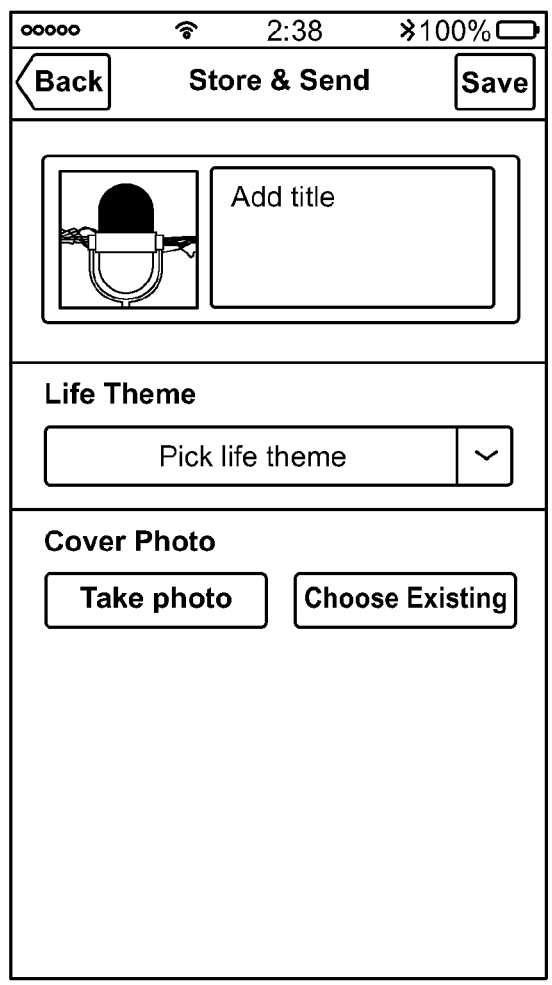
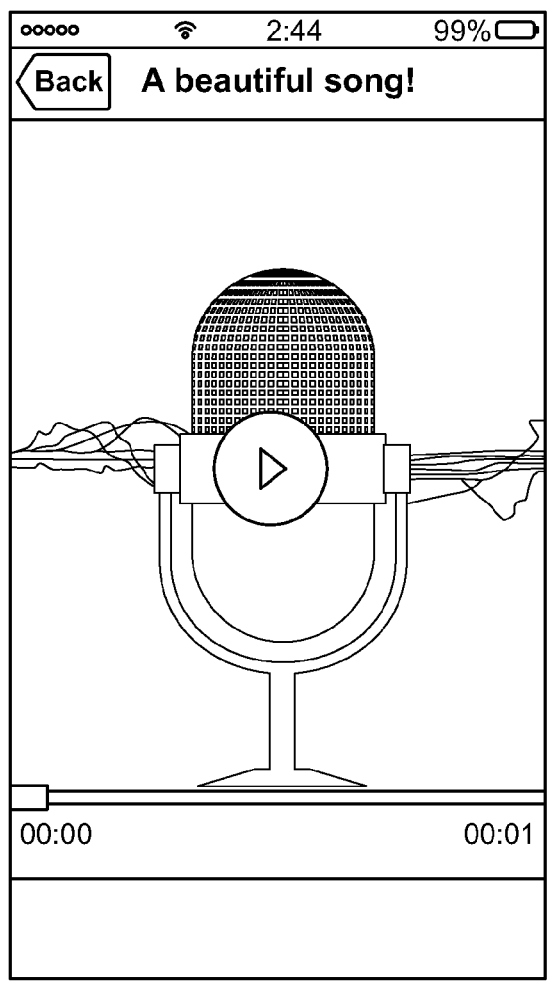
FIG. 45
FIG. 46

Create Video Story

Create Video Story

Answering 10 for 10

Create a Photo Story

Create a Photo Story

Create a Photo Story

Create a Photo Story

Create a Photo Story

Create a Photo Story

Create a Photo Story
Random Question Prompt
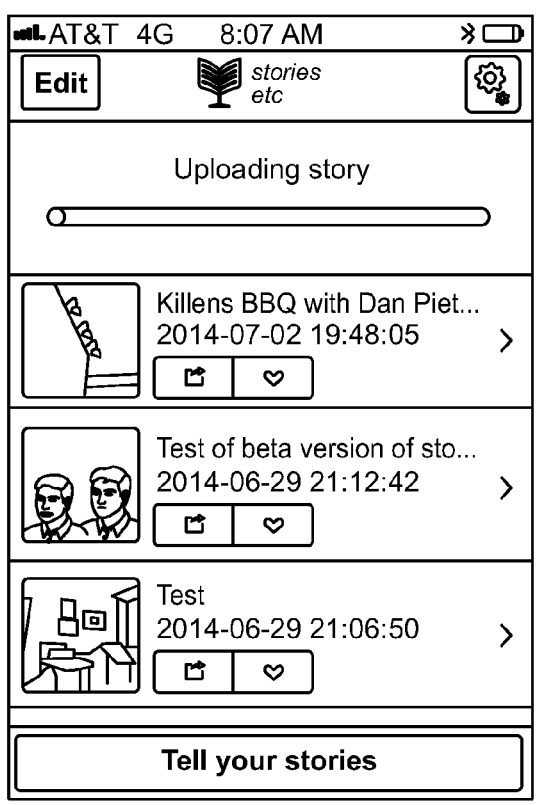
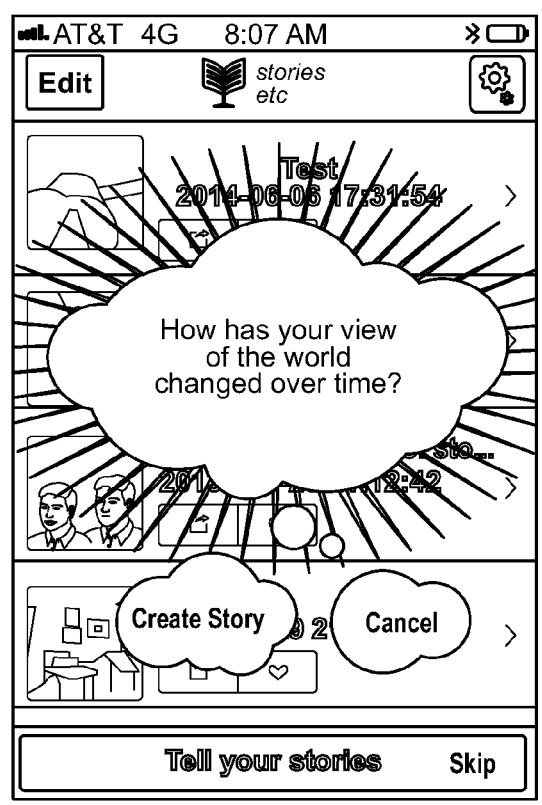
FIG. 66
FIG. 67

MULTIMEDIA PERSONAL HISTORICAL INFORMATION SYSTEM AND METHOD

CROSS-REFERENCE TO RELATED APPLICATIONS

This application claims the benefit of the filing date, and priority to, U.S. Provisional Patent Application Ser. No. 61/845,746 filed Jul. 12, 2013, and U.S. Provisional Patent Application Ser. No. 61/921,403 filed Dec. 27, 2013, both of which are incorporated herein by reference in their entireties.

COPYRIGHT AUTHORIZATION

©2013-2014 HJ Holdings, LLC. A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND OF THE INVENTION

Field of the Invention

The present disclosure relates generally to the field of electronic recording of and storage of and retrieval of an individual's or group's personal historical information.

With the advent of social media, many people entrust committing their life story to their current user profile on a social media site. However, social media presents limitations on how effectively one can create lasting recordings of his/her own personal history. For example, social media presents too many obstacles to protecting one's personal information from being shared with unintended recipients. With the advent of smartphones, tablets, GoPro® and Google Glass™, etc. recording devices and other digital content recording devices, the increase of the creation of personal digital content is moving at a pace never before experienced. Furthermore, it is difficult to create and store meaningful oral and audio/video histories of one's life using existing social medial sites. Still further, many people choose not to engage in the use of social media for varying reasons, including privacy. As such, there remains a need to provide a user-friendly mechanism for recording one's personal history, such as anecdotal personal stories, family histories, audio-visual information, photographic images (new and/or digitized vintage), one's Life Story, e.g., collections of media—audio & video recordings (new and/or digitized vintage), pictures and writings—that combine to tell the story of one's life and family history, and for sharing such personal story with an intended audience, e.g., one's family members so that the stories are preserved for future generations.

Likewise, there exists a need for groups, businesses, companies, corporations, non-profit organizations, educational institutions and other organizations to record their respective "histories", e.g., "corporate memory" in a facilitated manner.

Additionally, individuals are often inhibited or shy about recording themselves on their own; thus, there exists a need for a personal history taking system that facilitates and prompts the user for information thereby providing a system that is easy to use. This system also has utility for stimulating memory recall, etc.

Furthermore, there remains a need for providing an individual or group/company/organization/educational institution with the ability to record and store personal or group histories on a mobile and web- and cloud-based storage system, and then to permit retrieval of the histories for review by a permitted audience.

BRIEF SUMMARY OF INVENTION

The present invention addresses these needs by providing a mobile and web-based personal history capture-store-retrieval process/system intended to be used by individuals or groups (including companies and educational institutions) to record personal historical information in multi-media (audio, video, still photography, etc.) file format from any source, such as the individual's smartphone, tablet, laptop, personal computer or other multimedia computer devices. The system will assist (e.g., via prompts) individuals in the recording and storage and retrieval of the individual's (or groups') personal histories. The system can also provide automatic audio-to-text transcription (where the source of audio is from audio recordings or video recordings).

In another embodiment, also disclosed is a multimedia method of capturing, storing, retrieving and disseminating personal and/or group legacy and history information. This method provides a secure technology-based platform for access by authorized users; provides a mobile and web-based or mobile-app-based graphical user interface, whereby an individual and/or group user(s), via multiple media (video, audio, photographic, text or combinations thereof), can record, store, retrieve and/or disseminate content in an ad hoc or prompted manner; provides server or cloud-based storage to store such content; provides multiple options to such user(s) for retrieving such content, including, email, direct download, conversion to e-book reader platform, DVD, or mailed storage media; provides audio/video-to-text transcription of such recorded content; and provides the user with the option to authorize dissemination of such content to authorized designees via email, direct download, DVD, e-book reader platforms, mailed storage media and/or social media platforms.

In one embodiment of the method, the user content comprises information, data, metadata, and historical content associated with such user. In another embodiment, the user is prompted by the platform to provide content. The platform can prompt the user with one or more questions or a series of questions, images, photos, videos, music tracks, narrative files, and/or audio tracks pertaining to topics of interest to prompt the user to provide answers to such questions to form part of the content. In one embodiment, the method further comprises the step of providing an artificial intelligence engine to analyze the specific user content. The artificial intelligence engine can analyze specific user content, data and metadata, to design prompts to the user. The method may further comprise the step of prompting the user with such designed prompts.

In another embodiment, there is disclosed a multimedia system for capturing, storing, retrieving and disseminating personal and/or group legacy and history information comprising: a secure technology-based platform for access by authorized users; a mobile and web-based or mobile-app-based graphical user interface, whereby an individual and/or group user(s), via multiple media (video, audio, photographic, text or combinations thereof), can record, store, retrieve and/or disseminate content in an ad hoc or prompted manner; server or cloud-based storage to store such content; interfaces to provide multiple options to such user(s) for retrieving such content, including, email, direct download, DVD, e-book reader platform, or mailed storage media; audio/video-to-text transcription engine for converting audio in such recorded content to text (or some form of mixed media being text and other media); sharing protocol to provide the user with the option to authorize dissemination of such content to authorized designees via email, direct download, DVD, mailed storage media and/or social media platforms; and an artificial intelligence engine for analyzing the specific user content.

Additionally, there is disclosed computer implemented multimedia method of capturing, storing, retrieving and disseminating personal and/or group legacy and history information comprising the steps of: providing a secure computer technology-based software platform for access by one or more authorized users over a computer network using one or more multimedia computer devices, the one or more computer devices capable of recording content in audio, video, photographic, and/or text format and/or combinations thereof; providing a graphical user interface for use by the one or more users with the one or more multimedia computer devices for interfacing with the platform over the network; interfacing the one or more computer devices with the platform; providing the ability within the platform for the one or more users to record new multimedia content from the one or more computer devices; providing the ability within the platform for the one or more users to access previously existing multimedia content available to the one or more computer devices; providing the ability for the one or more users to review the new or previously existing content from the one or more computer devices from within the platform; providing the ability for the one or more users to edit the new or previously existing content from the one or more computer devices from within the platform; providing the ability for the one or more users to delete the new or previously existing content from the one or more computer devices; providing a platform server or platform cloud-based storage system for use by the one or more users for storing the recorded content within the platform; storing the recorded content onto the platform server or platform cloud-based storage; and providing the one or more users with the ability to retrieve the stored content from the platform server or platform cloud-based storage. The platform can prompt the user with a series of questions, images, audio files, music files, and/or videos stored within the system pertaining to topics of interest to prompt the user to provide answers to such questions to form part of the content. The prompt can be generated automatically by the system or the system can provide the user with the ability to request the prompt. The questions, images, audio files, music files and/or videos may be randomly selected by the platform or submitted by other platform users. The method may further comprise the step of providing an artificial intelligence engine to analyze the specific user content, wherein the artificial intelligence engine analyzes specific user content, user data and user metadata, to design prompts to the user, the method further comprising the step of prompting the user with such designed prompts. The users may retrieve the stored content from the platform storage via direct interface with the platform, by email, by direct download, by DVD, by e-book reader, or by mailed storage media. The method can further comprise the step of providing the user with the ability to authorize dissemination of the stored recorded content to authorized designees via email, direct download, DVD, e-book reader, mailed storage media and/or social media platforms. The method can also provide audio/video-to-text transcription of such recorded content. The multimedia computer devices are selected from the group consisting of smartphones, tablets, personal computers, and laptops. The graphical user interface is mobile-based and web-based or mobile-app-based.

In another embodiment, the method further comprises the step of providing an e-book creation system; and an e-book creation system interface to permit the one or more users to import recorded content from the platform into the e-book creation system for use in creating an e-book. This method may include the further steps of: sharing the e-book creation system with other permitted users; permitting the other permitted users to collaborate in creating a jointly created e-book using recorded content from within the platform or recorded content that the other permitted users import into the platform; editing the jointly created e-book as desired; saving the jointly created e-book; and sharing the jointly created e-book.

Also disclosed is computer implemented multimedia system for capturing, storing, retrieving and disseminating personal and/or group legacy and history information comprising: a processor and memory; a secure computer technology-based software platform embodied on one or more computer-readable medium for access by authorized users using one or more multimedia computer devices, the one or more computer devices capable of recording content in audio, video, photographic, and/or text format and/or combinations thereof; a graphical user interface embodied on one or more computer-readable medium for use by the one or more users with the one or more multimedia computer devices for interfacing with the platform over the network; an interface embodied on the one or more computer-readable medium for the one or more users to record new multimedia content from the one or more computer devices; an interface embodied on the one or more computer-readable medium for the one or more users to access previously existing multimedia content available to the one or more computer devices; an interface embodied on the one or more computer-readable medium for the one or more users to review the new or previously existing content from the one or more computer devices from within the platform; an interface embodied on the one or more computer-readable medium for the one or more users to edit the new or previously existing content from the one or more computer devices from within the platform; an interface embodied on the one or more computer-readable medium for the one or more users to delete the new or previously existing content from the one or more computer devices; a platform server or platform cloud-based storage system embodied on one or more computer-readable medium for use by the one or more users for storing the recorded content within the platform; an interface embodied on the one or more computer-readable medium providing the one or more users with the ability to retrieve the stored content from the platform server or platform cloud-based storage. The system may further comprise an artificial intelligence engine embodied on the one or more computer-readable medium for analyzing the specific user content within the platform.

In yet another embodiment there is disclosed a computer program product embodied on one or more non-transitory computer-readable media, said computer program product adapted to be executed to implement a method of capturing, storing, retrieving and disseminating personal and/or group legacy and history information, said method comprising providing a computer-implemented system, wherein the computer implemented system comprises distinct software modules on the one or more computer-readable medium, and wherein the distinct software modules comprise: a log-in process module for accessing a secure computer technology-based software platform for by one or more authorized users over a computer network using one or more multimedia computer devices, the one or more computer devices capable of recording content in audio, video, photographic, and/or text format and/or combinations thereof; an auto question prompt module for prompting the user with a series of questions, images, audio files, music files, and/or videos stored within the system pertaining to topics of interest to prompt the user to provide answers to such questions to form part of the content; a tell a story process module for permitting the one or more users to access previously existing multimedia content available to the one or more computer devices, to review the new or previously existing content from the one or more computer devices from within the platform, to edit the new or previously existing content from the one or more computer devices from within the platform, and/or to delete the new or previously existing content from the one or more computer devices; a save a story process module for permitting the one or more users to store the recorded content on the one or more computer devices, a platform server or a platform cloud-based storage system; and a share a story process module for permitting the one or more users to share the recorded content with others. The computer program product may further comprise an e-book process module for permitting the one or more users to import recorded content into an e-book creation system. The e-book process module may further permit one or more users to collaborate in creating a jointly created e-book using recorded content from within the platform or recorded content that the other permitted users import into the platform; editing the jointly created e-book as desired; saving the jointly created e-book; and sharing the jointly created e-book.

BRIEF SUMMARY OF DRAWINGS

FIG. 26 depicts exemplary screen shots from, e.g., a smart phone device, displaying login screen content when the mobile and web-based personal history capture-store-retrieval system is used according to embodiments of the present disclosure.

FIG. 27 shows an exemplary User Registration screen shot used according to embodiments of the present disclosure.

FIG. 45 illustrates an exemplary screen shot depicting the Store & Send Process for the Create an Audio Story process of the app according to embodiments of the present disclosure where the user can add a title, life theme and/or cover photo to the story.

FIG. 46 illustrates an exemplary screen shot depicting the Title creation screen for the Create an Audio Story process of the app according to embodiments of the present disclosure.

FIG. 66 illustrates a screen shot for the Photo Story page according to embodiments of the present disclosure where the user can access Store & Send functionality for the Photo Story and upload the final Photo Story to, e.g., cloud-based storage.

FIG. 67 illustrates an exemplary screen shot depicting the Random Question Prompt screen according to embodiments of the present disclosure where the user is presented with a random question to serve as a prompt for creating a story.

DETAILED DESCRIPTION OF THE INVENTION

Figure 1:
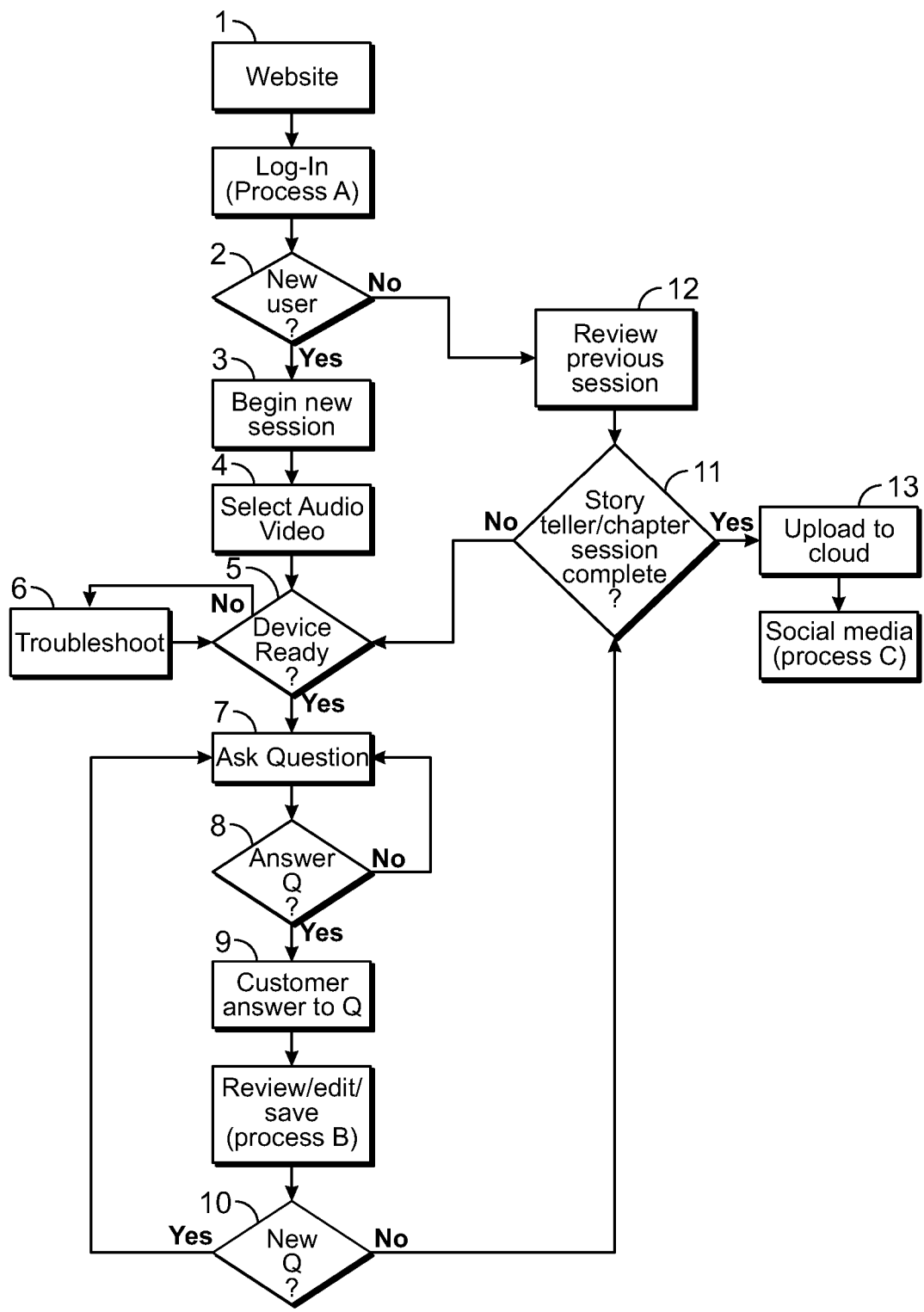
FIG. 1 depicts an exemplary flow chart illustrating the audio/visual interface for a customer or user accessing the mobile and web-based personal history capture-store-retrieval system according to an embodiment of the present disclosure.

One embodiment of the present disclosure provides a mobile and web-based personal history capture-store-retrieval process intended to be used by individuals or groups (including companies and educational institutions) to record personal historical information in multi-media (audio, video, still photography, etc.) file format from any source, such as the individual's smartphone, tablet, or personal computer. The system will assist individuals in the recording and storage and retrieval of the individual's (or group's) personal histories.

10 For 10 Personal History Capture-Record-Store-Retrieve: Users using any type of mobile or web-based device, e.g., mobile, smartphone, tablet device or even computer may access and begin the process by logging into the mobile or web-based system and begin the process of recording stories (text, audio, photo, video or combination of all the aforementioned). Should the user wish to have the system prompt memories, there is a preloaded set of queries about individual personal history. Users or customers using any type of phone device, e.g., landline, mobile, smartphone, tablet device or even computer may also access and begin the process by dialing the system phone number (or logging into the mobile and web-based login) and receiving a greeting from the automated operator. After the greeting the operator will ask the customer/user to enter, using the phone or tablet or computer's keypad device, the user's unique identifier number. Once the user has entered his or her unique identifier number into the system, the software routing will begin asking the user a series of questions. One of the initial questions will be date of birth (or at least the year of the user's birth) and the automated system (software) will ask the user to enter his/her date of birth using the phone's keypad device, by voice recognition or by keypad entry. Once the user's date of birth has been entered and only after the unique identifier user identifier number has been entered, the system will begin asking the user a series of questions about the user's personal history.

This segment of questions may be referred to as "10 for 10 Audio" for marketing purposes and it will feature 10 questions per chapter (as an example) about the user's life based upon 10 chapters or periods of the user's life (100 questions presented in audio or text form). Additionally, prompts other than audio or text may be offered to the user. These prompts will be in the form of images (photos), videos or music and other audio. The user can answer the questions using the recording system supplied by the device and the system will record the audio, video or text answer, save it to a cloud device (or other storage device) for storage and later retrieval by the user or the customer's assignees. At any point in the question answer process the user will have the option of skipping any particular question they do not want to answer or respond to by pushing the skip button on the system.

In another embodiment, the user can also answer the questions into the phone (taking as much time as needed) or other microphone device and the system software will record the audio answer, save it to a cloud device (or other storage device) for storage and later retrieval by the user or the user's assignees. At any point in the question answer process the user will have the option of skipping any particular question they do not want to answer or respond to by, e.g., pushing a number on the phone's keypad.

The user will have the option, by using the keypad entry device or otherwise using the system, of deleting any message or stories left on the system with the ability to re-record a new story or a new reply to the question or prompted question. The user will have the ability to answer none, some or all of the questions in the 10 for 10 category. In one embodiment, when the user calls back (or logs back into the system) and enters his/her unique identifier number, the system will route the user to the next question in the series. Once the user is done and has completed all of the 10 for 10 questions, he/she will be given a chance to push a button on his/her phone keypad or device keypad and go back to listen to the prior recorded answers to their questions they have left and delete and or re-record any of them. The user can also add their own "custom created" chapters or categories.

Once a user has recorded a story or stories, they are saved (as a draft) to the device and uploaded to the system supplied cloud once internet or cellular connectivity has occurred for storage for later retrieval. A story saved on the mobile device, system supplied cloud storage or desktop (pc, mac other) will be available for consuming (listening, reading, watching) by the user on the device itself. Once the user has completed the recording session, the user can indicate completion of the 10 for 10 question/answer session by touching a key on their phone's (or other) keypad device. The system will then file away on the cloud storage system all of the user's recorded 10 for 10 question-and-answer session. The recordings will be securely maintained on the cloud storage system for later retrieval.

10 For 10 Video: Similarly, users using any type of mobile phone, smartphone (commonly referred to as an app), tablet device (commonly referred to as an app) and or computer may access and begin the process of recording personal histories via video format. From any type of mobile phone, smartphone and or computer equipped with a video camera, the user can go to the system web site and receive a greeting from the automated instructions. The automated instructions will ask the user to enter, using the phone or tablet or computer's keypad device, the user's unique identifier number. Once the user has entered the unique identifier number into the system the website's software routing will begin asking the user a series of questions (initially this will be done via text and evolve to audio and or video instructions). One of the initial questions will be date of birth (or at least the year of the user's birth) and the automated system (software) will ask the user to enter his/her date of birth using the phone or tablet or computer's keypad device. Once the user's date of birth has been entered and only after the unique user identifier number has been entered, the web based system will begin asking the user a series of questions about their personal history.

This segment of questions is called "10 for 10 Video" for marketing purposes and it will be 10 questions about the user's life based upon 10 chapters or periods of the user's life. The user will answer the questions into the phone or tablet or computer (taking as much time as needed) using the video application provided by the system web based software will record the answer, save it to a cloud device (or other storage device) for storage and later retrieval by the user or the users' assignees. At any point in the question answer process, the user will have the option of pushing a number on the keypad or tablet or computer to skip any particular question he/she does not want to answer or respond to. The user will have the option by using the phone or tablet or computer keypad device, of deleting any video message left on the system with the ability to re-record a new reply to the question. The user will have the ability to answer none, some or all of the questions in the 10 for 10 video category. When the user logs back onto the website, and enters his/her unique identifier number, the system will route the user to the next question in the series. Once the user is finished and has completed all of the 10 for 10 Video questions, the user will be given a chance to push a button on his/her phone or tablet or computer keypad and go back to listen to the recorded video answers to the questions left on the system and delete and or re-record any of them. Once the user has completed the recording session, the user can indicate completion of the 10 for 10 Video question answer session by touching a key on their phone or tablet or computer keypad device. The system will then file away on the cloud storage system all of the user's recorded 10 for 10 Video question-and-answer session. The recordings will be kept on the cloud storage system for later retrieval.

For example, referring now to FIG. 1, there is depicted an exemplary flow chart illustrating the audio/visual interface for a user/customer accessing the system through the internet for, e.g., the "10 for 10" features. As illustrated in this exemplary embodiment, a website is provided with the features of the present invention. This website (or site) serves as the interface with the user.

Figure 2:
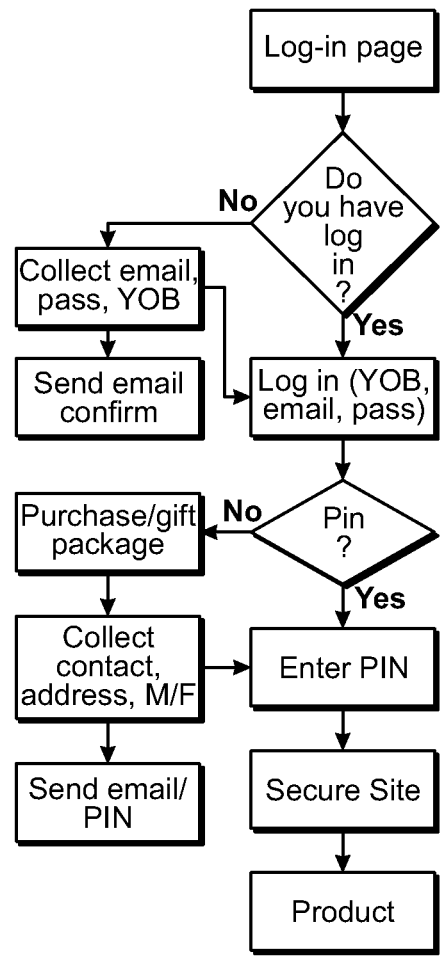
FIG. 2 depicts a flow chart illustrating an exemplary login protocol for a user accessing the mobile and web-based personal history capture-store-retrieval system according to an embodiment of the present disclosure.

As noted above, the user will first log-in to the site ("Process A") using web log in protocol known in the art. For example, referring to FIG. 2, the website provides a log-in page. The user is asked by the system whether the user is an existing user or a new user. If the user is new, then the user creates an account, including designation of log-in and user information such as, email address, password, and year of birth (YOB). The system then automatically sends the new user a confirmation email confirming creation of the account. The new user (with log-in information now established) or the returning user with existing log-in information, then logs into the system. The system then prompts the user for a PIN (personal identification number). If the new user has not yet established a PIN (or purchased any of the available offerings for direct use or for sending as a gift), then the user establishes a PIN, including collection of contact address, and the gender of the user (and a confirmation email is sent). The new user (or returning user) then enters his or her PIN and enters his/her secure site to begin or continue using the product(s) offered.

Referring again to FIG. 1, once the user has completed the log-in process, the user is queried by the system whether he/she is a new user or an existing user. For a new user, a new session is initiated and the new user selects whether to enter audio data or video data. Once this selection is made, the user's audio device (microphone) or video device is verified as being ready and properly interfaced with the system, and if not, a troubleshooting interface is initiated. If the device is ready, the system provides a first question for the user to answer. The user can decide whether or not to answer that question or to be prompted with another question. The user then provides an answer to the question. The user then has the option to review, edit and then save the answer ("Process B") as illustrated in, and discussed below with respect to, FIG. 3. The user is then prompted by the system whether he or she would like another question, and if so, the Q&A session continues as above. If the user does not desire to answer any further question at that time, the user then indicates whether this story telling chapter or session is complete. If the session is not complete, then the user is directed back to the Q&A segments and can then again opt to record in either audio or video formats. If the user indicates that the story telling chapter or session is complete, then the system uploads the recorded session to a cloud-based or other media storage system. Once the information is stored by the system, the user can then have access to it through the system for use in Social Media ("Process C") as illustrated in, and discussed below with respect to, FIG. 4. Similarly, if an existing user logs into the system, the user will be taken by the system to the previous session where the user will be queried by the system whether or not the story telling chapter/session is complete, and the user can then resume prior sessions, edit new sessions, or initiate new sessions.

Figure 3:
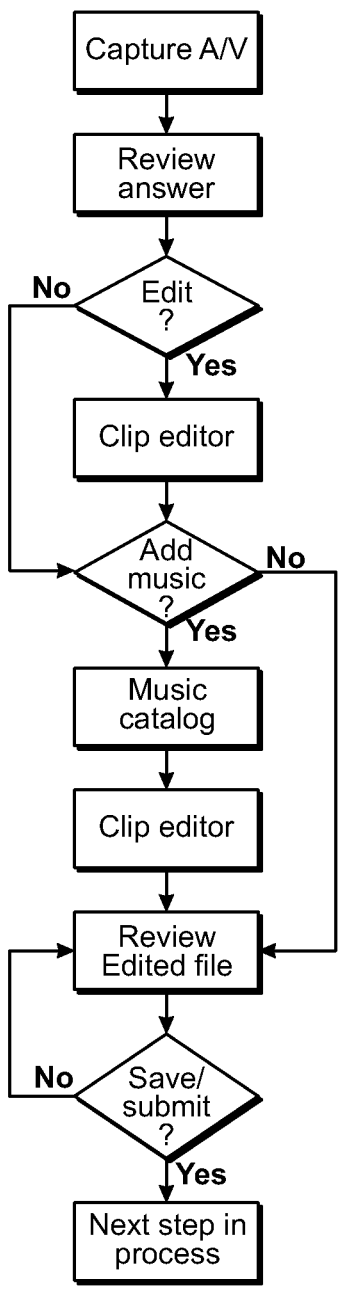
FIG. 3 depicts a flow chart illustrating an exemplary editing feature for use by a user accessing the mobile and web-based personal history capture-store-retrieval system according to an embodiment of the present disclosure.

Referring now to FIG. 3, the user has the option to review, edit and then save the answers to the various questions ("Process B"). Process B involves the system capturing the audio or video data and providing the user with the ability to replay the audio or video segments as part of the review of the responses or answers provided to the questions. The system provides editing software to permit the user to edit the audio or video clips. Once the user is satisfied with the captured audio and video responses (as either originally recorded, or as edited or re-recorded), the system provides the user with the ability to add music to the background. The music can be selected from a music catalogue, and again, a clip editing software is provided to permit the user to edit the music clips. The user again has the ability to review the edited material (answers/responses) and then save and submit the saved responses to the system. As will be understood, the editing process may be accessed and utilized after recording a specific answer to a question, or the user can record answers to numerous questions, and then go back and use the editing tools provided.

Figure 4:
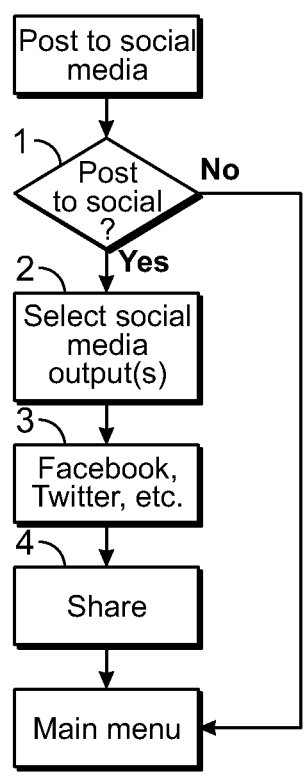
FIG. 4 depicts a flow chart illustrating an exemplary protocol for a user accessing the mobile and web-based personal history capture-store-retrieval system to post content to various Social Media services according to an embodiment of the present disclosure.

Referring now to FIG. 4, once the user's responses have been stored by the system, e.g., in cloud-based storage, the user can then have access to the responses for use in Social Media ("Process C"). For example, the system will provide a prompt to the user asking whether the user desires to post the content to social media. If no, then the user is returned to the system main menu. If the user desires to post the content to social media, the user is prompted by the system to select the desired social media output(s), such as, for example, Facebook®, Twitter®, etc., and the user then elects to "share" the content.

500 Questions This feature will be hosted on the system's website and offered as an app for smart phones (or other similar devices). The 500 Questions feature will allow the user the opportunity to record additional audio and or video to existing or new questions. The system's offering in this option will be a well-thought-out series of 500 questions broken up over a series of categories such as politics, grade school years, high school years, college and work experiences, childrearing, and world events, social changes, sports, etc. in the user's lifetime. These categories will initially be broken out into 20 questions over 25 different topics. As the system develops, these questions will change as will the number of categories. The system will record the audio or video in the same manner as mentioned above in the 10 for 10 sections. A feature of the 500 Questions segment of the system's web and app based approach is that an automated guided question session will be supplied. Additionally, just as in the above "10 For 10" section the user will have edit/skip/delete capabilities.

Figure 5:
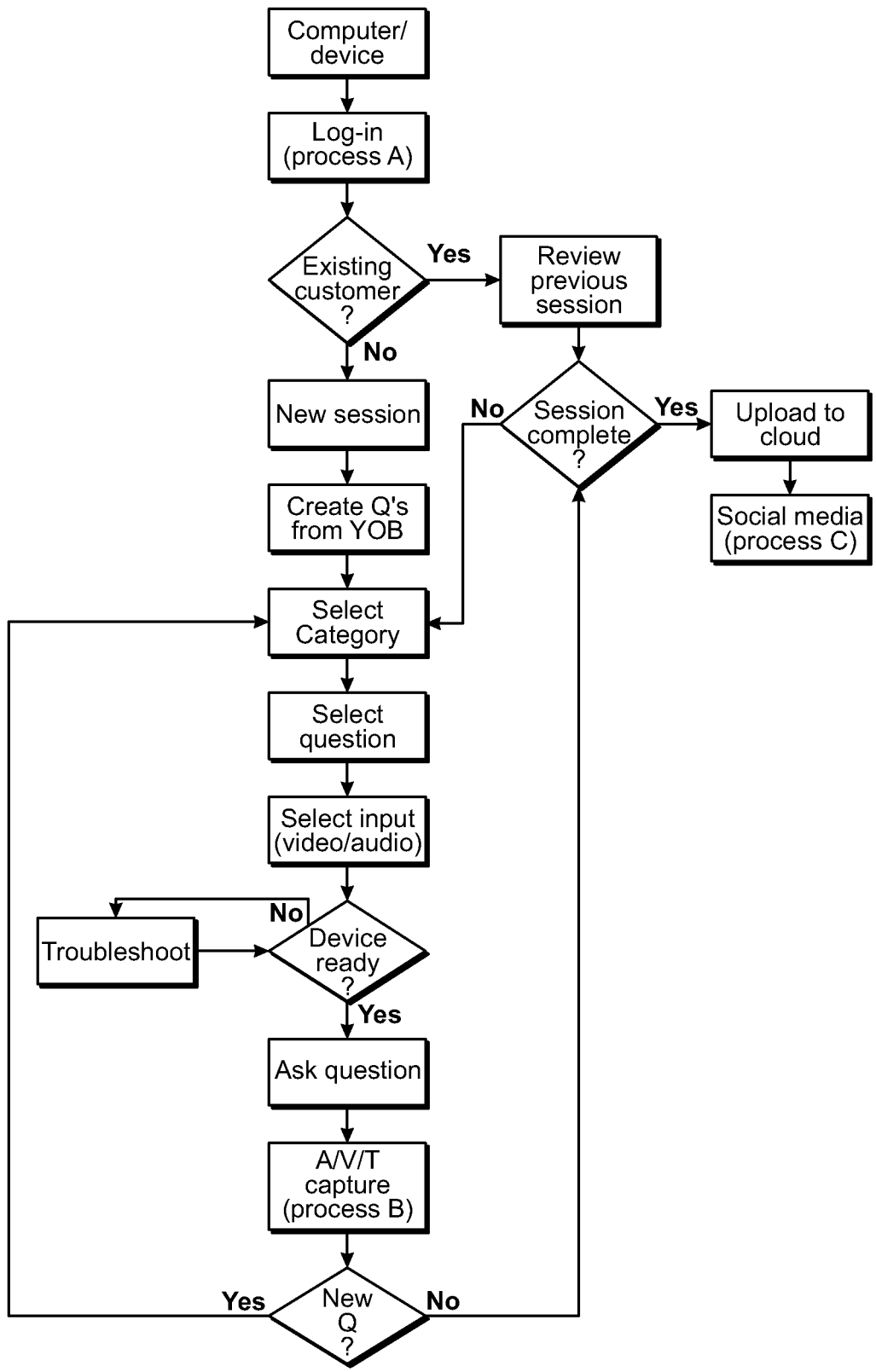
FIG. 5 depicts an exemplary flow chart illustrating features of the mobile and web-based personal history capture-store-retrieval system according to an embodiment of the present disclosure.

Referring now to FIG. 5, there is illustrated an exemplary flow chart for the 500 Questions feature. Much like with FIG. 1, the user accesses the log-in process (Process A, e.g., FIG. 2) from the user's computer or other internet access device. The user logs in and the system queries whether or not the user is an existing customer/user for this feature. If the user is new to this feature, a new session will be created and the system will generate a series of questions based on the user's year of birth. In one embodiment, the system will generate a number of categories of questions for the user to select from. The user then selects the question, selects the response input, e.g., audio, video, and the system them takes the user through the steps for recording, editing (FIG. 3), etc. as described above. The user can then seek another question to answer, or complete the session. The completed session can be uploaded to the storage system, e.g., cloud-based storage, and the user can then access the same for purposes of sharing on Social Media.

Figure 6:
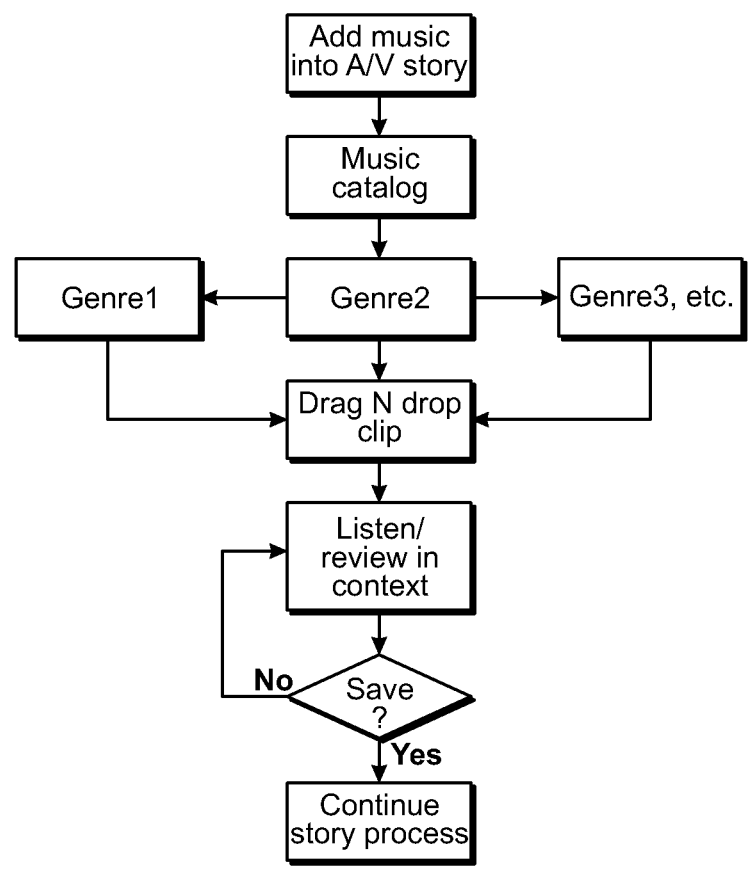
FIG. 6 depicts a flow chart illustrating an exemplary music editing feature for use by a user accessing the mobile and web-based personal history capture-store-retrieval system according to an embodiment of the present disclosure.

Referring now to FIG. 6 (and FIG. 23), in one embodiment of the editing capabilities of the system, and as noted above in connection with FIG. 3, the user may add music into the user's A/V story that is saved on the system. For example, when the user desires to edit a stored or active session, the user is provided access to a music catalogue with a multitude of music genres. A drag and drop music clip functionality is provided to permit the user to drag and drop a music clip into the A/V material. The user is then provided with the ability to listen to and review the music clips in the context of the user's recorded story. The user can save or continue to review and edit until satisfied with the result. The user can then continue on with the system and record additional stories.

Additional Recordings of Personal History Capture-Record-Store-Retrieve: The additional recordings feature will allow the user the opportunity to record additional audio and or video directly to the system app and or web based system using telephone, smart phone, tablet and/or computer (or the like). This will not be a guided question and answer format but rather ad hoc allowing the user to record whatever personal historical information, anecdotes and or stories as he/she may wish. The user will have an allotted amount of "record time" which will be purchased through the system's web or app based platform. The user will purchase additional increments of time and then use those when and as desired. As the system develops, these questions will change as will the number of categories. During the recording period of any of these ad hoc recordings of personal history, the user may stop and start (pause) and edit (by delete only) similar to the "10 For 10" application mentioned above.

Figure 7:
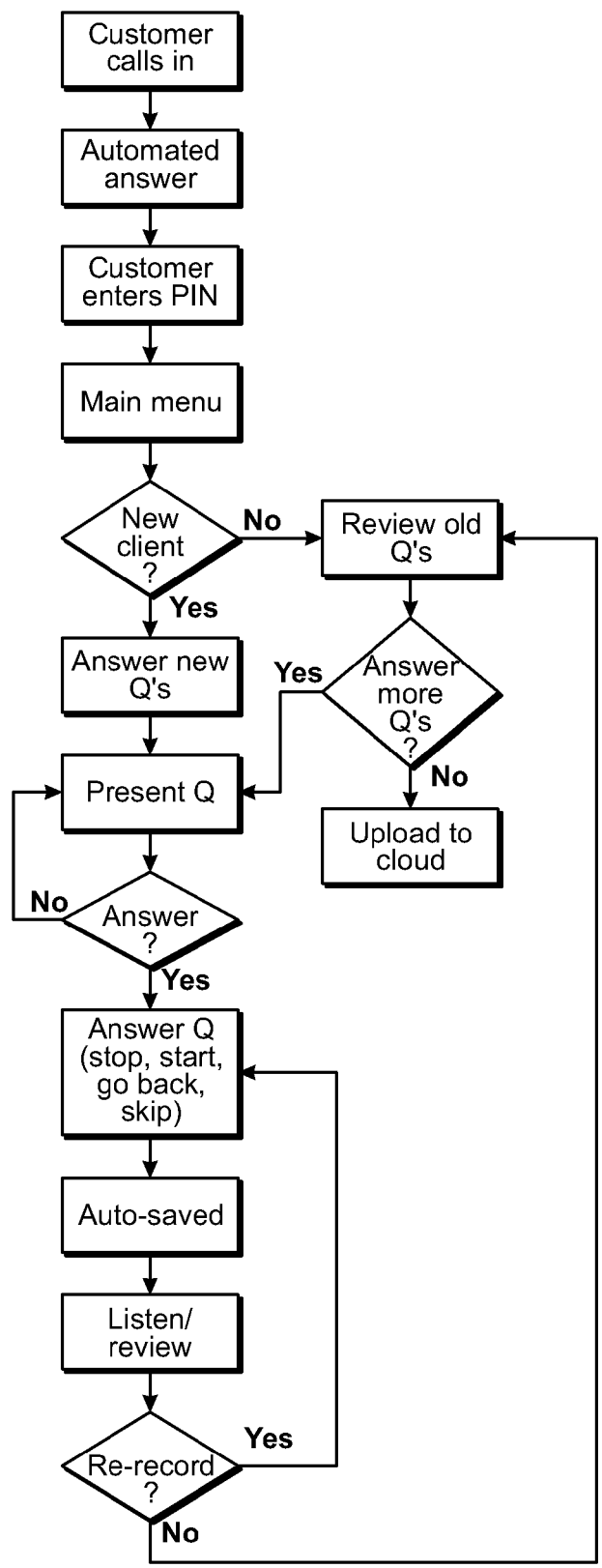
FIG. 7 depicts an exemplary flow chart illustrating additional features available to a customer/user accessing the mobile and web-based personal history capture-store-retrieval system according to an embodiment of the present disclosure.

Referring now to FIG. 7, there is shown an exemplary flow chart illustrating how a user can access the system to record additional audio and or video directly to the system app and or web based system using telephone, smart phone, tablet and/or computer (or the like). Much like as described above, the customer/user calls into a call-center of the system, and an automated answer from the system then directs the user to enter the user's PIN. The user then has access to the system main menu. The user can access the system to answer his or her own new questions. The user is prompted by the system to present the question and is then prompted record an answer to the question as desired. The system provides the user with editing and reviewing capabilities, such as stop, start, go back, and skip. Preferably the answer is autosaved by the system and the user can then listen and review the answer. The system prompts the user to re-record or continue. The user can then review old questions, answer more questions, and when complete, the system will upload the session to the storage system, e.g., cloud-based storage.

MyTimeCapsule: The MyTimeCapsule feature will be offered by the system to users who wish to upload any and all personal content or notable public content that they feel represents a part of their history personal history or family history. This could be something as simple as an audio or video file uploaded from smart phone tablet or computer device (additionally public files such as blog content, news stories, web stories, a link to YouTube® content, etc.) The idea behind the MyTimeCapsule is that the users will be able to upload this content and make it public or keep private or keep private to only a group of the user's own assignees via a unique password which the user controls. Uploads will be stored on the system's cloud storage system for retrieval by the user or the user's assignees on an as desired basis. Users will pay for this storage (MyTimeCapsule) by paying a (one-time) subscription fee for a set amount of storage (recorded and save images, audio, video, etc.) and by paying for upgrades (additional storage capacity).

Figure 8:
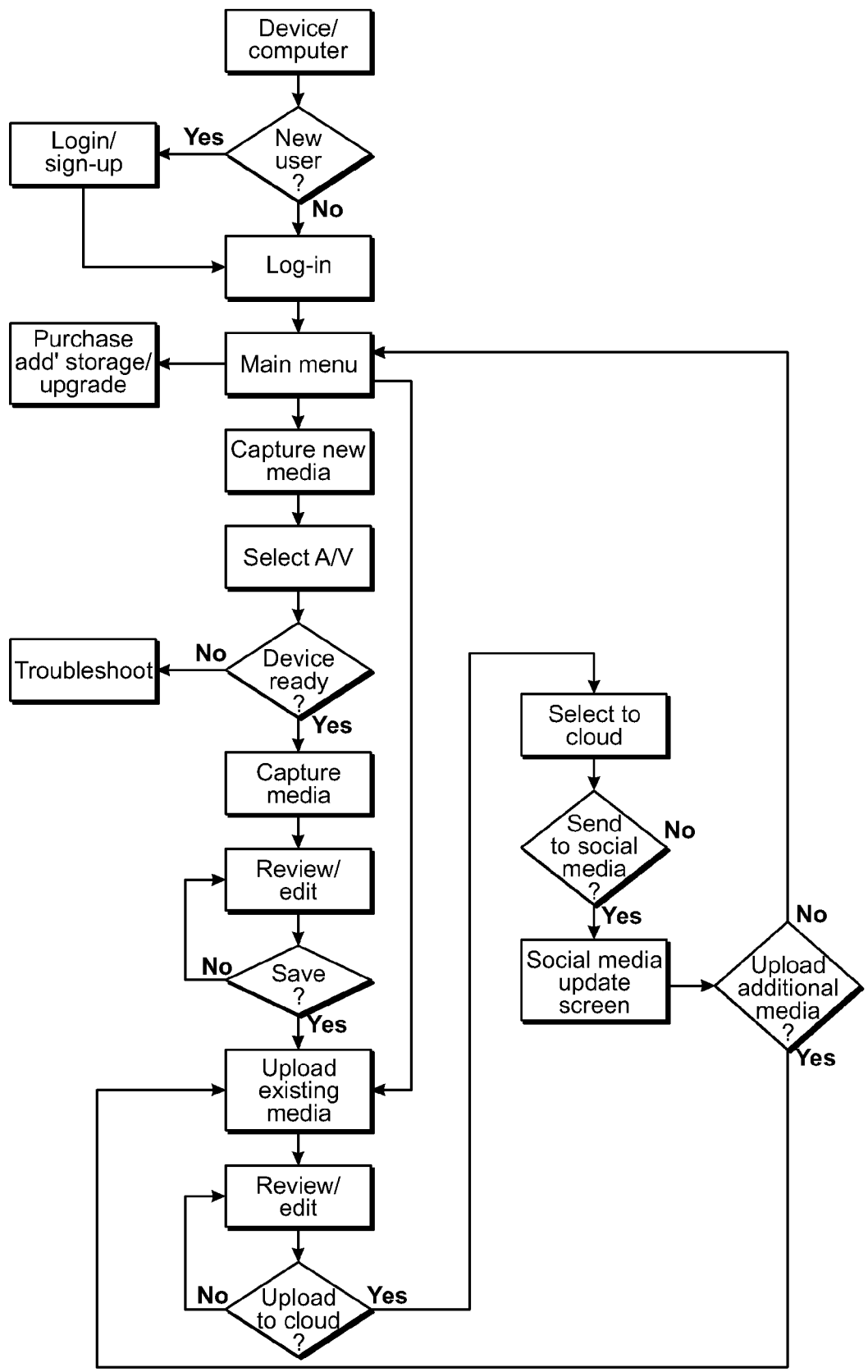
FIG. 8 depicts an exemplary flow chart illustrating additional features available to a user accessing the mobile and web-based personal history capture-store-retrieval system according to an embodiment of the present disclosure.

Referring now to FIG. 8, there is illustrated an exemplary flow chart showing how the user may access the system to add additional content (e.g., to record new content, or to upload existing content) for the MyTimeCapsule segment, and to purchase additional storage. The user can then use the editing features of the system to customize the uploaded or recorded content as described above. The finalized content can then be saved in the storage area (e.g., cloud-based storage) for access by the user, e.g., to share on Social Media, order photo prints through a third-party, copy video to DVD, etc.

Figure 11:
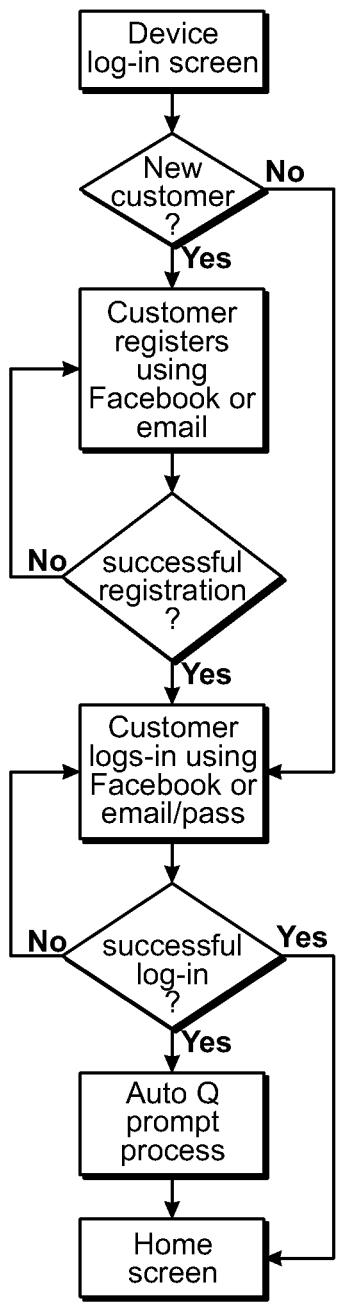
FIG. 11 depicts another exemplary flow chart illustrating an exemplary login protocol (Log-in Process A) for a user accessing the mobile and web-based personal history capture-store-retrieval system and then proceed to an exemplary Auto Question Prompt Process (such as illustrated in FIG. 20) to create and store, e.g., stories according to an embodiment of the present disclosure.

Referring now to FIG. 11 there is shown another exemplary flow chart illustrating an exemplary login protocol (Log-in Process A) for a user accessing the mobile and web-based personal history capture-store-retrieval system and then proceeding to an exemplary Auto Question Prompt Process to create and store, e.g., stories according to an embodiment of the present disclosure. For example, upon successful login, in one embodiment, the user will automatically be prompted by the system to tell a story (via text, audio, video, and/or photo or combinations thereof) based on selected or desired topic prompts provided by or generated by the system.

Figure 12:
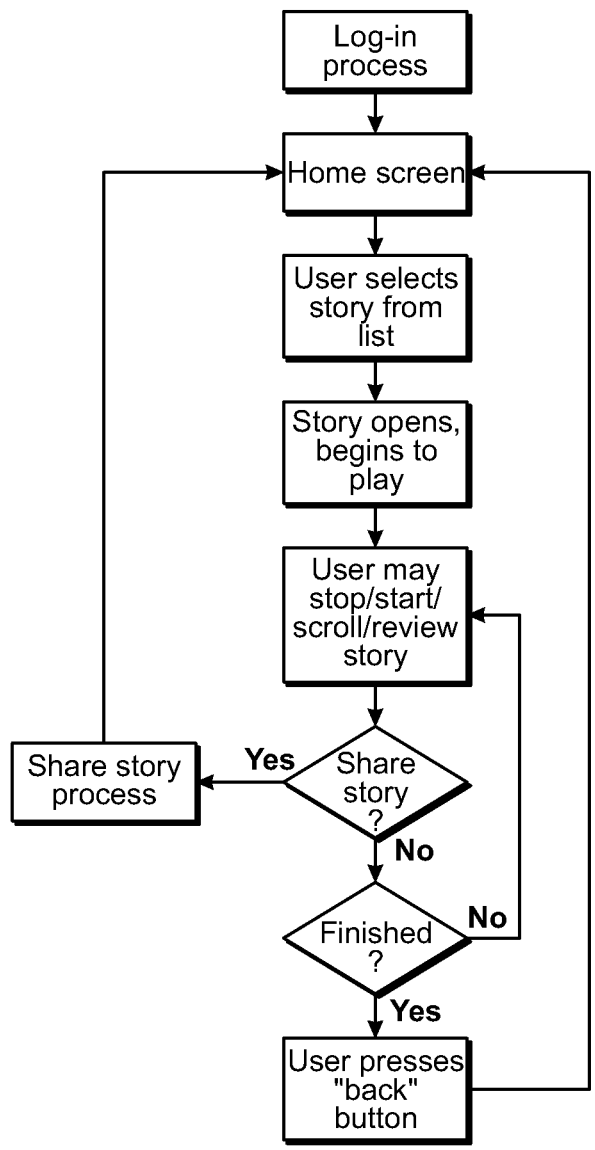
FIG. 12 depicts another exemplary flow chart illustrating and exemplary protocol for a user to log-in and access the mobile and web-based system to review informational content (stories, etc.) stored therein, and to optionally share the saved story via the Share Story Process.

FIG. 12 depicts another exemplary flow chart illustrating and exemplary protocol for a user to log-in and access the mobile and web-based system to review (consume) informational content (stories, etc.) stored therein, and to optionally share the saved story via the system's Share Story Process. In this Consume Story Process embodiment, after the user logs in, the user has the ability from the system home screen to select previously recorded Stories (stored within the system) from a list, and then to review/play the story. When finished reviewing/reading/viewing/listening to a story, the user can opt to share the story or select another story to review, or to go back to the home screen for other available options described herein.

Referring now to FIGS. 13-18 there are disclosed exemplary flow charts illustrating the use of the system's Tell a Story Process of the present disclosure on a user's device (e.g., smartphone, tablet, etc.) where the story is recorded via the user's device by input of text content, audio content, video content, and/or photographic (or other graphics) content, where the photo content may be optionally augmented with text, audio and/or video captioning. The user may record fresh audio content (e.g., via the device's microphone/recording device), fresh video or photo content (via the device's onboard camera) or draw from preexisting content accessible to the device (e.g., photos/videos in photo stream, or on camera roll, etc.). The saved stories content (saved within the system) so created can then be shared from the system if desired, or incorporated or transformed into an e-book or e-book collaboration as described herein.

Figure 13:
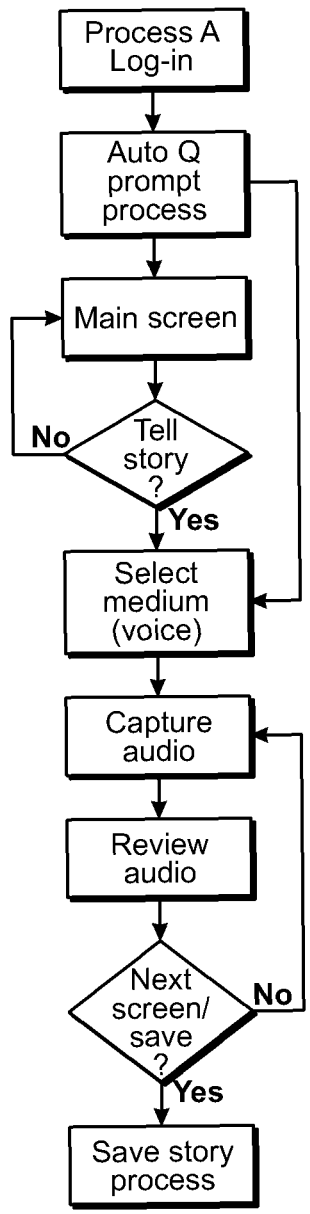
FIG. 13 depicts another exemplary flow chart illustrating an exemplary process for a user to access the system (via the Log-in Process), record, review and store an audio/voice story into the mobile and web-based personal history capture-store-retrieval system (via the Auto Q Prompt Process or Tell a Story Process), and then save the created content via the Save Story Process according to an embodiment of the present disclosure.

Referring to FIG. 13, there is depicted a flow chart illustrating an exemplary Tell and Audio Story process for a user to access the system (via the Log-in Process), use or opt out of the system's auto prompted questions (story prompts), and then record, review, re-record if desired, and ultimately store an audio/voice story into the mobile and web-based personal history capture-store-retrieval system (via the system's Auto Q Prompt Process or Tell a Story Process). The user can then save the created content via the system's Save Story Process according to an embodiment of the present disclosure.

Figure 14:
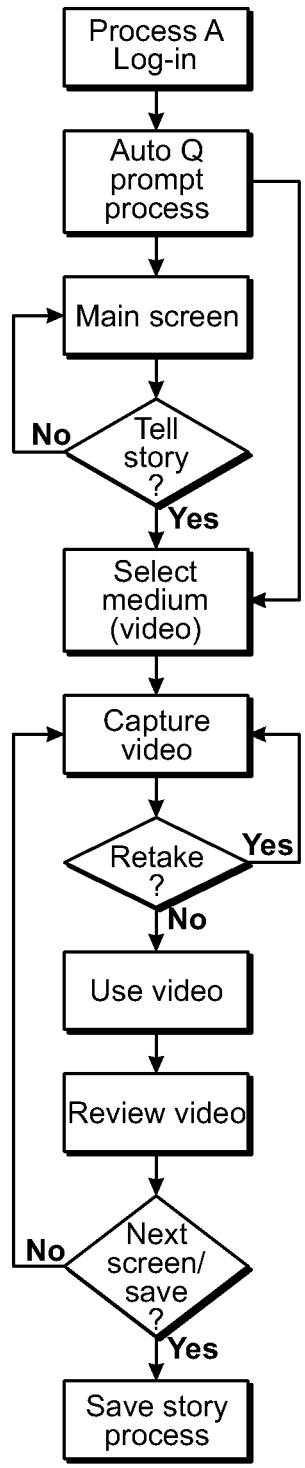
FIG. 14 depicts another exemplary flow chart illustrating an exemplary process for a user to access the system (via the Log-in Process), record, review and store a video story into the mobile and web-based personal history capture-store-retrieval system (via the Auto Q Prompt Process or Tell a Story Process), and then save the created content via the Save Story Process according to an embodiment of the present disclosure.

FIG. 14 depicts another exemplary flow chart illustrating an exemplary Tell a Video Story system process for a user to access the system (via the Log-in Process), record, review (re-record if desired) and store a video story into the mobile and web-based personal history capture-store-retrieval system (via the Auto Q Prompt Process or Tell a Story Process), and then save the created content via the Save Story Process according to an embodiment of the present disclosure.

Figure 15:
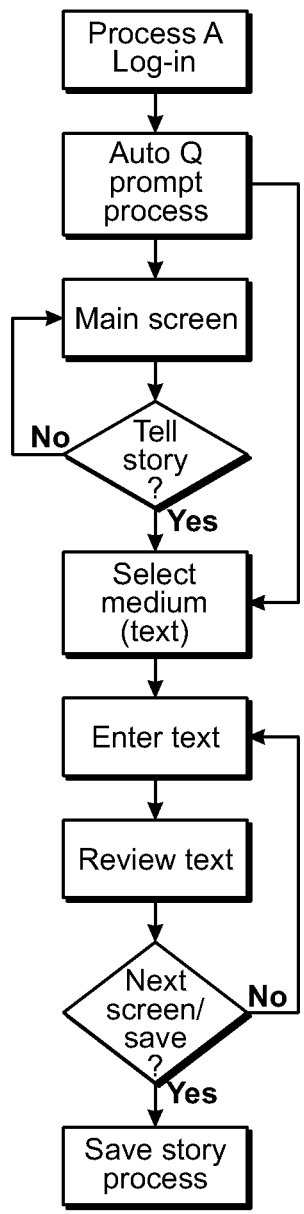
FIG. 15 depicts another exemplary flow chart illustrating an exemplary process for a user to access the system (via the Log-in Process), record, review and store a text story into the mobile and web-based personal history capture-store-retrieval system (via the Auto Q Prompt Process or Tell a Story Process), and then save the created content via the Save Story Process according to an embodiment of the present disclosure.

FIG. 15 depicts another exemplary flow chart illustrating an exemplary Tell a Text Story process for a user to access the system (via the Log-in Process), record, review, edit and store a text story into the mobile and web-based personal history capture-store-retrieval system (via the Auto Q Prompt Process or Tell a Story Process), and then save the created content via the Save Story Process according to an embodiment of the present disclosure.

Figure 16:
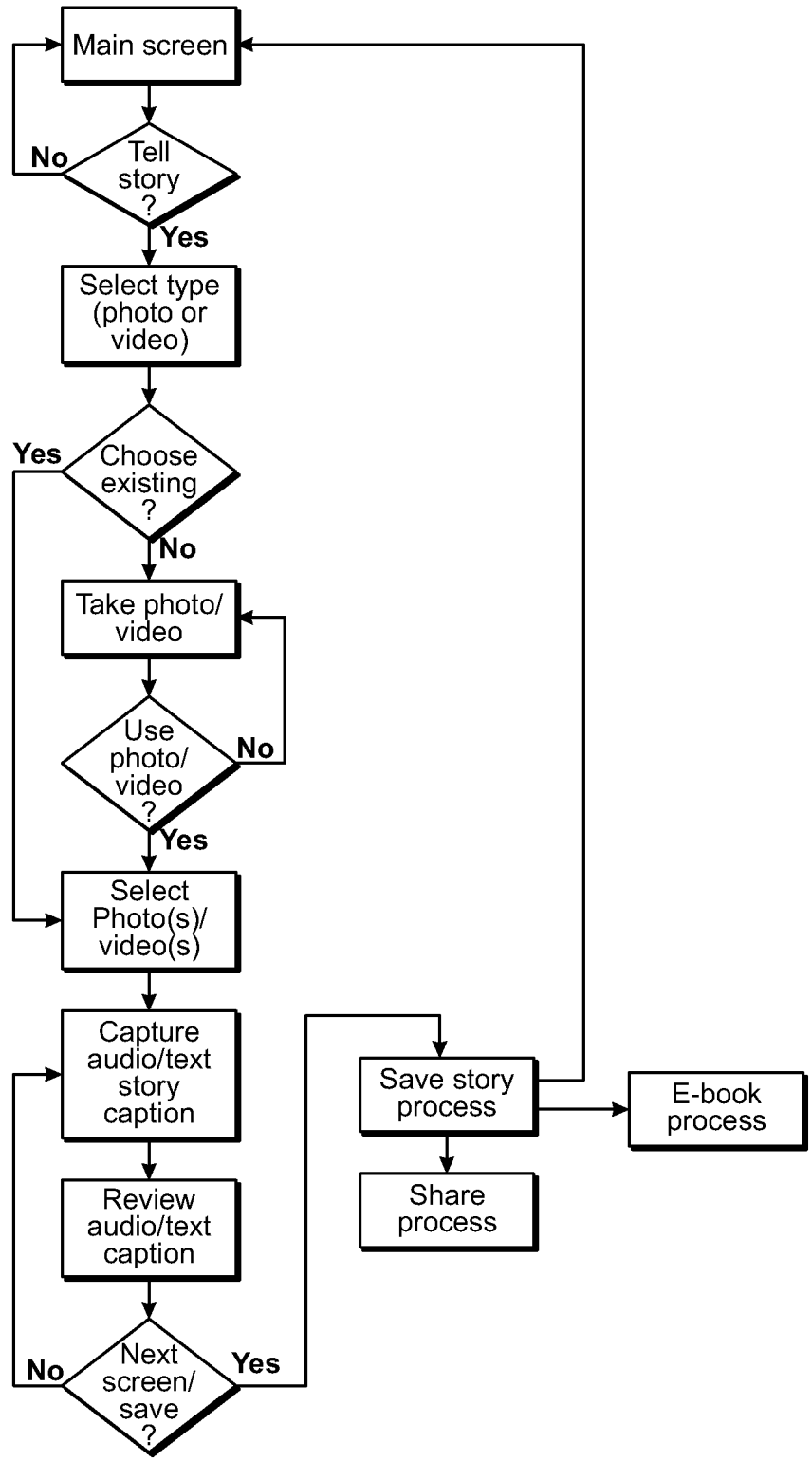
FIG. 16 depicts another exemplary flow chart illustrating an exemplary process for a user to access stored photos or videos and add an audio or text caption to the photos or videos, and then save the created content via the Save Story Process with the added optional functionality of sharing the story (via the Share Story Process) and/or integrating the saved content into an e-book via the E-Book Process according to an embodiment of the present disclosure.
Figure 17:
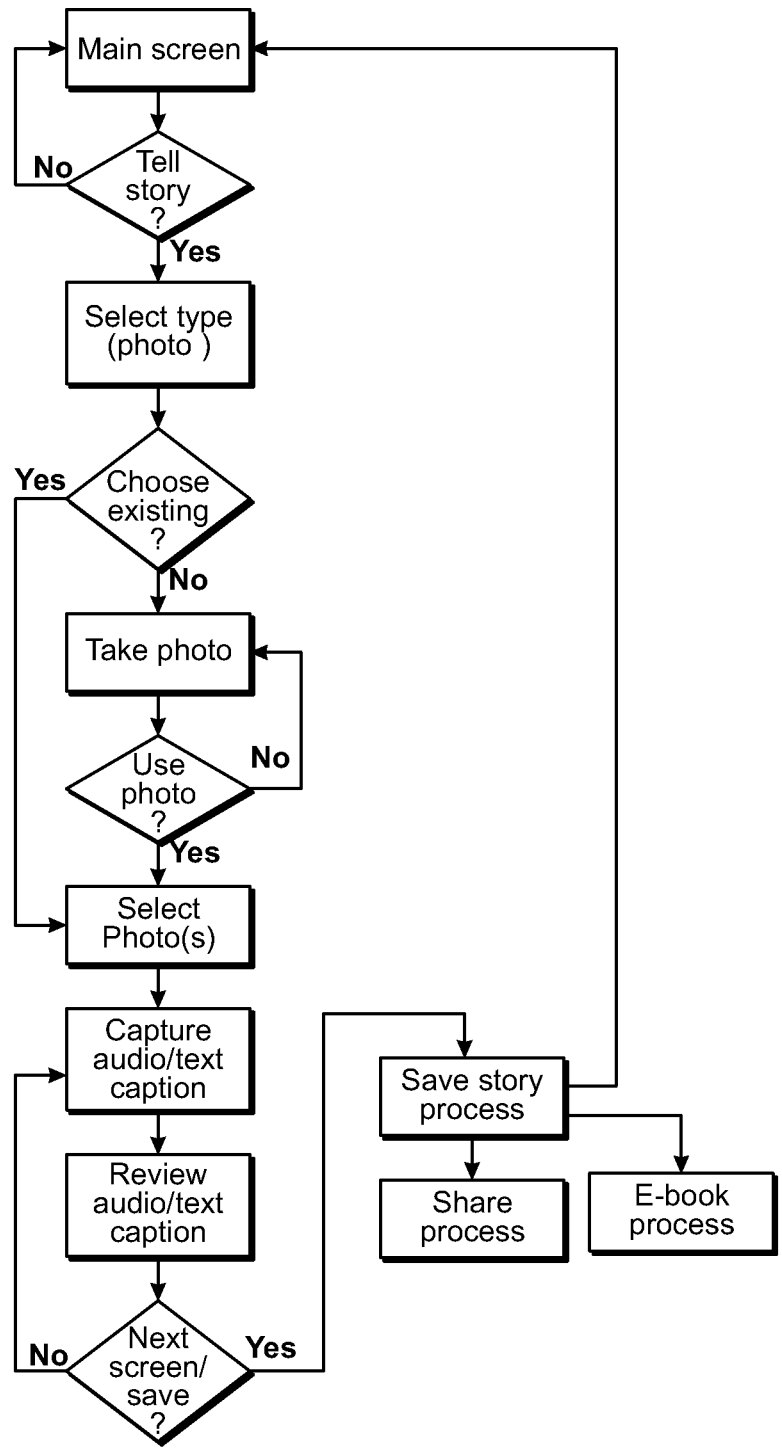
FIG. 17 depicts another exemplary flow chart illustrating an exemplary process for a user to access stored photos and add an audio or text caption to the photos, and then save the created content via the Save Story Process with the added optional functionality of sharing the story (via the Share Story Process) and/or integrating the saved content into an e-book via the E-Book Process according to an embodiment of the present disclosure.
Figure 18:
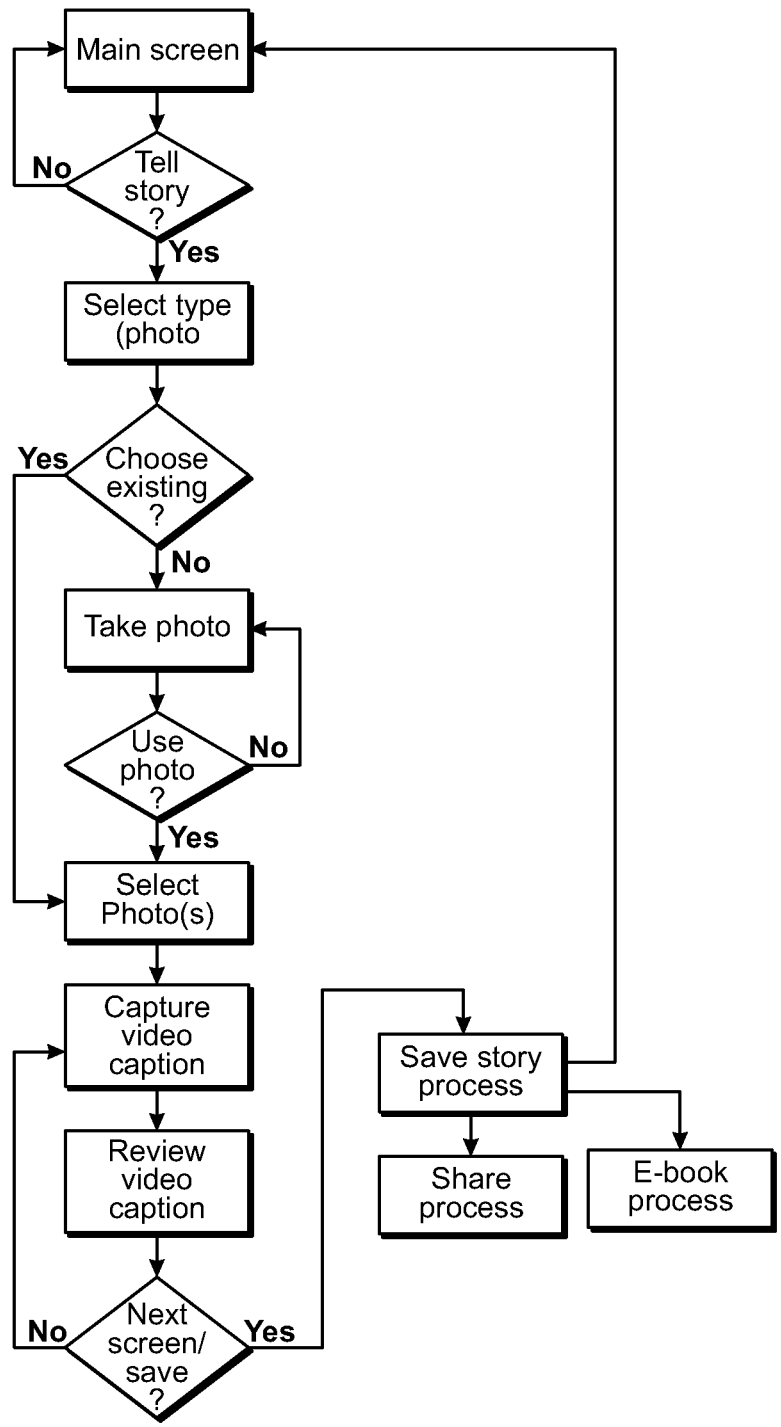
FIG. 18 depicts another exemplary flow chart illustrating an exemplary process for a user to access stored photos and add a video caption to the photos, and then save the created content via the Save Story Process with the added optional functionality of sharing the story (via the Share Story Process) and/or integrating the saved content into an e-book via the E-Book Process according to an embodiment of the present disclosure.

FIGS. 16-18 illustrate various exemplary flow charts for use of the system's Tell a Story process using photos and/or videos that are freshly taken by the user's device or are accessed from storage by the user's device. Audio, video and/or text captioning can be employed to augment the story.

FIG. 16 depicts another exemplary flow chart illustrating an exemplary Tell a Photo or Video Story process (with optional additional text and/or audio captioning) for a user to access stored photos or videos (or take fresh videos or photos from the user's device) and add an audio or text caption to the photos or videos, and then save the created content via the Save Story Process with the added optional functionality of sharing the story (via the Share Story Process) and/or integrating or transforming the saved content into an e-book via the E-Book Process according to an embodiment of the present disclosure.

FIG. 17 depicts another exemplary flow chart illustrating an exemplary process for a user to access stored photos (or take fresh photos from the user's device) and add an audio or text caption to the photos, and then save the created content via the Save Story Process with the added optional functionality of sharing the story (via the Share Story Process) and/or integrating the saved content into an e-book via the E-Book Process according to an embodiment of the present disclosure.

FIG. 18 depicts another exemplary flow chart illustrating an exemplary system process for a user to access stored photos (or take fresh photos from the user's device) and add a video caption to the photos, and then save the created content via the system's Save Story Process with the added optional system functionality of sharing the story (via the Share Story Process) and/or integrating or transforming the saved content into an e-book via the E-Book Process according to an embodiment of the present disclosure.

Figure 19:
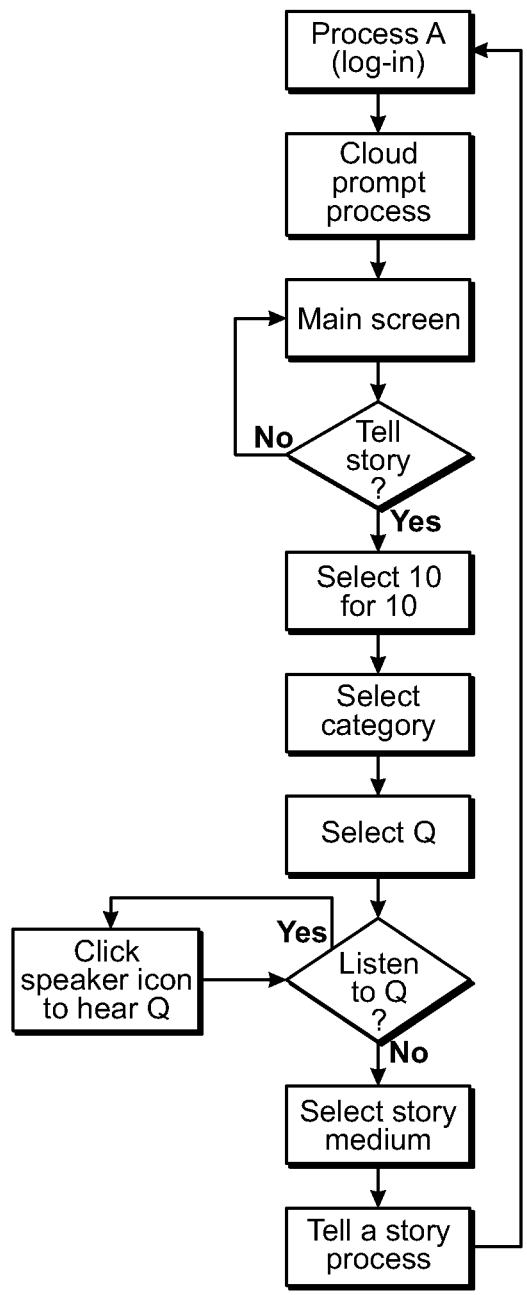
FIG. 19 depicts another exemplary flow chart illustrating the exemplary use of prompted questions (such as the 10 for 10 Process) via the Tell a Story Process according to an embodiment of the present disclosure.

FIG. 19 depicts another exemplary flow chart illustrating the exemplary use of system-prompted questions (such as the 10 for 10 Process described herein) via the system's Cloud or Question Prompt Process and Tell a Story Process according to an embodiment of the present disclosure.

Figure 20:
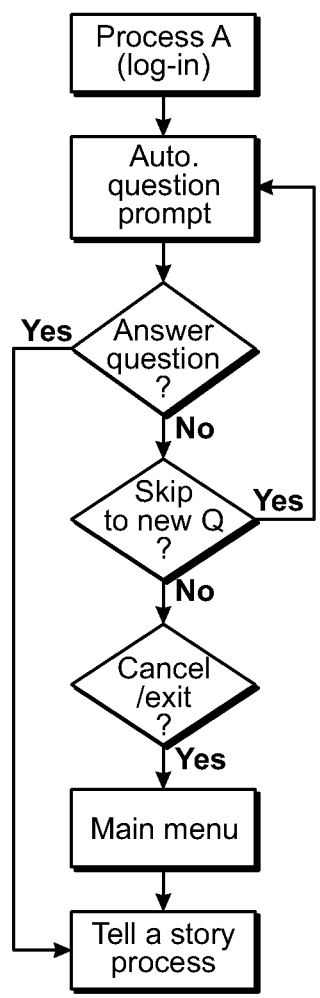
FIG. 20 depicts another exemplary flow chart illustrating the exemplary use of automatically prompted questions via the Auto Prompt Cloud Q (Question) Process and the Tell a Story Process according to an embodiment of the present disclosure.

FIG. 20 depicts another exemplary flow chart illustrating the exemplary use of automatically prompted questions created by the system via the Auto Prompt Cloud Question Process and the Tell a Story Process according to an embodiment of the present disclosure. In the Auto Q Prompt Process referred to as well in other figures, the user logs into the system. Rather than proceeding to the Home Screen to initiate the Tell a Story Process, the system automatically provides a question prompt that the user can read and choose to whether or not to respond to the prompt (i.e., whether or not to create a story from the system's auto prompted question(s)). If the user accepts the question, the user will be directed by the system to the Tell a Story Process splash screen where the user can then proceed to create a story from text, audio, video, photos (or combinations thereof) and to caption the photos as desired and as described herein. The system's auto prompt cloud question can be populated with any number of questions in any number of topic areas. The question prompts can be completely random in nature (e.g., such as the process depicted in FIG. 67), or could be tailored to the user based on the user's preferences or prior interactions with the system (e.g., via the system's artificial intelligence engine). This auto question prompt could be a daily feature, or could also be conditioned based on the user's input (i.e., prompt again in one week, etc.), or be based on the user's level of login activity within the system app. For example, where the user has not logged into or visited the system in a predefined number of days, the system can greet the user, upon the user's next login, with a suggested story topic seeking the user's input. If the user does not desire to answer the system's auto prompt question, the user can choose to be prompted with a different question or exit back to the system main menu/home screen.

Figure 21:
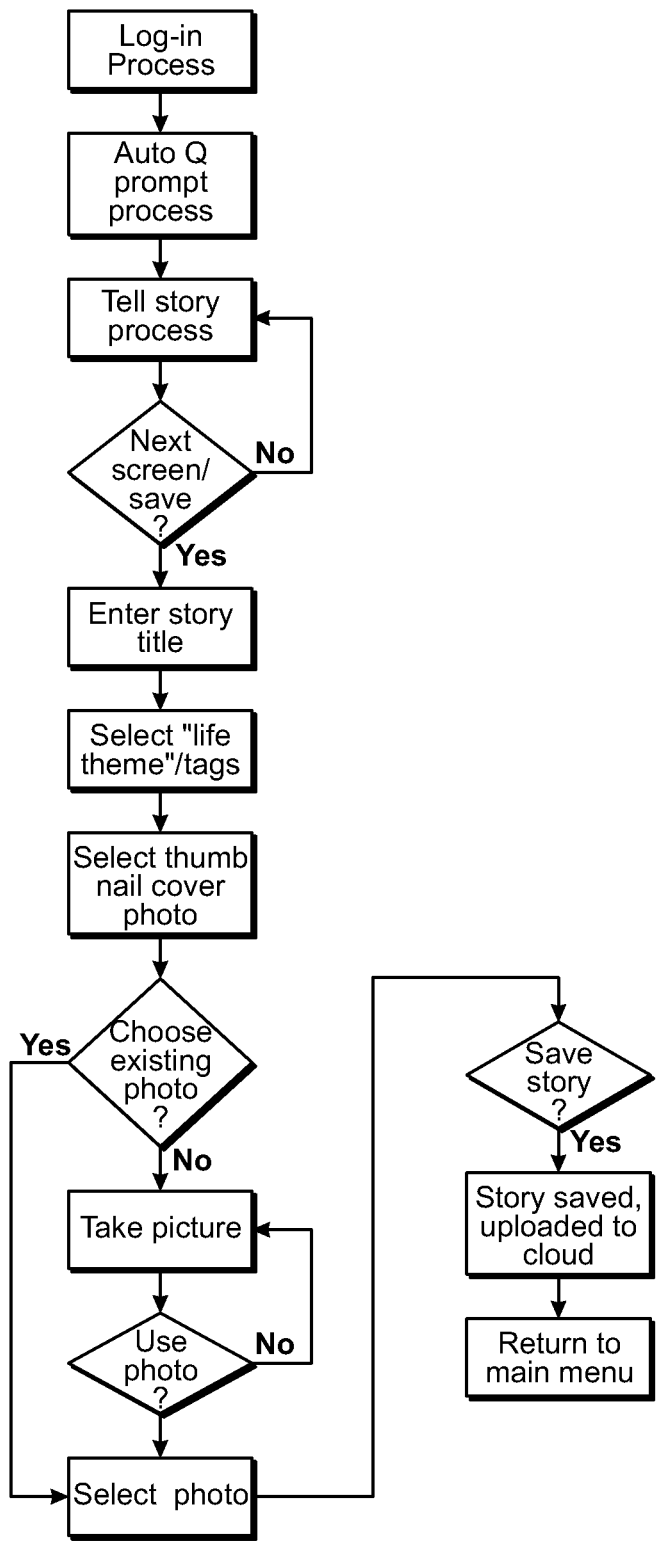
FIG. 21 depicts another exemplary flow chart illustrating an exemplary Save Story Process for saving content created in, e.g., the Tell Story Process, via the mobile and web-based personal history capture-store-retrieval system according to an embodiment of the present disclosure.

FIG. 21 depicts another exemplary flow chart illustrating an exemplary Save Story Process for saving content created in, e.g., the system's Tell Story Process, via the mobile and web-based personal history capture-store-retrieval system according to an embodiment of the present disclosure. The Save Story Process begins after a user has finished creating a Story, or a draft of a story, and desires to save it to the system. As discussed in connection with FIGS. 61-66, the user stores the story, adds a title to the story, files the story in a desired Life Theme or Category (or creates a new Category), adds optional tags or keywords to permit later searching and retrieval, and can include adding a "cover photo" (newly taken or from storage). The user then clicks on the "Save" button and the completed story or draft is then preferably uploaded by the system to cloud storage for later retrieval. The user can then return to the system main menu if desired.

Figure 22:
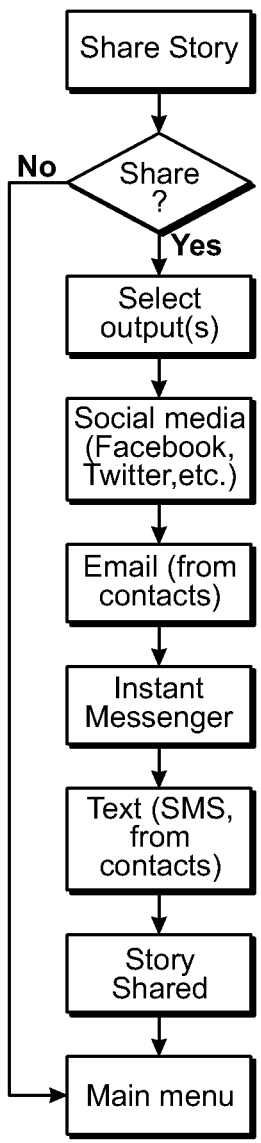
FIG. 22 depicts another exemplary flow chart illustrating an exemplary Share Story Process for sharing content created via the mobile and web-based personal history capture-store-retrieval system according to an embodiment of the present disclosure.

FIG. 22 is similar in nature to FIG. 4 and depicts another example flow chart illustrating a Share Story Process for sharing content created via the mobile and web-based personal history capture-store-retrieval system according to an embodiment of the present disclosure. When the user has a story to share, the user may access the system's Share Story functionality and be directed to a Share Story (Process C) screen. There, the user can select the various outputs to use in the Share Story Process, such as, Social Media, Email, Instant Messenger, Text/SMS messaging from the user's device, and then finish the process. The system will then share the story per the user's requirements. Once the story is shared via the system, the user can return to the system main menu or select another story to share.

Figure 23:
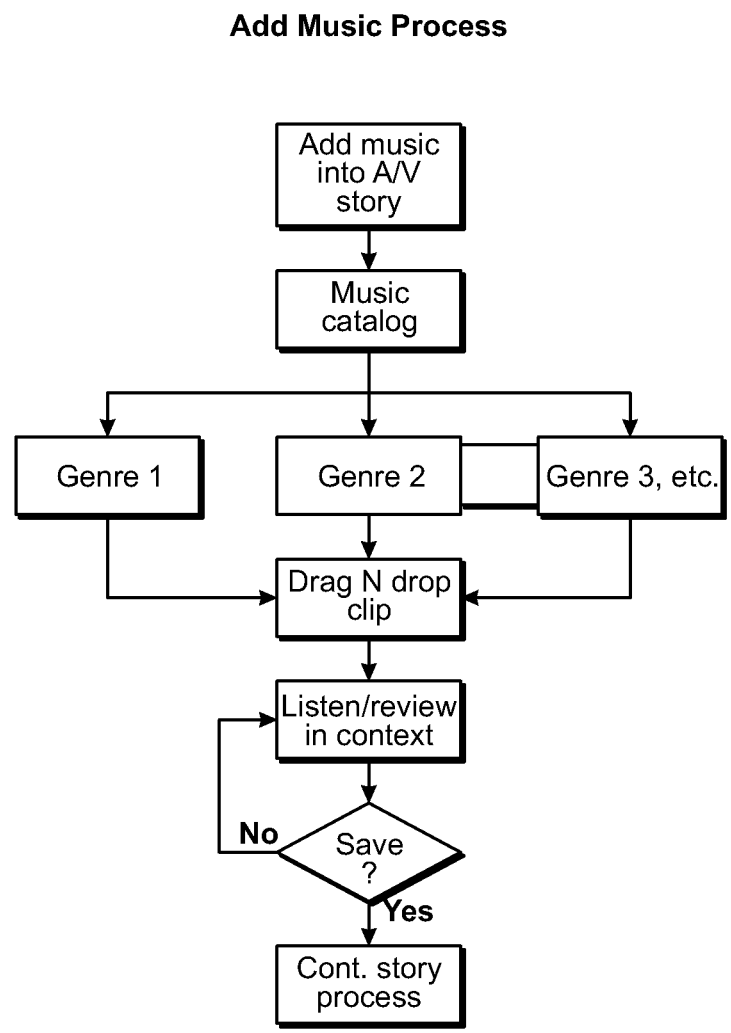
FIG. 23 depicts a flow chart illustrating an exemplary music editing feature for use within the Tell a Story Process by a user accessing the mobile and web-based personal history capture-store-retrieval system according to an embodiment of the present disclosure.
Figure 24:
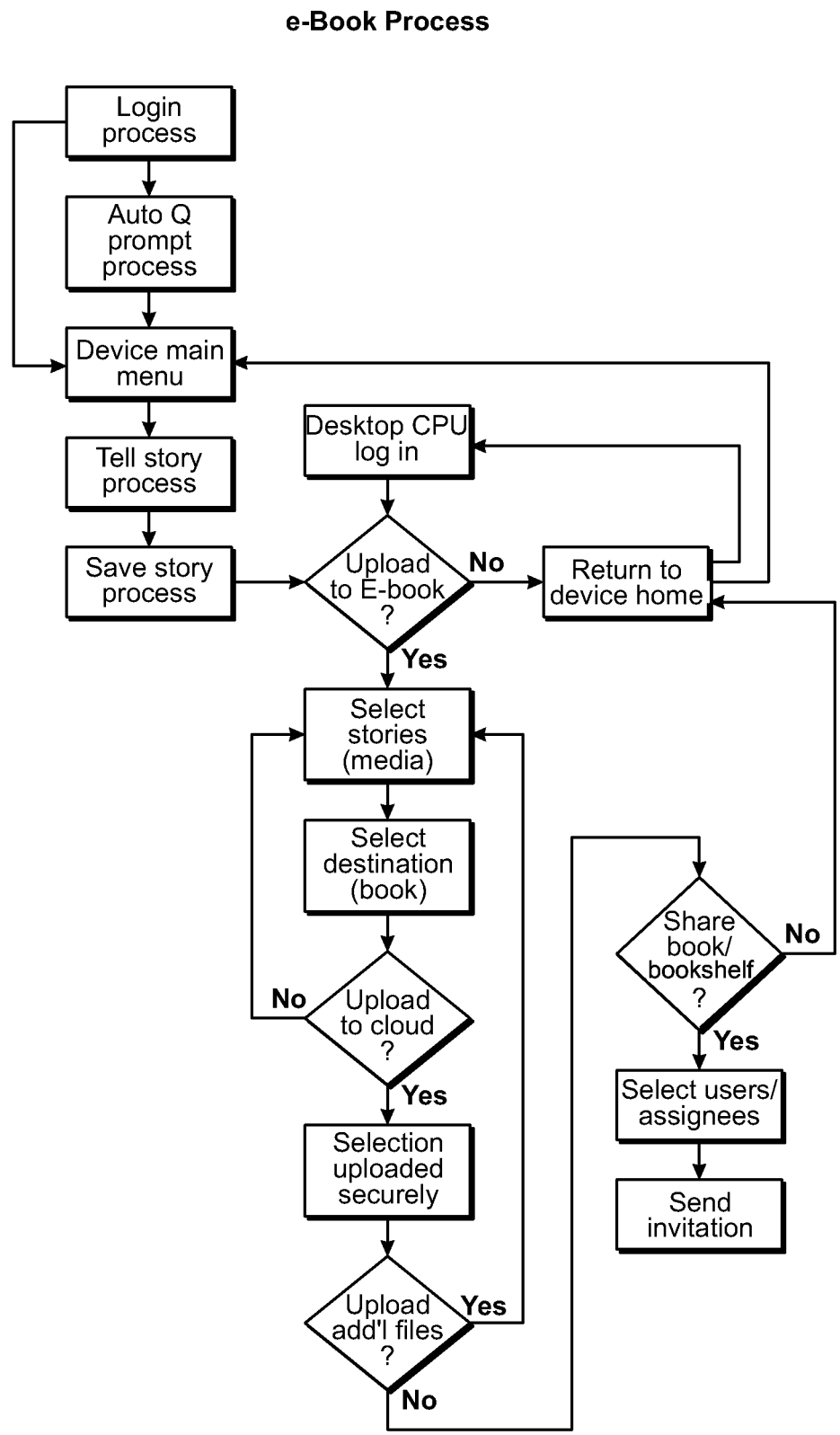
FIG. 24 depicts another exemplary flow chart illustrating an exemplary e-Book Process for creating and sharing an e-Book using the stored Tell a Story Process content created via the mobile and web-based personal history capture-store-retrieval system according to an embodiment of the present disclosure.
Figure 25:
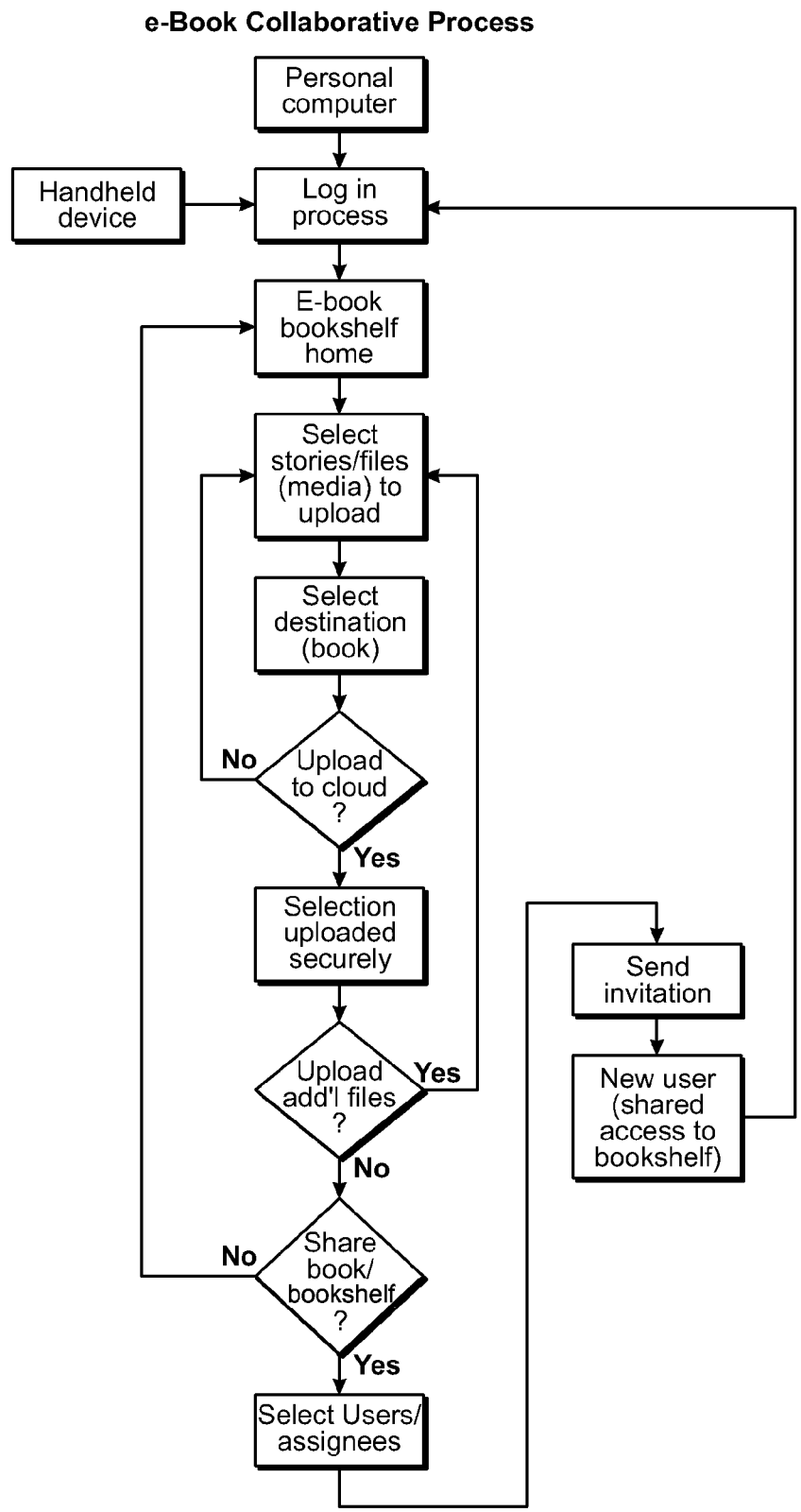
FIG. 25 depicts another exemplary flow chart illustrating an exemplary e-Book Collaborative Process for creating and sharing an e-Book, and inviting others to collaborate in the creating and sharing of the e-book using stored Tell a Story Process content created via the mobile and web-based personal history capture-store-retrieval system according to an embodiment of the present disclosure.

FIG. 23, like FIG. 6, depicts a flow chart illustrating an exemplary music editing feature for use within the system's Tell a Story Process by a user accessing the mobile and web-based personal history capture-store-retrieval system according to an embodiment of the present disclosure. In one embodiment of the editing capabilities of the system, and as noted above in connection with FIG. 3, the user may add music into the user's A/V story that is saved on the system. For example, when the user desires to edit a stored or active session, the user is provided access to a music catalogue with a multitude of music genres. A drag and drop music clip functionality is provided to permit the user to drag and drop a music clip into the A/V material. The user is then provided with the ability to listen to and review the music clips in the context of the user's recorded story. The user can save or continue to review and edit until satisfied with the result. The user can then continue on with the system and record additional stories.

e-Book Feature: Referring to FIGS. 24-25, the system will allow a user or users to upload any and all content (Stories) to e-book readers mobile devices or web-based devices (there are many such as offered under the following brands: IBOOKS®, CYBOOK™, KINDLE®, etc.) to be integrated into or transformed into e-books. The stories may be sent over to the e-book reader as a single story or as a chapter (life theme) or as an entire book (selected chapters (or life themes)). For the sake of this description, these will be called "files" and could describe any or all of the following; a single story or as a chapter (life theme) or as an entire book (selected chapters (or life themes)). The files will be contained within an e-book reader's bookshelves (list of files displayed on the device as a graphic "virtual bookshelf"). The content on these bookshelves may be kept private or shared with an individual or group or public depending upon the user's desire (and chosen settings). A family or affinity group (such as but not limited to an extended family, bike club, social club, department, technology incubator, education class) can share content; ("files"-stories, chapter, books and bookshelves) and are able to rate any "file". A "file" receiving the most favorable rating will move to the top shelf of the ebookshelf (ebookshelves) to make it easier for other group members to find the best content (as rated by the group or community). All e-books will have the ability to receive additional stories ("files") via downloads from mobile or web-based devices. These "files" may be in the form of audio or text or video or photographic images. Furthermore, each family or affinity group may collaborate in the creation of an e-book through the system by adding "files" via upload in the above described manner.

FIG. 24 depicts another exemplary flow chart illustrating an exemplary e-Book Process within the system for creating and sharing an e-Book using the stored Tell a Story Process content created via the mobile and web-based personal history capture-store-retrieval system according to an embodiment of the present disclosure. In this embodiment, the user can interface with an e-book system to import one or more Saved Stories into the e-Book Process. The user accesses the e-Book Process and then selects the story to upload into the e-Book Process, and then proceeds with the uploading. As part of this process, the user selects the media (stories) to upload, selects the destination for the uploads within the e-Book Process (e.g., selecting what "book" to place the story into). The selected material and destination is then uploaded by the system to the cloud through secure uploading capabilities. The user can continue to add additional files. The user can also designate or share a book/bookshelf with someone else. The user can also send an invitation to third parties inviting them to visit the bookshelf to review.

Referring now to FIG. 25, there is depicted another exemplary flow chart illustrating an exemplary e-Book Collaborative Process within the system for creating and sharing an e-Book (much like with FIG. 24), and inviting others to collaborate in the creating and sharing of the e-book using stored Tell a Story Process content created via the mobile and web-based personal history capture-store-retrieval system according to an embodiment of the present disclosure.

Referring now to FIGS. 26-67 there are shown and illustrated exemplary screen shots from, e.g., a smart phone device, displaying screen content from when the mobile and web-based personal history capture-store-retrieval system is used according to embodiments of the present disclosure. Applicant refers to this system and related service under Applicant's federally registered trademark, stories etc®, directed to providing a web site featuring technology that enables users to record, upload, store, retrieve, edit, download and share electronic and digital content, namely, audio, video, still photography, and multi-media content from any source, such as the user's smartphone, tablet, or personal computer, directed to the user's personal, family, group or company historical information; and to providing a website featuring technology that enables users to access a personal history capture-store-retrieval system intended to be used by individuals, families, groups or companies to record, upload, store, retrieve, edit, download, and share electronic and digital content, namely, audio, video, still photography, and multi-media content from any source, such as the user's smartphone, tablet, or personal computer, directed to the user's personal, family, group or company historical information. The stories etc® system is being referenced herein to illustrate exemplary embodiments of the present disclosure.

Figure 28:
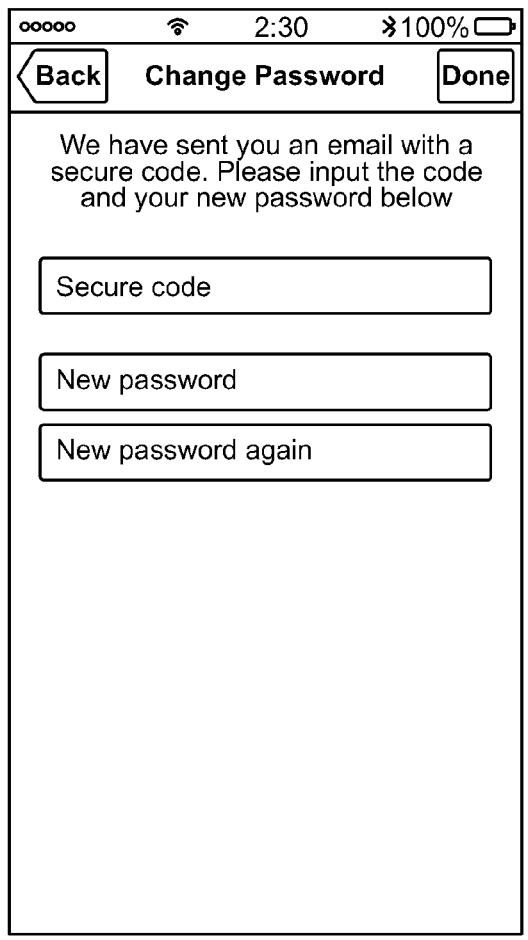
FIG. 28 shows a User Change Password screen shot used according to embodiments of the present disclosure.
Figure 29:
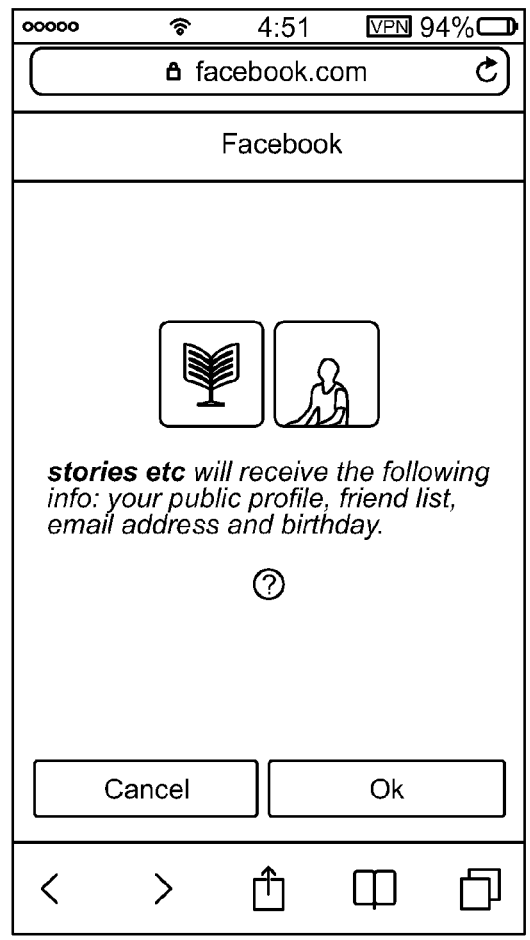
FIG. 29 shows an exemplary Social Media interface screen to permit the user to log into the system via the user's Social Media presence according to embodiments of the present disclosure

Log-In and Registration Process: FIGS. 26-29 depict exemplary screen shots pertaining to the system Log-In and system Registration Process. FIG. 26 depicts exemplary screen shots from, e.g., a smart phone device, displaying login screen content when the mobile and web-based personal history capture-store-retrieval system is used according to embodiments of the present disclosure. This is the stories etc® program home screen. From here, users can log in to an existing system account or create a new one by using a preferred social media log-in (such as Facebook® log in). FIG. 27 shows a system Registration screen that allows the user to log in to their account and use the system's optional birth date and gender functions, which will tailor a more specific series of questions to their stories etc® experience. As depicted in FIG. 28, for example, after users have entered their email address, they will receive a secure code (generated by the system) in their inbox which will allow them to input a new password and verify said password. As illustrated in FIG. 29, users may use their Facebook® account to log in to the stories etc® system. This screen notifies the user that the stories etc® program will receive their public profile information, their friend list, email address, and birthday.

Figure 30:
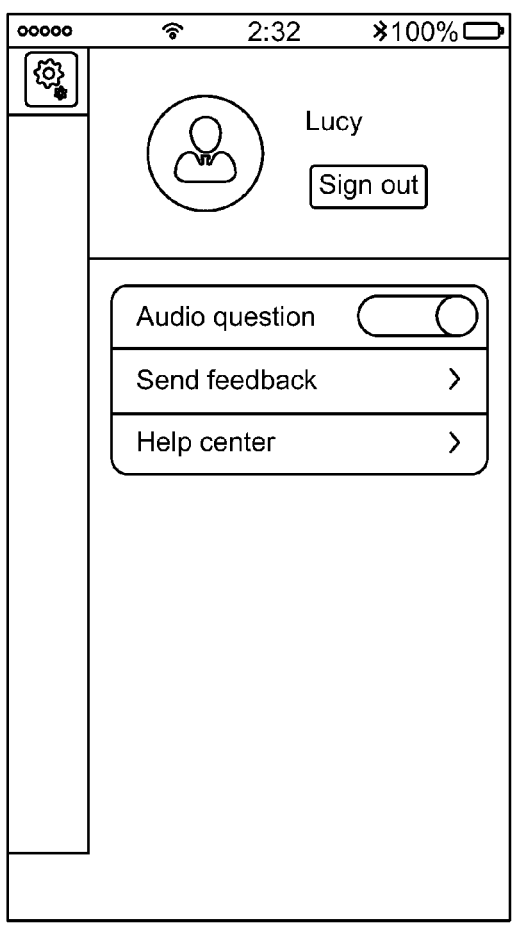
FIG. 30 depicts an exemplary screen shot pertaining to defining or editing various user settings within the program or app, such as, for example, the adjustment of audio levels of questions, sending user feedback and accessing the help center according to embodiments of the present disclosure.
Figure 31:
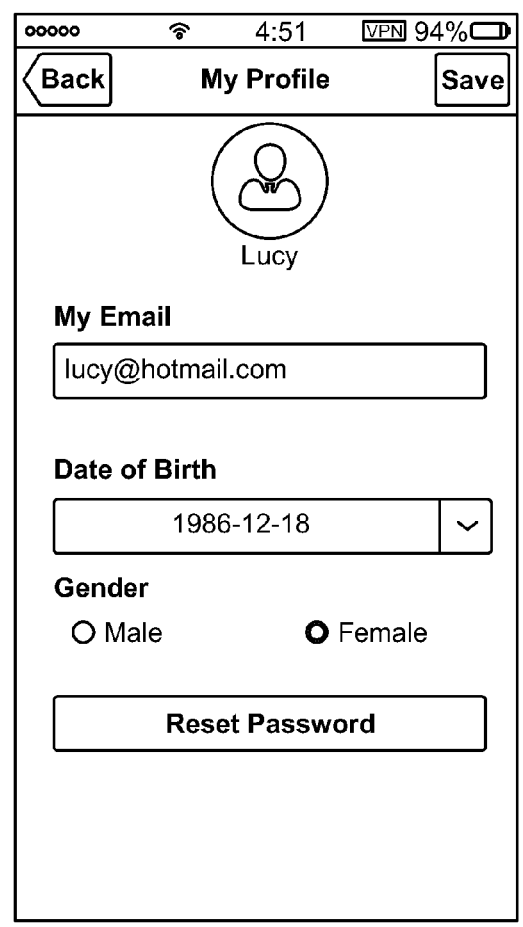
FIG. 31 depicts an exemplary screen shot pertaining to defining or editing various user settings within the program or app, for example, data saved as part of the user's My Profile according to embodiments of the present disclosure.
Figure 32:
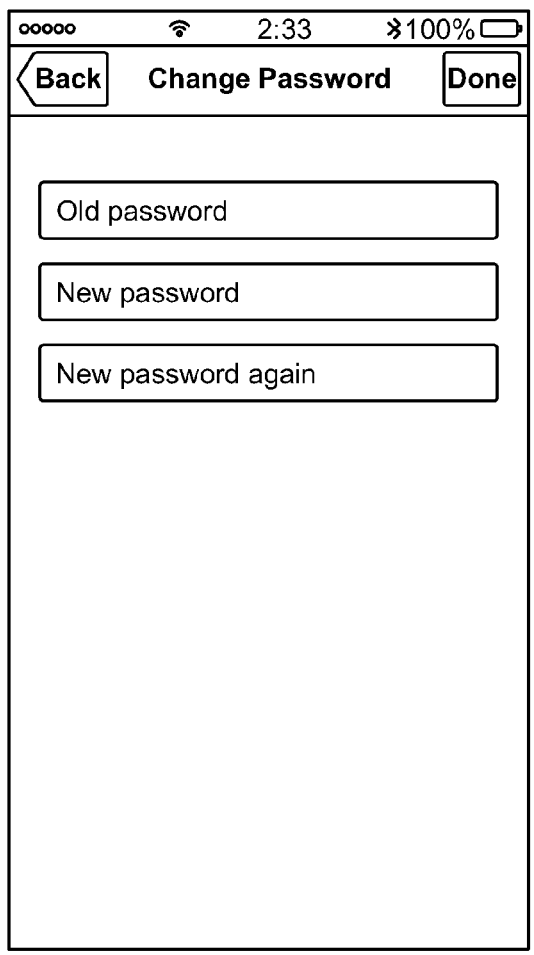
FIG. 32 depicts an exemplary screen shot pertaining to defining or editing various user settings within the program or app, for example, changing the user's password according to embodiments of the present disclosure.
Figure 33:
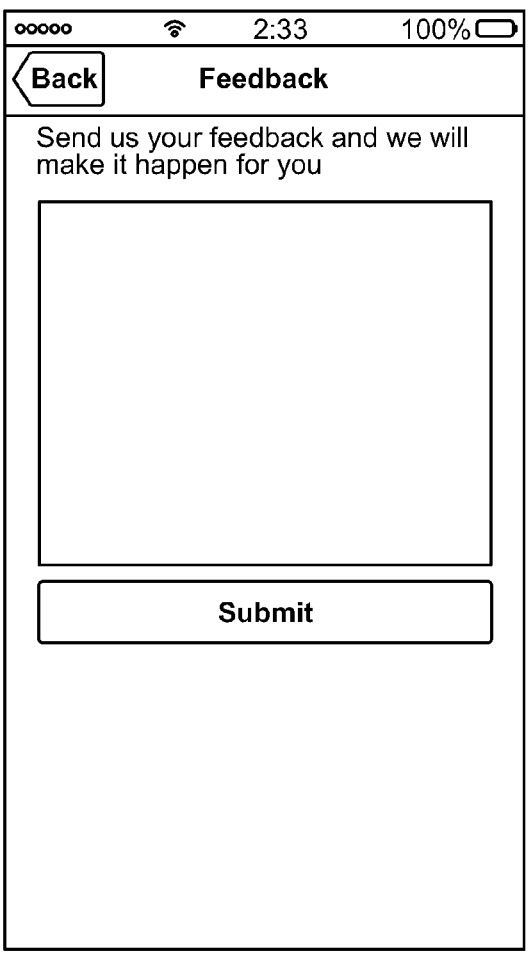
FIG. 33 depicts an exemplary screen shot pertaining to defining or editing various user settings within the program or app, for example, a screen for the user to type in and send user feedback to the system administrator according to embodiments of the present disclosure.
Figure 34:
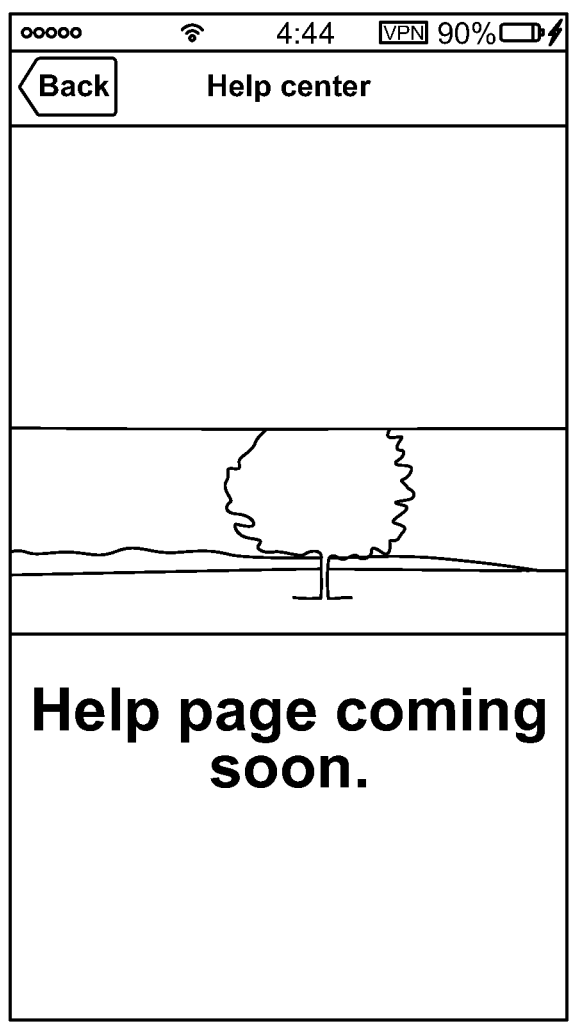
FIG. 34 depicts an exemplary screen shot pertaining to defining or editing various user settings within the program or app, such as an applications help page according to embodiments of the present disclosure.

User Settings: FIGS. 30-34 depict exemplary screen shots from within the system pertaining to defining or editing various user settings within the stories etc® program. Referring to FIG. 30, from the system's setting Home Screen, Users may adjust the audio level of a question, sign out of their account, send feedback and request additional help. FIG. 31 illustrates the "My Profile" screen which allows users to change email address, store date of birth and gender, reset password, and change their avatar/profile picture). Users are able to change their password through the Settings portion of the app as illustrated in FIG. 32. Users are also able to leave any type of feedback for the stories etc® staff via text interface through the system as exemplified in FIG. 33. Referring now to FIG. 34, Users may access the system's help center, which features frequently asked questions (FAQs) and additional information and troubleshooting for the stories etc® app.

Figure 35:
FIG. 35 depicts an exemplary screen shot illustrating the User's Home Screen within the app when the user uses the system for the first time according to embodiments of the present disclosure.
Figure 36:
FIG. 36 depicts an exemplary screen shot illustrating the User's Home Screen within the app, and listing stored stories according to embodiments of the present disclosure.
Figure 37:
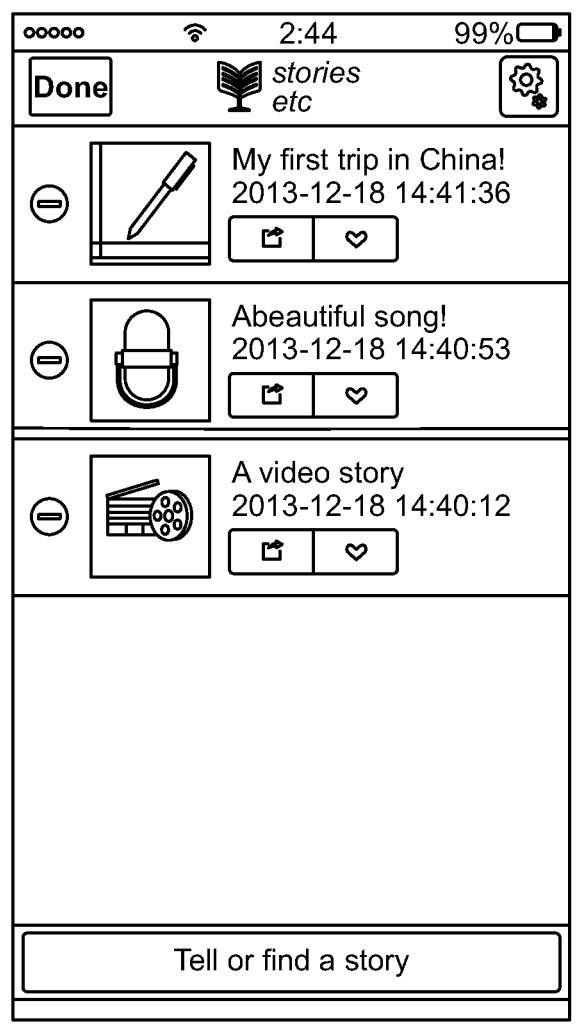
FIG. 37 depicts an exemplary screen shot illustrating the User's Home Screen within the app, and listing stored stories according to embodiments of the present disclosure that can be deleted or edited according to embodiments of the present disclosure.

Home Screen: Referring now to FIGS. 35-37, there are depicted exemplary screen shots illustrating the User's Home Screen within the stories etc® app/system. After registering, the users' home screen will be displayed by the system as being empty (FIG. 35) until they elect to tell their first story, preferably indicating that the user's story box is empty and suggesting that the user Tell a Story Now. Users are able to access the system "settings" panel at any time by clicking on the system gears icon in top right. They are able to begin sharing stories by clicking on the blue (or other colored) button at the bottom of the screen, here shown labelled as "Tell or find a story". FIG. 36 depicts the home screen once the user has begun telling stories, where the saved stories are now listed by the title given them by the user (here, for example, "My first trip to China" as a text story, "A beautiful song" as an audio story, and "A video story" as a video story). An icon may also appear next to the title to refer to the type of media used for the story, e.g., a pen or pencil to indicate a text story, a microphone to indicate an audio story and a clapperboard and film reel to indicate video. The user can then select one of the existing stories, or elect to Tell a New Story. Referring now to FIG. 37, from the home screen, users are able to edit or delete previously saved stories. Once finished, they can click 'done' to return to previous home screens. Users can also click a button (here shown as a small heart shaped button) to indicate a favorite story (and the system will store such indication) and users can email or text any story (audio, video, text) by clicking on the email/text icon button (wherein the system will then create an interface for the user to address the email/text message and attach desired content). Clicking on the email button preferably directs the user to the user's contact page on their smartphone to make emailing or texting easier.

Tell a Story Process: Referring now to FIGS. 38-50, there are depicted exemplary screen shots illustrating exemplary aspects of the Tell a Story Process portion of the app/system.

Figure 38:
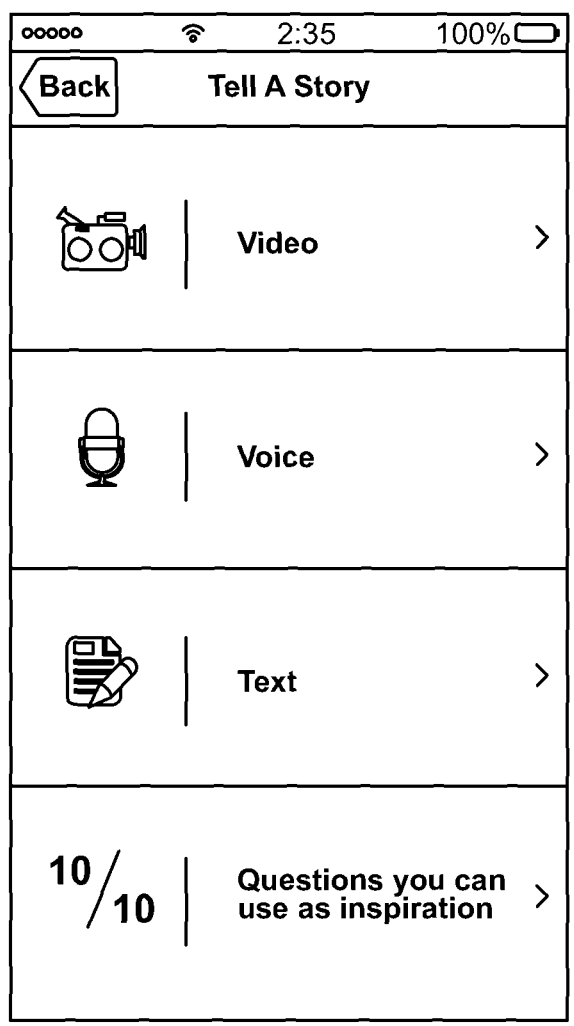
FIG. 38 illustrates a screen shot for the Tell a Story splash page for creating a new story where the user can select to start creating a video story, audio story, text story, or question prompted story according to embodiments of the present disclosure.
Figure 50:
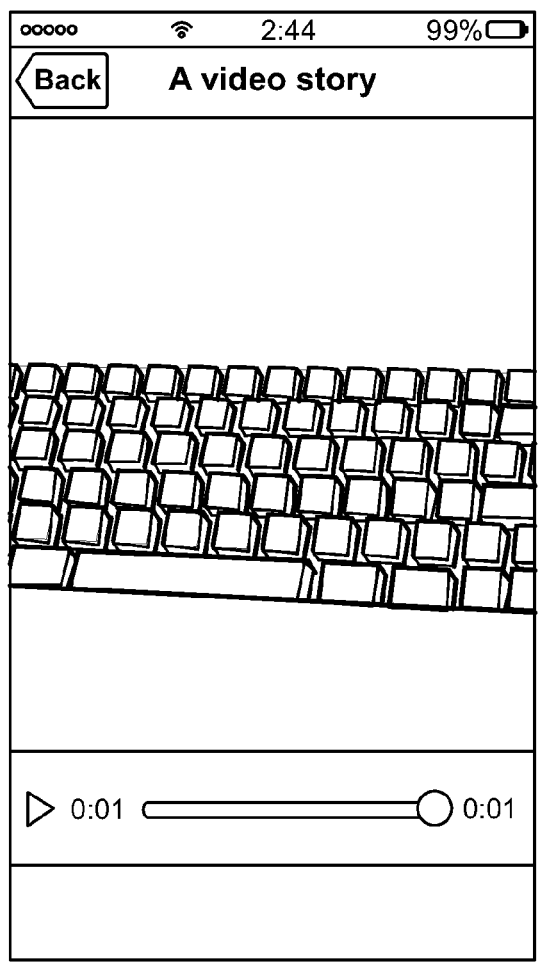
FIG. 50 illustrates an exemplary screen shot depicting the Title creation screen for the Create a Video Story process of the app according to embodiments of the present disclosure.
Figure 51:
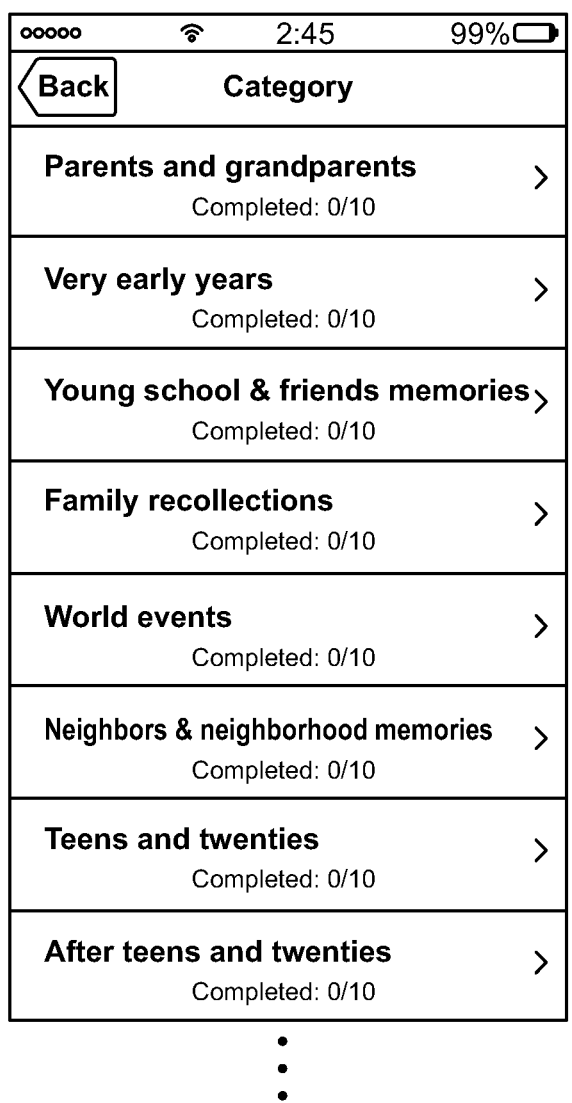
FIG. 51 illustrates an exemplary screen shot depicting the 10 for 10 Story Prompts Category screen according to embodiments of the present disclosure where a user can select a Category or Life Theme of interest to serve as a prompt for creating a story.
Figure 52:
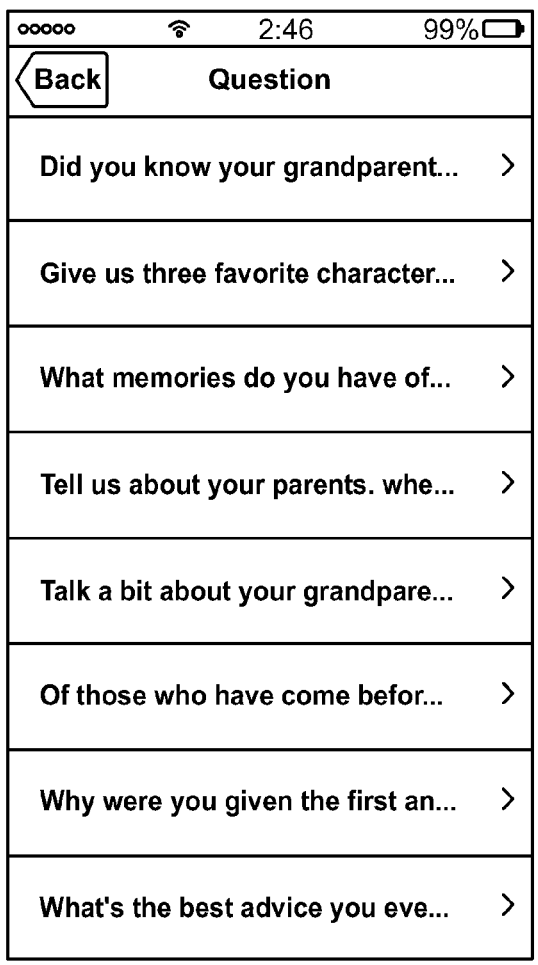
FIG. 52 illustrates an exemplary screen shot depicting the 10 for 10 Story Prompts Question screen according to embodiments of the present disclosure where a user can select a desired question from with a selected Category or Life Theme of interest to serve as a prompt for creating a story.
Figure 53:
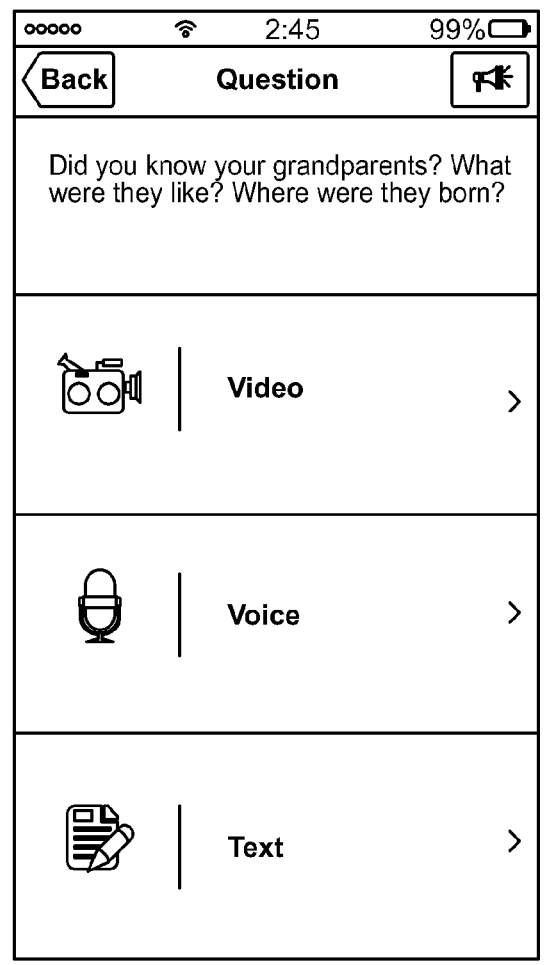
FIG. 53 illustrates an exemplary screen shot depicting the 10 for 10 Story Prompts Question screen according to embodiments of the present disclosure where a user can select a desired mode of recording (e.g., text, audio, video) the answer to the question for creating a story.

For example, if the user selects the "Tell or find a story button" from the home screen (e.g., FIG. 36), the user will be directed to the Tell a Story Process portion of the app. FIG. 38 illustrates a screen shot for the Tell a Story splash page for creating a new story. From this exemplary screen in FIG. 38, users may select which medium (text, video, or voice audio) they wish to use to tell their story. Upon pressing the Text button/icon on the screen (FIG. 38) the system directs the user to further steps for telling or creating a text story (e.g., FIGS. 39-42). Pressing the Voice button/icon on the screen (FIG. 38) directs the user to further steps for telling or creating an audio story (e.g., FIGS. 43-46). Pressing the Video button/icon on the screen (FIG. 38) directs the user to further steps for telling or creating a video story (e.g., FIGS. 47-50). The users may also elect to use the 10/10 (ten for ten) bank of questions (further-described below) as story-telling prompts (FIGS. 51-53).

Figure 39:
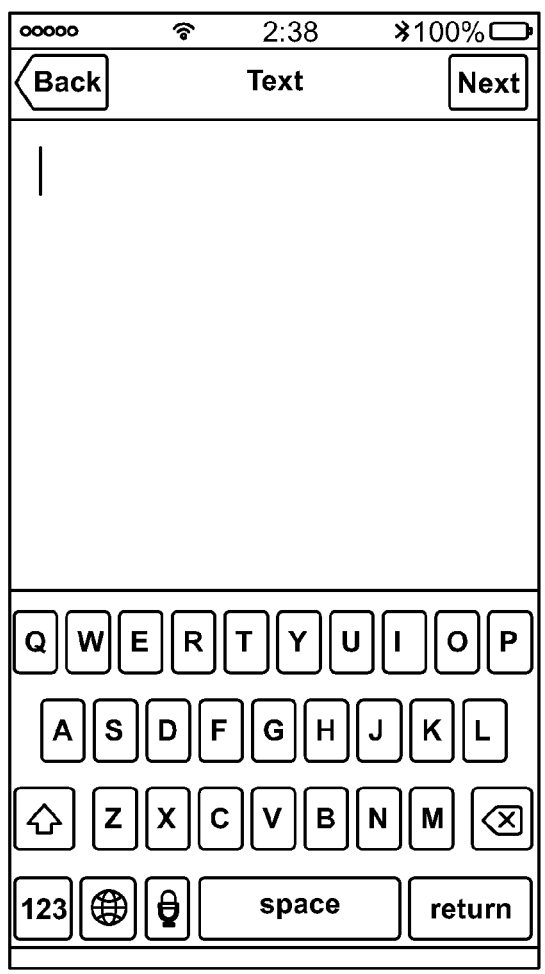
FIG. 39 illustrates an exemplary screen shot depicting the splash screen for the Create a Text Story process of the app according to embodiments of the present disclosure.
Figure 40:
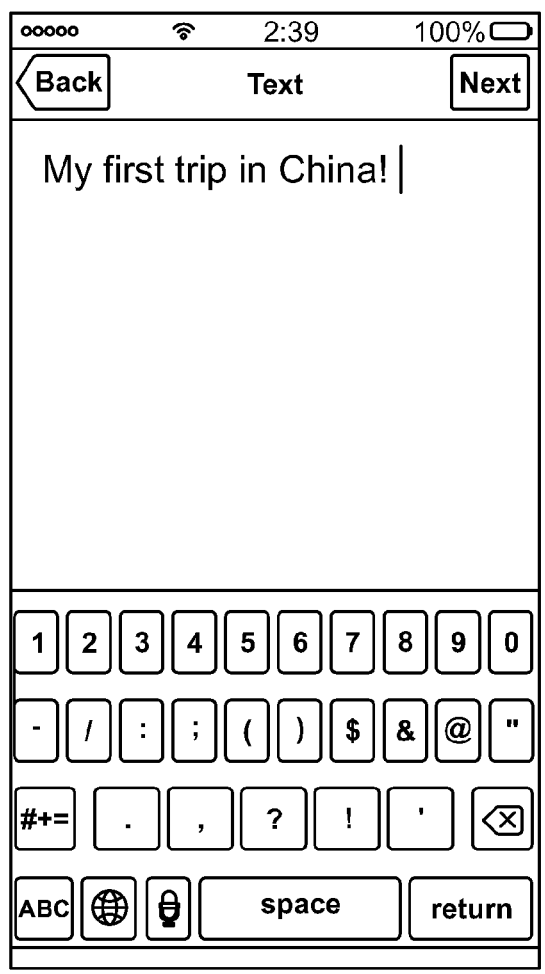
FIG. 40 illustrates an exemplary screen shot depicting the Text screen for the Create a Text Story process of the app according to embodiments of the present disclosure.
Figure 41:
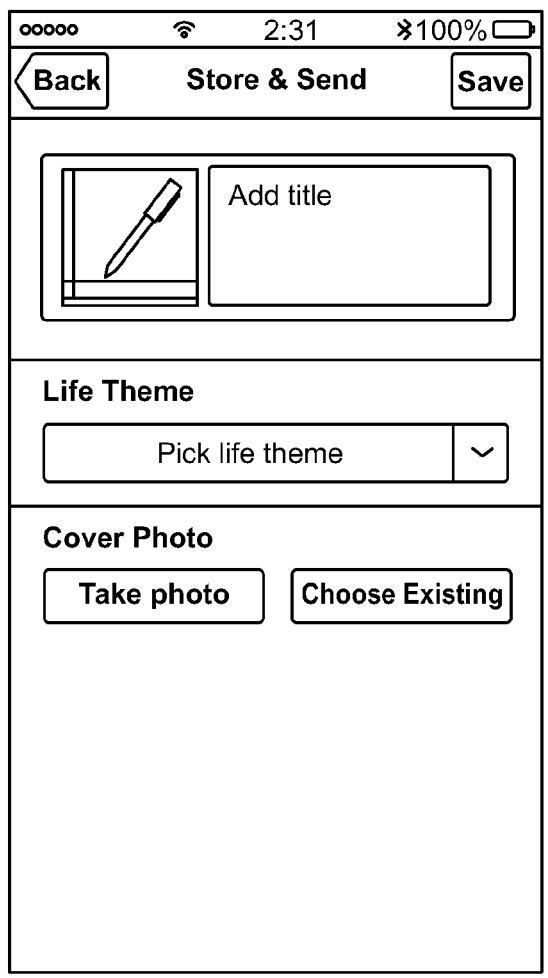
FIG. 41 illustrates an exemplary screen shot depicting the Store & Send Process for the Create a Text Story process of the app according to embodiments of the present disclosure where the user can add a title, life theme and/or cover photo to the story.
Figure 42:
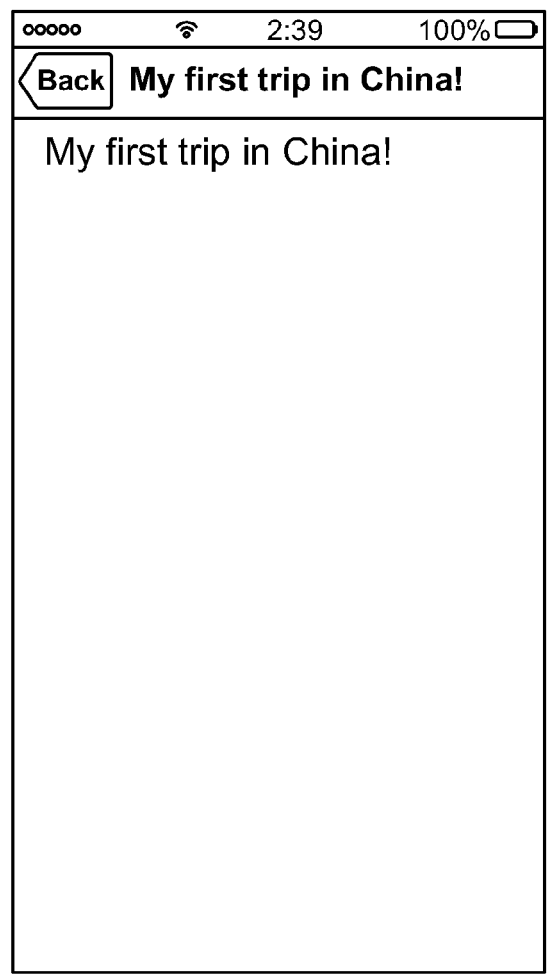
FIG. 42 illustrates an exemplary screen shot depicting the Title creation screen for the Create a Text Story process of the app according to embodiments of the present disclosure.

Text Story Telling: Referring now to FIGS. 39-42, there are illustrated exemplary screen shots depicting the Create a Text Story process of the app (such as exemplified in the flow chart of e.g., FIG. 15). For example, after pressing the Text button/icon on the Tell a Story splash screen (FIG. 38), the users are directed by the system to a Create a Text Story screen such as shown in FIG. 39 where they are given a prompt and keyboard by the system to enter their text-based story (or they can press the "back" navigation button to go back to the Tell a Story Splash Screen). Users can also use the copy/paste feature on the smartphone to copy and insert text in the form of a text story. As illustrated in FIG. 40, once the user has finished entering text, the user will click a green (or other color) 'next' navigation button to be taken by the system to the next screen. From the example screen illustrated in FIG. 41, users are directed to the system's Store & Send screen where they may add a title and a representative cover photo (by clicking on the "Take Photo" or "Choose Existing" button) for the story. They may also select a "life theme" into which the story may be tagged and "filed" so they can be easily recalled at a later date. A "save" button appears on this page for the user to press once completed. Referring now to the example screen shot in FIG. 42, the saved and titled story is displayed, e.g., "My first trip to China". The user can then press the "back" navigation button to go back and review or begin work on another story, etc.

Figure 43:
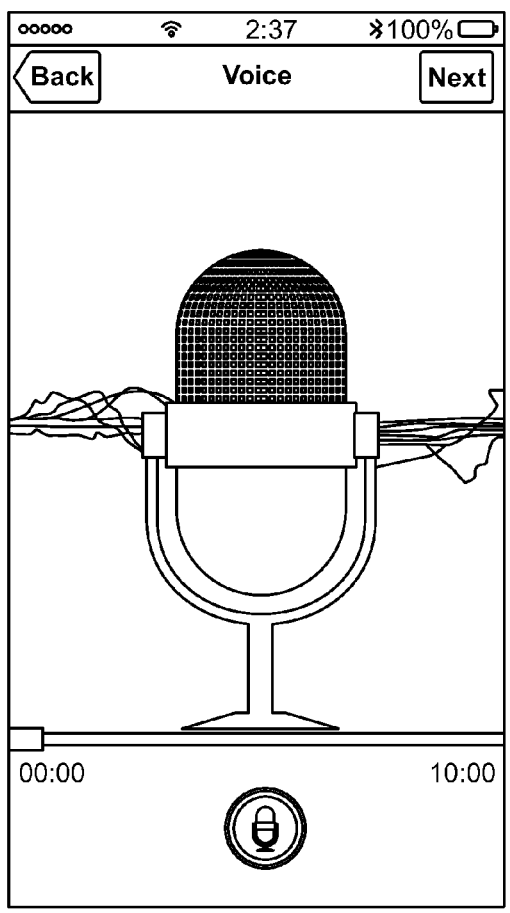
FIG. 43 illustrates an exemplary screen shot depicting the Create an Audio Story process of the app according to embodiments of the present disclosure where the user can begin recording an audio story.
Figure 44:
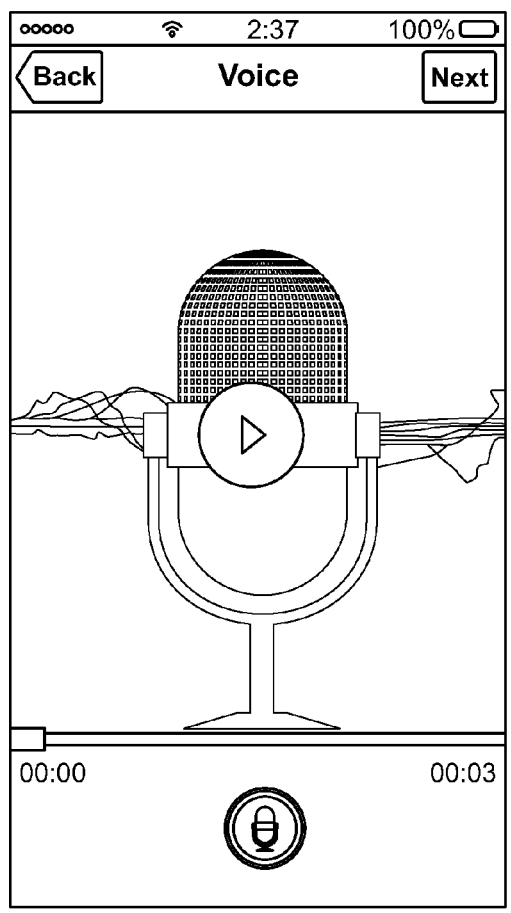
FIG. 44 illustrates an exemplary screen shot depicting the Create an Audio Story process of the app according to embodiments of the present disclosure where the user can begin playing back a recorded audio story.

Audio Story Telling: Referring now to FIGS. 43-46, there are illustrated exemplary screen shots depicting the Create an Audio Story process of the app (such as exemplified in the flow chart of e.g., FIG. 13). For example, after pressing the Voice button/icon on the Tell a Story splash screen (FIG. 38), the users are directed to a Create an Audio Story screen such as shown in FIG. 43 where they can begin recording an audio story (or they can press the "back" navigation button to go back to the Tell a Story Splash Screen). Users click a red (or other color) "record" button to begin recording their audio story. They may stop recording at any time by pressing the red recording button again. Referring to the exemplary screen shot in FIG. 44, once the user has recorded a story, the user may review the story by clicking the playback button (triangle). Once satisfied with recording, the user may press the "next" navigation button and be directed by the system to the following screen. For example, in FIG. 45, as with the Create a Text Story function, the user is directed to a Store & Send screen where the user may add a title to the audio story (e.g., "A beautiful song"), select an appropriate "life theme", choose a cover photo (either taking a new one or using a photo from the device's camera roll) and then save. Once completed, the user clicks or presses the "save" button. Once saved, as depicted in example screen shot FIG. 46, the user may review the audio story. Once satisfied, the user may return to the home screen by pressing the "back" navigation button.

Video Story Telling: Referring now to FIGS. 47-50, there are illustrated exemplary screen shots depicting the Create a Video Story process of the app/system (such as exemplified in the flow chart of e.g., FIG. 14). The system will allow a user to tell a story using video, audio or text or a combination of all three. The user will select the "Video Story" feature then be instructed by the system to either record new video or retrieve video already stored on the device (recent or uploaded vintage). Once the video is selected, the system will prompt the story teller to begin telling a story in text or audio (using the device's tools) and once the story has been recorded, the user can save and or share in the same manner of all other stories recorded in the system. The user can add a thumbnail image for identification, tag the story with keywords for future search and share, share via email, message, social media, e-book reader, DVD download, etc. The Story is preferably saved to cloud as are others.

Figure 47:
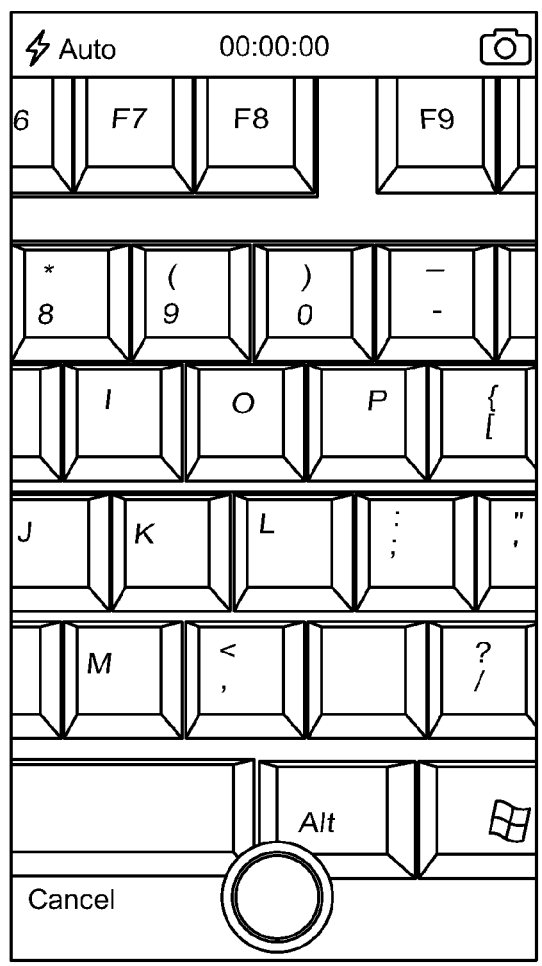
FIG. 47 illustrates an exemplary screen shot depicting the Create Video Story process of the app according to embodiments of the present disclosure where the user can begin recording an audio story.
Figure 48:
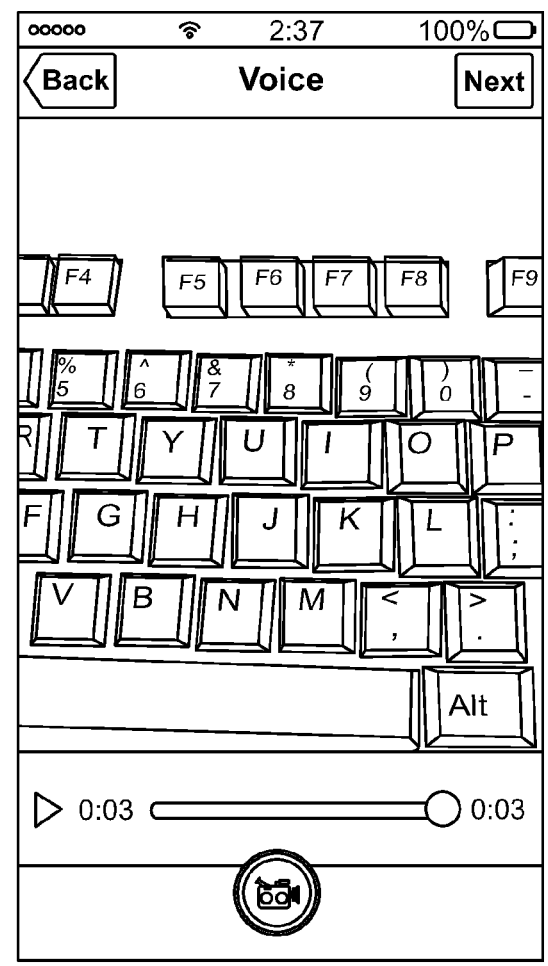
FIG. 48 illustrates an exemplary screen shot depicting the Create an Video Story process of the app according to embodiments of the present disclosure where the user can begin playing back a recorded video story.
Figure 49:
FIG. 49 illustrates an exemplary screen shot depicting the Store & Send Process for the Create a Video Story process of the app according to embodiments of the present disclosure where the user can add a title, life theme and/or cover photo to the story.

For example, after pressing the Video button/icon on the Tell a Story splash screen (FIG. 38), the users are directed to a Create a Video Story screen such as shown in FIG. 47 where they can begin recording a video story from the device (or they can press the "back" navigation button to go back to the Tell a Story Splash Screen). Once the user has selected to create a video story, the user may begin recording (for example, up to 10 minutes, or other length as provided for by the app) of video by pressing the red (or other color) record button. Once finished, the user presses the record button again to stop the recording. Referring to the example screen shot in FIG. 48, the user may review the video using the video player playback function. If the user is satisfied with the recording, the user may press the 'next' navigation button to go to the next screen, where the use is then able to save and store the video file. Referring now to FIG. 49, the user is next directed by the system to a Store & Send screen where, as with text and audio stories, users may also name (title), save, categorize and add a photo to their video story before saving it. After being saved, the story will be stored by the system in the stories etc® system cloud where it can be viewed later or shared as desired by the user through the system. As illustrated in FIG. 50, once the user has saved the video story (here, under the title "A video story"), the user can review it and make additional changes or simply navigate back to previous screens, e.g., the home screen by clicking the "back" navigation button.

Story Telling 10 for 10 Question Prompts: As noted above, and in connection with, e.g., FIGS. 51-53 (and the exemplary flow charts in, e.g., FIG. 19), the "10 for 10" questions are categorized by life themes. For example, after pressing the "10/10—Questions you can use as inspiration" button/icon on the Tell a Story splash screen (FIG. 38), the users are directed by the system to the "10 for 10" screen, for example, that shown in FIG. 51. The "10 for 10" function provides users with, e.g., ten chapters or Categories ("life themes") which each contain 10+ questions (all stored within the system) that users may select and answer at their own pace. These stored questions (or any that may be added) are merely designed to serve as a "prompt" to encourage the user to start a text, audio and/or video story based on the prompt. For example, when the user first lands on this system page, all of the Categories will be listed by the system with an indication of how many questions are present within each Category, and that none have yet been completed (e.g., "Completed 0/10"). The user can then select any of the Categories listed on 10/10 Category screen. Note that the list may be too long (as indicated with ellipses) to see all at once on the user's device, therefore requiring the user to use the device's scroll function to navigate through the entire list. The stories etc® app keeps track of a user's progress through the 10/10 Categories/Questions and each answered question shows up as a "completed" question. Users are able to finish as many of the questions as desired within the system using whichever medium they prefer (text, audio, video).

Referring now to FIG. 52, if the user elects to use the "10 for 10" bank of 100+ questions, the user will select a desired Category from the Category Screen (e.g., such as "Parents and grandparents" from the screen depicted in FIG. 51) and then be directed by the system to a Question screen containing questions relating to that Category, e.g., "Did you know your grandparents? What were they like? Where were they born?" As reflected in the example screen shot in FIG. 52, the user will be prompted by the system with a list of questions that the user may choose to answer as may be desired. Note again that the list may be too long (as indicated with ellipses) to see all at once on the user's device, therefore requiring the user to use the device's scroll function to navigate through the entire list. If the user does not wish to answer any of the listed questions, the user may return to the "10 for 10" screen by pressing "back" navigation button. Referring now to FIG. 53, once the user has selected a question from within the category, the user is directed by the system to another screen, such as shown in FIG. 53, that displays the selected question in text form with the option to hear an audio version of question by clicking the green (or other color) "audio" button/icon. Once ready to answer, the user simply selects a medium (video, audio, text) to begin the Tell a Story Process for the response to this question. Exemplary life themes (Categories) and questions stored within the system may include, but are not limited to the following: Life Themes List: 1—Parents and Grandparents; 2—Very Early Years; 3—Young School & Friend Memories; 4—Family Recollections; 5—World Events; 6—Neighbors and Neighborhood Memories; 7—Teens and Twenties; 8—After Teens and Twenties; 9—Passions and Hobbies; and 10—Reflections and Philosophies. As will be apparent from the below list of questions and the above list of themes/categories, many other questions and themes/categories could be employed.

1—Parents and Grandparents; 1.1 Did you know your grandparents? What were they like? Where were they born? 1.2 Give us three favorite characteristics of each of your parents. 1.3 What memories do you have of your parents? 1.4 Tell us about your parents. Where were they born? When were they born? 1.5 Talk a bit about your grandparents' lives. 1.6 Of those who have come before us, whom do you miss the most? Can you talk about that a bit now? 1.7 Why were you given the first and middle names you have? 1.8 What's the best advice you ever received from your parents? 1.9 What were your parents or grandparents' passions or hobbies? What did they dream about becoming? 1.10 Do you know where or when you parents met? If so, talk about that a little bit. 1.11 Name three physical characteristics of each of your parents. Did you inherit any of those characteristics? 1.12 Name three personality characteristics of your parents. Did you inherit any of those characteristics? 1.13 In what kinds of school activities did your parents participate? 1.14 What hardships, financial or emotional, did your grandparents go through? How did those hardships affect your parents? 1.15 How were your parents affected or influenced by their siblings? 1.16 Do you know anything about your parents or grandparents' careers or particular jobs?

2—Very Early Years; 2.1 As a child, what did you want to be when you grew up? 2.2 Where did your family go on vacations? Talk about some of those stories. 2.3 Who were your childhood heroes in movies, books, sports, or real life? Talk about why they were your heroes. 2.4 Did you receive an allowance as a child? If so, how much and what did you spend it on? 2.5 Tell us some nursery rhymes or sing us a song from your childhood and by all means, be silly. 2.6 Off the top of your head, name three great blessings you had as a child. 2.7 First memories are usually quite interesting. Talk about your first memories. 2.8 Name three great hardships or difficulties you endured as a child and how those affect you now. 2.9 What was the best gift you ever got as a kid? Talk about why that gift was special to you. 2.10 Off the top of your head, name three great hardships or difficulties you endured as a child. 2.11 What were some of the mischievous things you did as a child, teenager, or adult? 2.12 Describe a time in your childhood where you had to be courageous. Were you aware you were being courageous? 2.13 What things frightened you as a child? And what things frighten you now that didn't when you were younger? 2.14 A lot of people growing up in neighborhoods had to be home before the street lights came on. What time did you have to be home at night? Did you ever get in trouble for missing curfew? 2.15 Name three great blessings you experienced as a child. 2.16 What things scared you as a child, young adult, or even now? 2.17 What did you want to be when you grew up? Did you become that? Why or why not? 2.18 What experiences or events from your childhood have affected you most in your life? 2.19 What was your college campus like? Take a walk through your campus in your mind and talk about your memories from there.

3—Young School & Friend Memories; 3.1 What kind of school did you attend? Remember walking the halls and describe what you see. 3.2 What was your favorite thing about school? 3.3 What was your favorite school subject and why? 3.4 Many of us had childhood pets. Talk a bit about some of your favorite pet memories. 3.5 Who was your best friend growing up? What are some crazy experiences you two shared? What trouble did you get into? What were some of your best Friday nights with this friend? 3.6 Who were your childhood heroes in movies, books, sports—or even in real life? Talk about why they were your heroes. 3.7 What were your least favorite school subjects? 3.8 Life offers many opportunities. What mischievous things did you get into as a child or as a teenager? 3.9 Talk about some of your favorite friends or teachers from your school days. 3.10 Do you have a story from your childhood about something you were really proud of? 3.11 Who was your favorite teacher and why? What did you like most about him or her? 3.12 Were you a good student in school? What were some of your favorite subjects? 3.13 What's the best advice you ever received from a friend? 3.14 This one always surprises people who don't know: Did you have any nicknames growing up? How did you get those nicknames? 3.15 What did you do for fun with your friends as a child?

4—Family Recollections; 4.1 As a child, what was your favorite holiday? 4.2 Talk about when your brothers and sisters were born. What do you remember about each of them? 4.3 What responsibilities did you have when you were growing up? 4.4 How did you and your family spend summer holidays? What were some of your favorite summer activities? 4.5 Did your parents have any special mottos, creeds, or proverbs? 4.6 What family traditions were important to you? Why were they so important? 4.7 Extended families can be very colorful. Share some fond memories of your extended family (cousins, aunts, uncles, etc.). 4.8 How did your family celebrate holidays? 4.9 On what did your family spend money? 4.10 Family vacations: where did your family go? Talk about some of those stories. 4.11 Were there large holiday gatherings of family and relatives? What traditions did you have? Were they the same year after year? 4.12 Did you have any brothers and/or sisters? 4.13 Share some family traditions and what you recall most about them. 4.14 Who was more strict: your mother or father? Talk about discipline around your house. 4.15 How many children were in your family? Take a minute to talk about the birth order. 4.16 Do you think your parents had a good marriage? Did they go through any rough patches? 4.17 How did your family earn money? Did your mother and father both work? Did they both have multiple jobs? 4.18 Many families have tall tales and family legends. Take a minute to talk about some of the tall tales in your family. 4.19 If you are a parent, what is your most proud moment as a parent? 4.20 Tell a family secret. 4.21 How did your family's income differ from your neighbors'? Were they richer, poorer, or about the same? 4.22 From your extended family, to whom were you closest? Whom do you remember most? 4.23 Have any illnesses or health issues affected your family? 4.24 Are there any special heirlooms or memorabilia that have been passed down from generation to generation in your family? 4.25 As a kid or teenager, did you have any responsibilities around the house? How did you handle those? 4.26 What makes your family unique?

5—World Events; 5.1 Big world events shape our lives. Speak a bit about life-shaping world events. 5.2 Off the top of your head, how has society changed? Give examples from when you were a kid. 5.3 Natural disasters shape countries and shape the world. Talk about some natural disasters that have occurred in your lifetime. 5.4 How has your view of the world changed over time? 5.5 What is the most amazing thing you've ever heard? 5.6 What scientific discoveries affected your life the most? 5.7 How has prejudice changed in your life and in society? 5.8 What extraordinary events have you witnessed? 5.9 How has society changed since you were a kid? Give three examples. 5.10 Tell us about three huge news events in your lifetime. Can you name three more? Talk about them. 5.11 Every generation says, "Oh, kids these days." How are things different now from when you were growing up? 5.12 Who is someone you admire from history? Why. 5.13 Has the state of the economy ever had a dramatic effect on you or your family? 5.14 What is the coolest invention in your lifetime? 5.15 If you could change the outcome of one world event, what would it be and how would you change it? 5.16 Historically speaking, what is the most important event in your lifetime?

6—Neighbors and Neighborhood Memories; 6.1 Did you live in different neighborhoods growing up? Talk about the differences and which one you liked best. 6.2 Walk around your home or apartment as a child. What do you see? What do things look like to you as a child? Describe the rooms. 6.3 Close your eyes and walk around your childhood neighborhood. What did the homes look like? How were they the same or different than yours? 6.4 What do you love about the city or town in which you were born, or perhaps live in now? 6.5 Were there any neighbors worth mentioning, famous or infamous? 6.6 Walk around your neighborhood in your mind and talk about what you see. 6.7 Did any big events such as fire, floods, or family member births or deaths happen in your neighborhood? 6.8 How were your neighbor's kids raised differently than you were raised? 6.9 A lot of people growing up in neighborhoods had to be home when the street lights came on. What time did you have to be home at night? Did you ever get into trouble? 6.10 What were some of the street games you played in the neighborhood? 6.11 Talk about a time when the neighborhood pulled together for some common good or cause. 6.12 Did you have any kooky neighbors? 6.13 Tell us what your neighborhood was like when you were growing up. In your mind, take a walk down the street and tell us what it looked like, felt like, smelled like, and how it made you feel. 6.14 A lot of people growing up in neighborhoods had to be home when the street lights came on. What time did you have to be home at night? Did you ever get into trouble?

7—Teens and Twenties; 7.1 What did you do for fun with your family as a child? 7.2 Were you rebellious as a teenager? If so, give some examples. Any horror stories to share? 7.3 Tell a memory of you as a teenager hanging out with your friends. 7.4 What were some of the mischievous things you did as a child, as a teenager, or as an adult? 7.5 What's the worst date you ever went on? 7.6 What hobbies did you have as a kid or teenager? What did you like to do back then that you still like to do now? 7.7 Talk about your graduation from high school. Who showed up? What was it like? Any funny stories? What dreams or goals did you have when you left high school or college? 7.8 Tell a memory of you as a teenager hanging out with your friends. 7.9 Anything from your teen years that you were proud of? 7.10 When you were a teenager, what did you and your friends do for fun? Did you have hangout spots? What did those look like? 7.11 When were you born? What day of the week was it? Did your parents tell you anything about the day you were born? 7.12 How old were you when you learned to drive? Talk about that experience. 7.13 What are your fondest memories of your high school years? 7.14 Can you think of any crazy stories hanging out with your friends or siblings during your high school or teenage years? 7.15 What's the best advice you received from a friend? 7.16 What are your fondest memories of the college years? 7.17 What did you know about life, as a teenager that turned out to be accurate and what did you know about life, as a teenager, that turned out to be inaccurate? 7.18 Did you go off to college? Talk about that experience. 7.19 Have you earned any degrees? What are they?

8—After Teens and Twenties; 8.1 What's the craziest thing you've ever done? 8.2 When did you first feel like a grownup? 8.3 What is the absolute stupidest thing you've ever done in your life? 8.4 How did you parents feel about what you wore and the way you talked when you were a teen? 8.5 Do you remember the first time you were in love? Who was that person? What attracted you to them? 8.6 Were there any phrases that were popular when you were a teen, perhaps from a movie or song? What were they? 8.7 What is your most embarrassing moment? 8.8 Is there a song that you remember as being important? Why was it meaningful? 8.9 As a young adult, is there something you were proud of? 8.10 If you are a parent, what is the most rewarding thing about being a parent? 8.11 Did you ever get married? Talk about the event. How did that day go? What memories do you have from that day? 8.12 If you are a parent, what is the hardest thing about being a parent? 8.13 Is there a moment in your life as a teenager where you were incredibly embarrassed about something that now would not embarrass you at all?

9—Passions and Hobbies; 9.1 What one thing would you have done or become if you knew you would have been successful at it? 9.2 What was the most rewarding job you ever had? Why was it rewarding. 9.3 Have you ever felt that you had a special calling in life? 9.4 Who are some of the singers, bands or even the particular songs that you liked when you were growing up? 9.5 What was the worst job you ever had? Why was it so bad? 9.6 Did you ever get fired from a job? 9.7 Do you have a funny story or experience from your first job? 9.8 What hobbies did you have as a kid or as a teenager? What did you like to do back then that you still do now? 9.9 Where do you go to "get away from it all?" 9.10 Are you happy with the profession you chose? Why or why not? 9.11 What is the most rewarding job that you've ever had? Why was it rewarding? 9.12 What is your favorite word? Why is it your favorite? 9.13 What is the worst job you ever had and why was it so bad? 9.14 Are you pleased with profession you chose? Why, or why not? 9.15 If money weren't an object, what career would you have chosen and why? 9.16 How old were you when you got your first job? What was it? Do you remember how much you got paid? 9.17 Do you have any favorite authors? 9.18 Did you go to college? If so, how did you choose which college and which degree? 9.19 What are your fondest memories of the college years? 9.20 Talk about some of your favorite musicians or bands. Is music important to you? 9.21 Have you earned any degrees? What are they? 9.22 What is the most sacred place in your life? 9.23 What is your greatest academic achievement? 9.24 What do you know now that you're glad you didn't know as a child? 9.25 Do you have a funny story or experience from your first job?

10—Reflections and Philosophies; 10.1 What is your favorite memory? 10.2 What is the most embarrassing thing that ever happened to you? 10.3 How has your perception of life changed over time? 10.4 If you could write a message to your children or grandchildren and put it into a time capsule, what sort of thoughts or advice would you offer them? 10.5 What is a belief you had when you were younger that you later changed? 10.6 Who is the wisest person you've ever known and why? 10.7 What three things has life taught you that you want to pass on to others? 10.8 Did you ever change your religion or spiritual beliefs? How did that happen and why? 10.9 What brings you the most pleasure in life now, as opposed to when you were younger? 10.10 What's the difference in being alive and truly living? 10.11 Name three great blessings in your life. 10.12 What experiences or events from your childhood have affected you most in your life? 10.13 Name three great hardships or difficulties you endured as a child. What got you through? 10.14 What makes a good friend? Were you a good friend to others? 10.15 What is your proudest moment? 10.16 To which countries have you traveled? Which ones did you like the best? Did you have one that you didn't particularly care for? 10.17 How has nature played a role in your life? 10.18 What are you most proud of in your life? 10.19 Of all the things you've done or experienced in your life, what would you suggest to others as a must-do? 10.20 Any bucket list items you haven't checked off? 10.21 Name a moment or event in your life that caused you to feel spiritual. 10.22 What is your life philosophy? 10.23 What do you believe is the purpose of life? 10.24 Name a person you know who is very spiritual. How has that person influenced you? 10.25 What brings you the most peace in your heart and mind?

Figure 54:
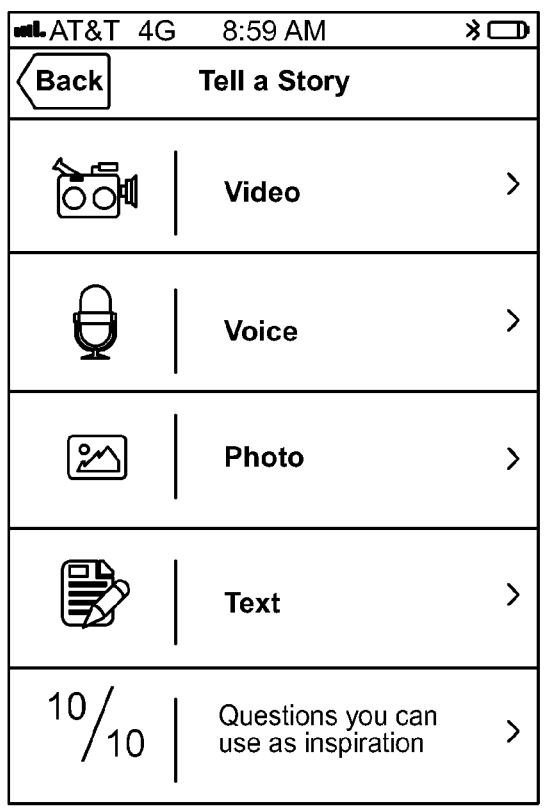
FIG. 54 illustrates a screen shot for the Tell a Story splash page for creating a new Photo Story according to embodiments of the present disclosure where the user can select to start creating a video story, audio story, text story, photo story or question prompted story.

Photo Story Telling: Referring now to FIG. 54, in another embodiment similar to that shown in FIG. 38, the Tell a Story module or process of the system also includes the ability to create a Photo Story. The system will allow a user to tell a story using audio or video or text or a combination of all three. The user will select the "Photo Story" feature then be instructed by the system to either take new images or retrieve images already stored on the device (recent or vintage). Once the images are selected, the system will assign a number for the sequence as chosen and will display the images in the sequence numbered (sequence chosen). The system will prompt the story teller to begin telling a story in text or audio or video form (using the device's tools) and once the story has been recorded, the user can save and or share in the same manner of all other Stories recorded in the system. The user can add a thumbnail image for identification, tag the Story with keywords for future search and share, share via email, message, social media, e-book reader, DVD download, etc. The Story is preferably saved to cloud as are others.

Figure 55:
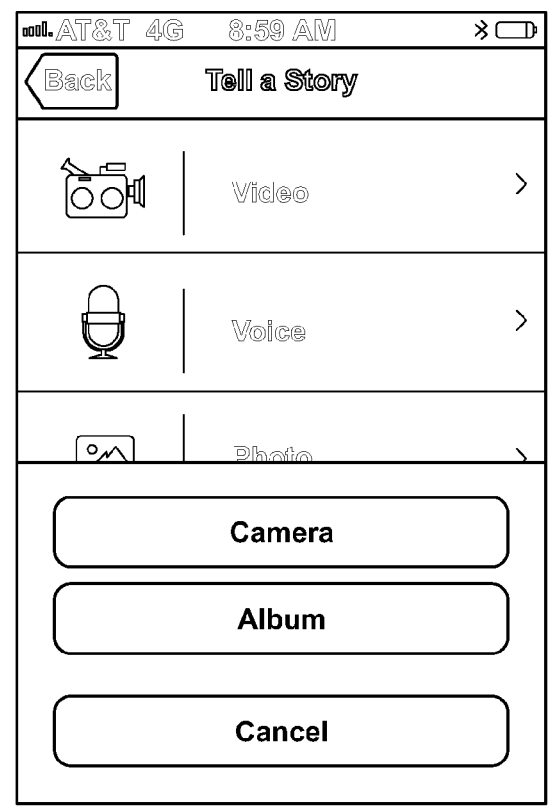
FIG. 55 illustrates a screen shot for the Photo Story page according to embodiments of the present disclosure where the user can start creating a photo story by selecting an existing photo or taking a new photo according to embodiments of the present disclosure.

Referring also to FIGS. 54-66 (and to the illustrative flow charts in, e.g., FIGS. 16-18), there are illustrated exemplary screen shots depicting the Create a Photo Story process of the app/system where the Photo Story can be augmented with Text and/or Audio before saving to, e.g., cloud storage. For example, after pressing the Photo button/icon on the Tell a Story splash screen (FIG. 54), the users are directed by the system to a Create a Photo Story screen such as shown in FIG. 55 where they can begin taking photos for use in the story and/or selecting preexisting photos that are available on, or accessible by, the user's device (i.e., in the camera roll or within photo albums, etc.). If the user wishes to tell a story using a series of photographic images, the user may select a photo already stored on the device, or the user may take a picture with the device's camera, as shown in FIG. 55. If the user does not desire to proceed, the user can press the "cancel" button to be taken back to the Tell a Story Splash Screen.

Figure 56:
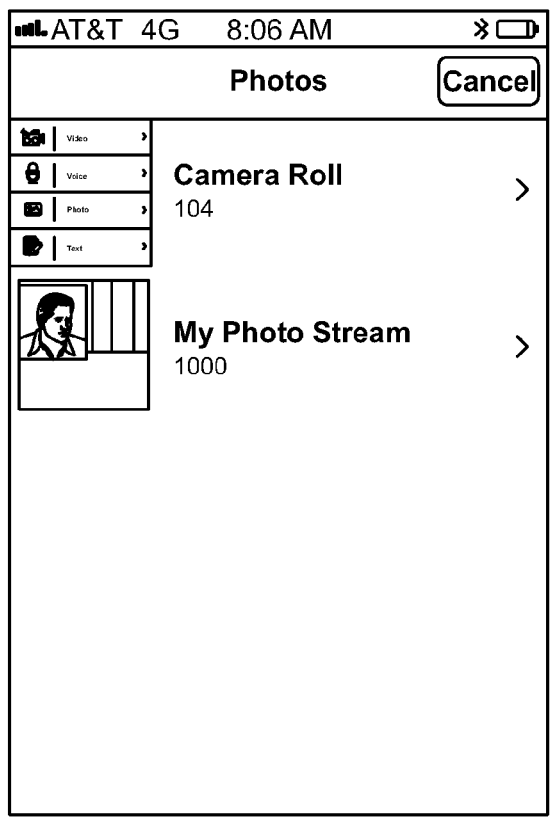
FIG. 56 illustrates a screen shot for the Photo Story page according to embodiments of the present disclosure where the user can selecting an existing photo from the camera roll or photo stream accessible on the user's smartphone or tablet device.
Figure 57:
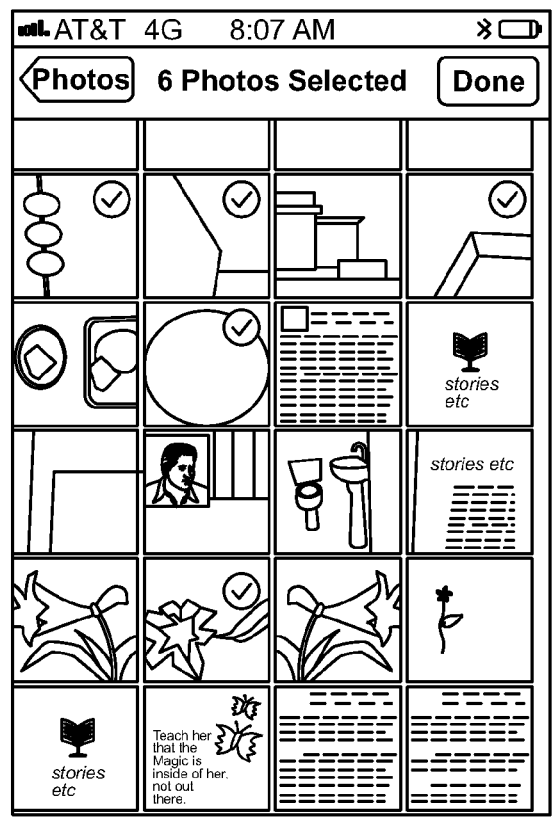
FIG. 57 illustrates a screen shot for the Photo Story page according to embodiments of the present disclosure where the user can review the selected photos.
Figure 58:
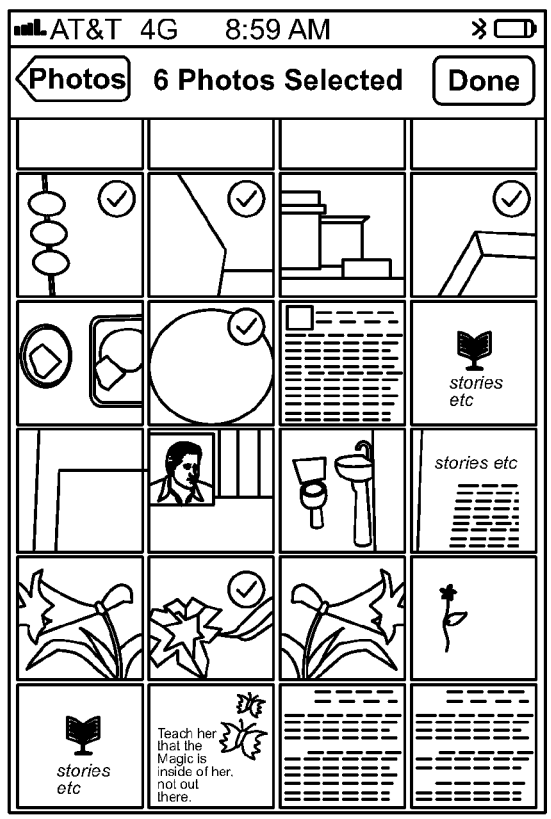
FIG. 58 illustrates a screen shot for the Photo Story page according to embodiments of the present disclosure where the user will review the numbered ordering of the photos to be used in the Photo Story.
Figure 59:
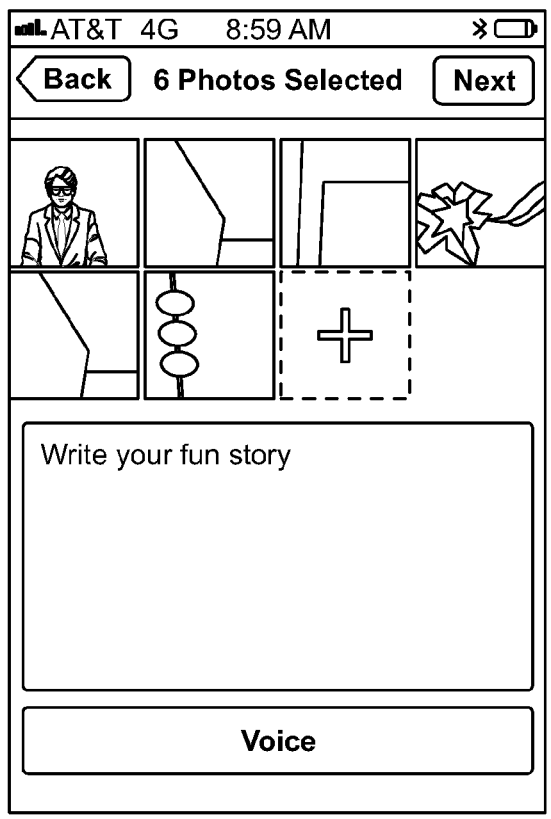
FIG. 59 illustrates a screen shot for the Photo Story page according to embodiments of the present disclosure where the user can review the Photo Story and add additional photos.

Referring to the example "Photos" screen shot in FIG. 56, the user may select (via the system) from existing photos on the device camera roll or, e.g., via the user's photo stream (e.g., the "My Photo Stream functionality) made accessible to the device. As illustrated in the "# Photos Selected" screenshot in FIG. 57, the user may select as many photos as desired for the Photo Story, and then click or press the "Done" or "Finished" button to proceed. Referring now to FIG. 58, in one embodiment, the photos will be displayed in the story in the numbered order in which were selected. In other embodiments, the user will have the ability to rearrange the order of the photos. When finished, the user will simply press "done" to move to the next Photo Story screen within the system. Referring now to FIG. 59, once selected, the user can add text to the photos (e.g., as a caption) by typing in the space below, or the user can provide an audio story by clicking the "Voice" button. Additional photos may still be added by pressing the [+] graphic. When finished, the user will press "next."

Figure 60:
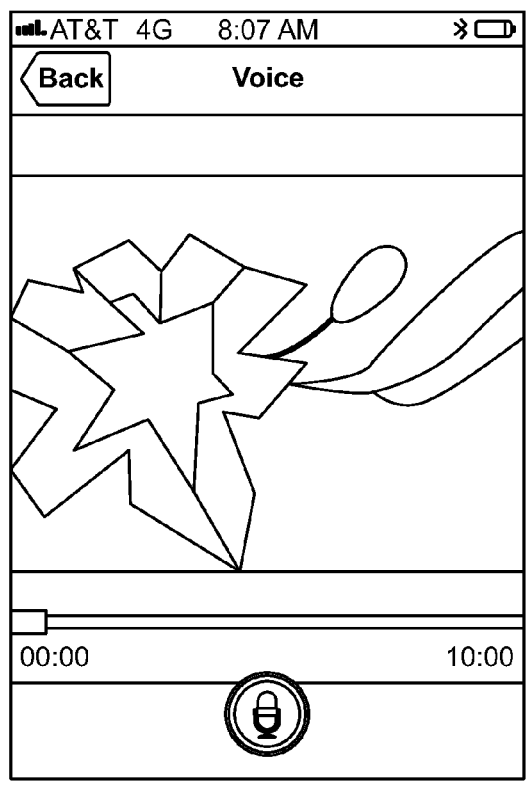
FIG. 60 illustrates a screen shot for the Photo Story page according to embodiments of the present disclosure where the user can review the Photo Story from start to finish.

Referring now to FIG. 60, once the user has completed adding photos and any desired text/audio commentary to the selected photos, the user can then review the Photo Story, watching it from start to finish in context within the system. If the user is unsatisfied, or wishes to re-record the audio, the user can do so by simply pressing the red (or other color) "record" button/icon. If the user wishes to start over, the user may press "back" to return to the previous system screen. When viewing a Photo Story, the user can scroll through the photos by, e.g., sliding the user's finger across the screen. The audio story will continue to play as the user views the photos.

In one embodiment of the system, the user is able to tie the audio and/or text comment to a specific photo within the group of selected photos. Alternately, the user can add audio and/or text comments to the global group of selected photos or one or more of the photos within the selected group. The user can then create a slide show presentation that automatically moves from photo to photo displaying the respective text or playing the respective audio for each respective slide. In another embodiment, the text and audio comments on each slide are tied to the display of such slide and the viewer is prompted by the system (by an audible and/or visual prompt) to move to the next photo. In one embodiment, the app may define a pre-determined maximum recording length for each photo. In other embodiments, the recording time for each photo is not limited.

Figure 61:
FIG. 61 illustrates a screen shot for the Photo Story page according to embodiments of the present disclosure where the user can access Store & Send functionality for the Photo Story and add a title to the Photo Story.
Figure 62:
FIG. 62 illustrates a screen shot for the Photo Story page according to embodiments of the present disclosure where the user can access Store & Send functionality for the Photo Story and select a Life Theme or Category folder for the Photo Story.
Figure 63:
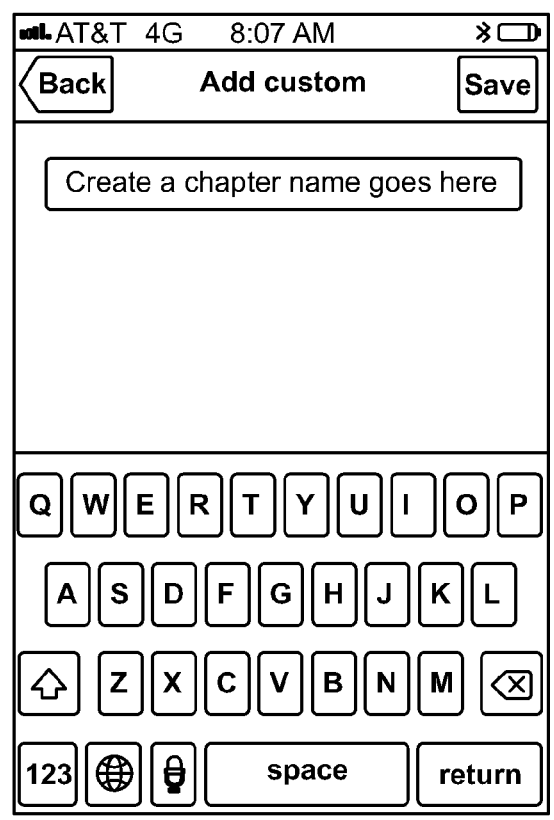
FIG. 63 illustrates a screen shot for the Photo Story page according to embodiments of the present disclosure where the user can access Store & Send functionality for the Photo Story and create a new Life Theme or Category folder for the Photo Story.
Figure 64:
FIG. 64 illustrates a screen shot for the Photo Story page according to embodiments of the present disclosure where the user can access Store & Send functionality for the Photo Story and add tags to the Photo Story.

Referring now to FIG. 61 (depicting a Store & Send screen as could be used in any Tell a Story Process of the system), once the user is happy with the photo+audio/text story, the user can save it. A preferred first step is to give the Story a text title by clicking in the "Add title" box and then accessing the keypad (or equivalent) to add text to the "Add Title" space. Next, the user may select or create a "Life Theme" folder for in which to assign to the Photo Story (or other Story) by clicking or pressing the Life Theme button or drop down selection menu. As illustrated in FIG. 62, the user has a section of his or her "own life themes" previously created by the user and saved in the system from which to select from in the "Pick life theme" screen, or the user can create his or her own life theme by pressing the [+] button. Doing so will bring up an "Add custom" screen (such as depicted in FIG. 63) where the user may create and save a new life theme or chapter folder to personalize his or her storytelling experience. The user may then optionally "tag" the story so that it may be easily recalled at a later date by pressing the "Tag" button on the Store & Send screen (FIGS. 62 and 64) and adding any desired tags for the system to store in connection with the story.

Figure 65:
FIG. 65 illustrates a screen shot for the Photo Story page according to embodiments of the present disclosure where the user can access Store & Send functionality for the Photo Story and add a cover photo to the Photo Story.

Referring now to FIG. 65, once the user has titled, tagged, and/or assigned a life theme to the Photo+audio/text Story, the user may select a cover thumbnail photo for the story. The photo may be taken from the device's camera roll, or a new photo can be taken. The user will move, scale and then select the photo for use. The use can then save the story in the system. In a preferred embodiment, and referring to FIG. 66, the story will be uploaded and saved to the system's cloud storage. By clicking the green "save" button, the story will be automatically uploaded to the cloud, where it will be stored indefinitely, to be recalled and viewed at any time by the user (or designated assignees) within the system. The saved story will then appear in the user's system home screen, as part of the user's list of created stories. The date and time saved may appear proximate the title. As will be understood by those having the benefit of the present disclosure, the functionality depicted in, e.g., FIGS. 61-66 can apply to any of the Create Story processes described herein.

Referring now to FIG. 67 (and also back to FIG. 20), there is also illustrated additional functionality of the system described herein. For example, when a user logs in, a random question generated by the system will automatically pop up. The user will then be able to create a story based on the Auto Prompt Q question presented, skip to another question (and again have the option to create a story or skip to another random question), or the user may elect to close out the screen and return to the main "home" screen by clicking "cancel." This random question prompt could be a daily feature, or could also be conditioned based on the user's input (i.e., prompt again in one week, etc.), or be based on the user's level of login activity within the system app. For example, where the user has not logged into or visited the system in a predefined number of days, the system can greet the user, upon the user's next login, with a suggested story topic seeking the user's input.

Various members of a family could collaborate together to create content via this system that is ultimately merged or transformed into a final "file" (e-book), such as, each family member's personal photos, thoughts and recollections about a family event. Similar collaboration could take place with any subject matter that involves audio, visual, photographic, videographic or other content.

Figure 9:
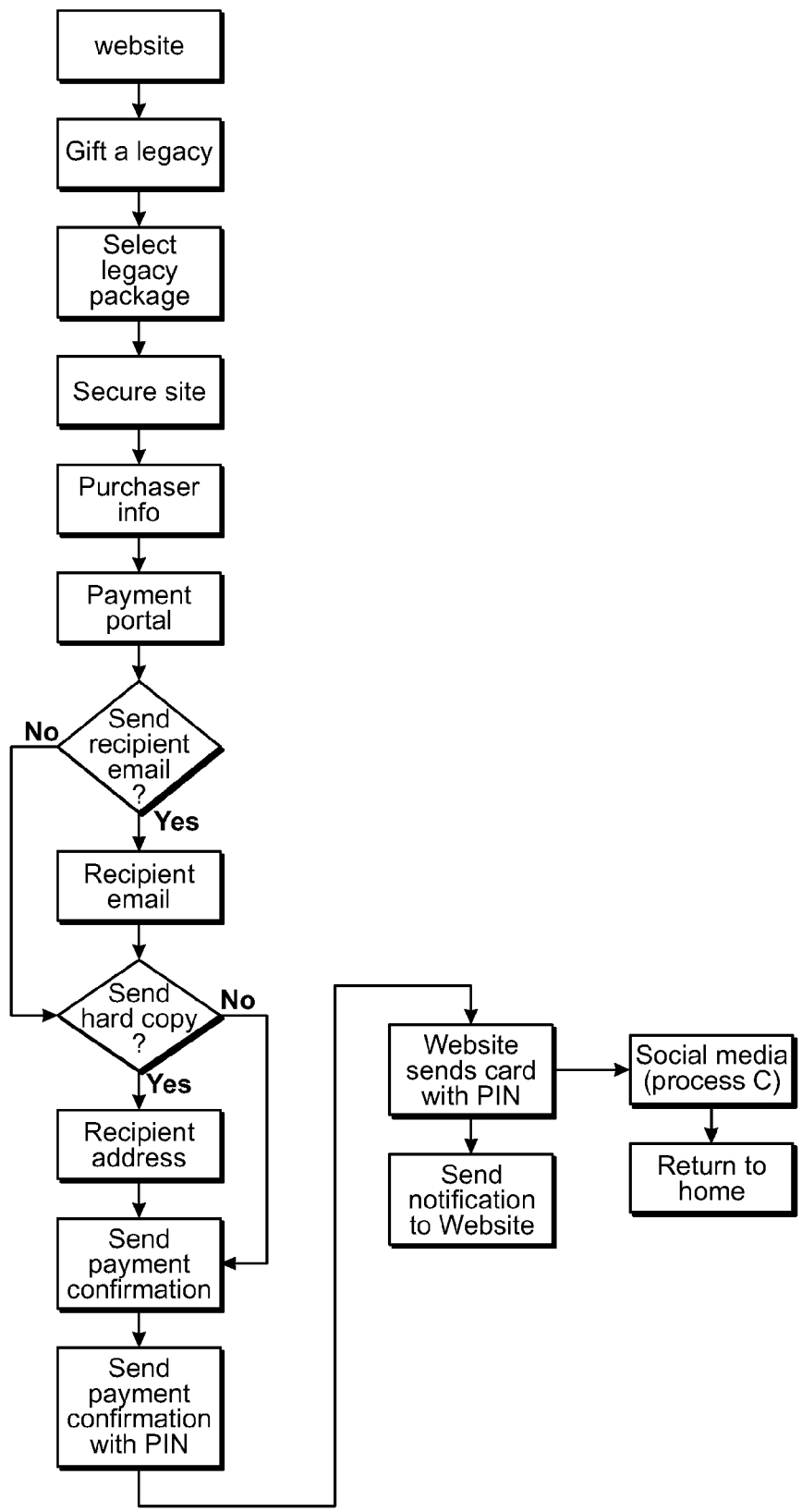
FIG. 9 depicts an exemplary flow chart illustrating additional gifting features available to a user accessing the mobile and web-based personal history capture-store-retrieval system according to an embodiment of the present disclosure.

Gift of Legacy Personal History Recordings: In the feature called GIVE THE GIFT OF LEGACY on the system's website, users will have the opportunity to purchase a gift card for an intended recipient. FIG. 9 presents an exemplary flow chart illustrating use of the "Gift a Legacy" feature. This is done by using the system's app, web and cloud based products by going to a particular place on the system's website and selecting a gift card for any or all holiday occasions including a customizable gift card where the user can put whatever greeting they wish (15 lines of text or less). The user, after selecting the gift card and selected gift from various offerings by the system, will fill out the gift card by typing a personalized message to the gift card recipient. The user will enter the recipient's name and address and email address. At this point the user will pay using any number of web based payment widgets (i.e., PayPal®, VISAnet®, popnet, etc.) found on the system website or app. The recipient's physical address is to be utilized by the company (or, e.g., educational institution) if the user checks the box indicating that a hard copy paper gift card is to be sent to the recipient at the postal mailing address of the recipient. An email address will be used if the user checks the box indicating that an electronic card is to be sent via email to the recipient. The cards will then be given a unique identifier number that is unique to that recipient via a random unique number generator (or other method for assigning serial numbers). This unique number will be utilized by the recipient of the gift card (whether received in an email or hardcopy fashion) to log on to the system's app, web and or cloud based system and begin retrieving the gift. The gift being a subscription to the system's company product offering (personal history capture-store-retrieval process). The user, when purchasing a gift card, will receive (from the system's web based service) an email receipt and confirmation indicating that the transaction has gone through and the gift card will be sent via email or hard copy U.S. Postal Service in the manner the user has indicated. The user will, in this notification, receive an order number.

The user, when buying a gift for a gift recipient, will also be able to record a message (to be stored for 120 days on the company web site) to the gift recipient. The message will initially be in text only but eventually a message will be able to be left in text, audio and/or video message. The idea behind this message to the gift recipient is to (a) personalize the message and (b) suggest specific stories for the gift recipient to record when utilizing the gift. For example, a grandchild could send a gift to a grandparent with a note to provide stories about certain events, personal experiences, etc. that are of interest.

Figure 10:
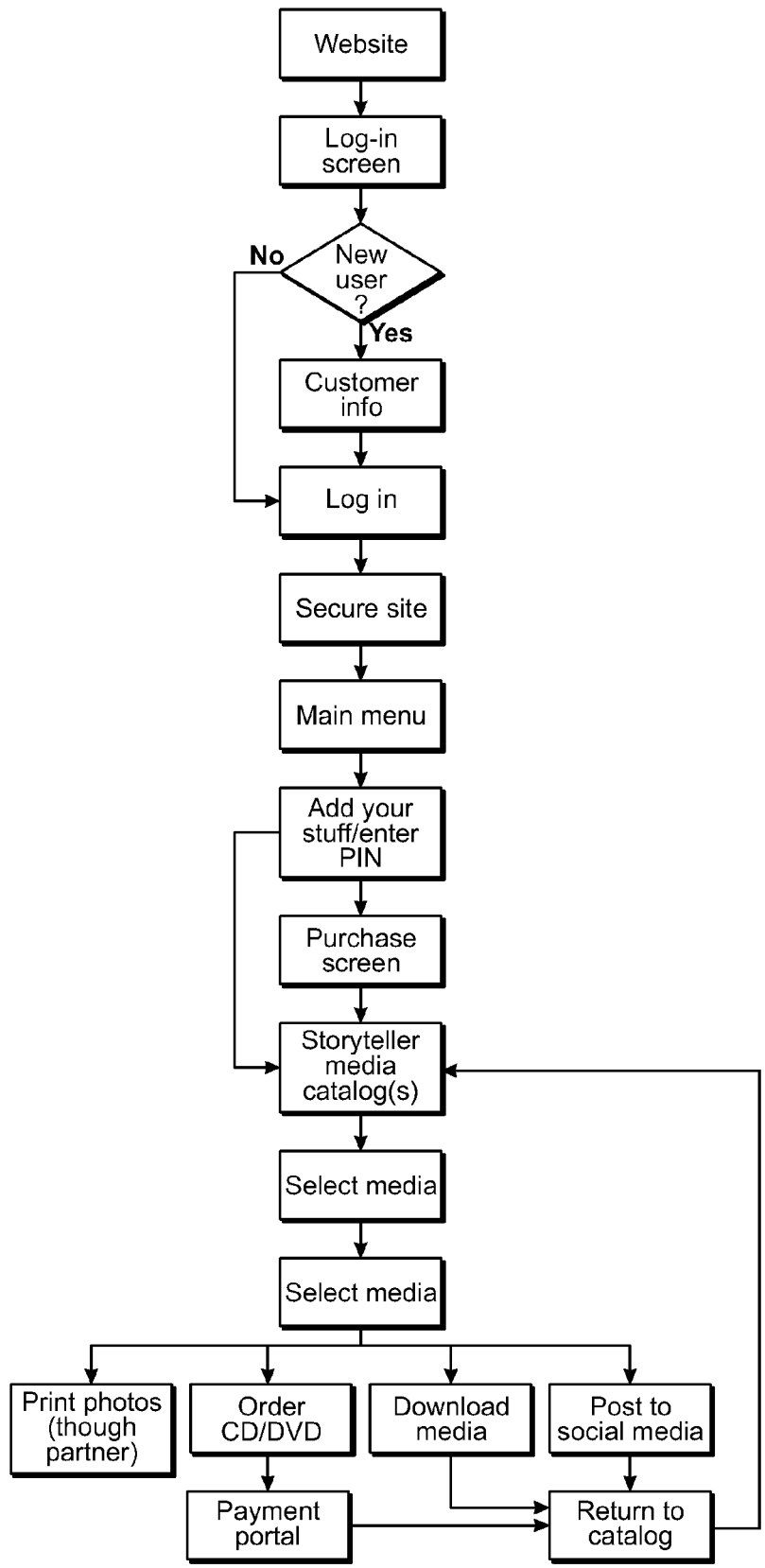
FIG. 10 depicts a flow chart illustrating an exemplary protocol for a customer/user of the mobile and web-based personal history capture-store-retrieval system to provide access to the user's content stored on the system according to an embodiment of the present disclosure.

Assignees: Users of this system based personal history capture-store-retrieval process will have the ability to associate other individuals as assignees to access the user's recorded history and time capsules. FIG. 10 presents an exemplary flow chart illustrating use of the "Assignees" feature. This will be done through an app or web based solution found on the system's web site which gives the user a unique identifier number to be utilized by the assignees when they choose access the recordings. In one embodiment, there will be no limit to the number of assignees per user and no limit to the number of times an individual assignee may come to the system and access the user's recordings or time capsule files. The ability to download files as DVD and receive via regular mail or download as electronic files will exist for either users or assignees. In one embodiment, there is no additional fee for this download ability. In one embodiment, there is a limit, however to the number of downloads per user and once that limit is reached the user and or the assignee(s) will need to provide a payment to the system (on the web site using above mentioned payment process) to access additional downloads.

Regarding the various embodiments described above, in one embodiment, the system may provide music selections for the user to use as background. Additionally, with respect to the questions that are asked of a user during the Q&A segments noted above, in one embodiment, the system is guided by a neural network (or other artificial intelligence engine) designed to take in the user's answers, and to formulate intelligent follow-up questions or additional topics that would appear to be of interest. In yet another embodiment, the user's assignees can submit topics or questions of interest for the user to answer, at the user's option, within the system.

Additionally, although the above system has been described in connection with an individual user (i.e., a family member creating recordings of his or her personal history for the benefit of other family members), the system of the present disclosure could be used by any business, company, educational institution, organization, corporation, etc. in need of preserving its own history or corporate memory. In these embodiments, an authorized member of such entity would initially set up the account, and would then send out invitations to the desired employees, staff, directors, personnel, etc. of the entity seeking the desired input of historical information. In this manner, the entity would be able to amass and preserve a historical review of the entity.

Story Drafts or Works in Progress: When the user's device is not connected to the internet (via cellular network or wifi, etc.), content (such as stories, chapters, etc.) will be saved as a "draft" and indicated as such next to the file name, stored locally on the device, and will be automatically uploaded once connected.

Tags: Users can "tag" stories using keywords for easy retrieval of story in the future. For example, a story maybe tagged "dining" to denote a story about an evening at a restaurant. A search of said a keyword on a mobile or other web-based device will then recall all related stories tagged "dining".

Auto-Sync to Cloud: Upon log-in, the user can set up the system to automatically upload/sync any new picture or video files to the user's account. This will become the user's default setting, which can be changed later. The system will automatically upload any pictures or video files from the user's device, checking against duplicates and skipping any media that is already saved. At the same time, it will save a copy to the e-book for future curation.

Virtual Bookshelf of Stories: Each collection of stories is preferably contained within a single folder (book) placed in the user's master folder (a virtual "bookshelf"), and stored on the cloud. Books can hold as many stories as a user would like. A user can share individual or multiple books from the user's bookshelf—or their entire bookshelf. The content can be rated with "star" ratings by those who are permitted to view such content. The content, as it becomes higher rated (or gains more views/popularity), gets placed on the "top" shelf of the user's master folder "bookshelf".

Memory Enhancement: Another use of the technology of the present disclosure is as an aide for memory enhancement. Stories can be recorded, saved and stored to be reviewed and used as study prompts to better-learn and understand a given subject matter in the future. The system is set up so that it can be used for memory enhancement. In such a capacity, "stories" can be recorded and then reviewed (studied), used as study prompts to gain a greater understanding of a given subject matter. Examples of such use include a recording and indexing (through use of tags) a lecture given by a professor or a tour guide's informative talking points, etc.

Students: e.g., Those Attending College/University: College students (or other students) often have multiple lectures across several courses in a given semester. While there are a multitude of devices that can capture such lessons, keeping track of them over the course of a school year can be challenging. The system described herein provides an opportunity for the students to capture these lectures using their tablets or smart phones and then to index and store them in the "cloud" indefinitely. Lectures and notes are then available to be recalled and reviewed at any time.

Lessons: Learning a musical instrument or a foreign language can be made easier and more efficient with the ability to review an instructor's lesson just as it was given, rather than trying to recall information in the days following the lecture. The system described herein provides an opportunity to capture these lessons using a tablet or smart phone and then index and store them in the "cloud" indefinitely. Lessons are then available to be recalled or reviewed any time by clicking on the appropriate tag or virtual "book."

Travel: People spend thousands of dollars each year to travel to different parts of the country and world, taking guided tours and expeditions to explore new places. Often times, the informative words of a tour guide are forgotten as soon as they are spoken. The present system provides an opportunity to capture these informative excursions with a tablet or smart phone. They can then be indexed and stored in the cloud, indefinitely, where they can be recalled and reviewed any time by clicking on the appropriate tag or book.

Corporate Training and Knowledge Sharing: The system herein can be used easily and effectively for corporate training and knowledge sharing. Using a smart phone device or tablet, management can create an indefinite number of informative training sessions about processes, procedures and protocol. These sessions can then be uploaded to the cloud, where they can easily be and indexed, using task-specific word tags and/or dropped into a virtual "book." All of this is stored in a virtual bookshelf that can be accessed at any time by designated users.

All references referred to herein are incorporated herein by reference. While the apparatus, systems and methods of this invention have been described in terms of preferred or illustrative embodiments, it will be apparent to those of skill in the art that variations may be applied to the process and system described herein without departing from the concept and scope of the invention. All such similar substitutes and modifications apparent to those skilled in the art are deemed to be within the scope and concept of the invention. Those skilled in the art will recognize that the method and apparatus of the present invention has many applications, and that the present invention is not limited to the representative examples disclosed herein. Moreover, the scope of the present invention covers conventionally known variations and modifications to the system components described herein, as would be known by those skilled in the art.

I claim:

1. A multimedia method of capturing, storing, retrieving and disseminating personal and/or group legacy and history information comprising the steps of:
   a. providing a secure technology-based platform for access by authorized users over a network;
   b. providing a mobile and web-based or mobile-app-based graphical user interface, whereby an individual and/or group user(s), via multiple media (video, audio, photographic, text or combinations thereof), can record, store, retrieve and/or disseminate content in an ad hoc or prompted manner via a mobile and web-based or mobile-app-based multimedia computer device;
   c. providing server or cloud-based storage to store such content;
   d. providing multiple options to such user(s) for retrieving such content, including, email, direct download, DVD, e-book reader, or mailed storage media;
   e. providing audio/video-to-text transcription of such recorded content; and
   f. providing the user with the option to authorize dissemination of such content to authorized designees via email, direct download, DVD, e-book reader, mailed storage media and/or social media platforms;
   wherein said graphical user interface further comprises
      a log-in process module for accessing a secure computer technology-based software platform for use by one or more authorized users over a computer network using one or more of the multimedia computer devices, the one or more computer devices capable of recording content in audio, video, photographic, and/or text format and/or combinations thereof;
      an auto question prompt module for prompting the user with a series of questions, one or more visual content images, audio files, music files, and/or one or more visual content videos stored within the system pertaining to topics of interest to prompt the user to provide answers to such questions to form part of the content;
      a tell a story process module for creating a recorded audio visual story capable of being played back by the one or more users by permitting the one or more users to access previously existing multimedia content available to the one or more computer devices, to review the new or previously existing content from the one or more computer devices from within the platform, to edit the new or previously existing content from the one or more computer devices from within the platform, and/or to delete the new or previously existing content from the one or more computer devices; wherein the step of editing the preexisting one or more visual content images and/or one or more visual content videos comprises selecting the desired visual content for display within the audio visual story, recording any desired audio content to accompany any of such selected visual content, such audio content being tied to such respective visual content so that such audio content becomes audible when such selected visual content is displayed during the playback of the recorded story;
      a save a story process module for permitting the one or more users to store the recorded content on the one or more computer devices, a platform server or a platform cloud-based storage system; and
      a share a story process module for permitting the one or more users to share the recorded content with others.

2. The method of claim 1 wherein the user content comprises information, data, metadata, and historical content associated with such user.

3. The method of claim 2 wherein the user is prompted by the platform to provide content.

4. The method of claim 3 wherein the platform prompts the user with a series of questions, images, audio files, music files, narratives or videos pertaining to topics of interest to prompt the user to provide answers to such questions to form part of the content.

5. The method of claim 2 further comprising the step of providing an artificial intelligence engine to analyze the specific user content.

6. The method of claim 5 wherein the artificial intelligence engine analyzes specific user content, data and metadata, to design prompts to the user, the method further comprising the step of prompting the user with such designed prompts.

7. A multimedia system for capturing, storing, retrieving and disseminating personal and/or group legacy and history information comprising:
   a. a secure technology-based platform for access by authorized users;
   b. a mobile and web-based or mobile-app-based graphical user interface, whereby an individual and/or group user(s), via multiple media (video, audio, photographic, text or combinations thereof), can record, store, retrieve and/or disseminate content in an ad hoc or prompted manner via a mobile and web-based or mobile-app-based multimedia computer device;
   c. server or cloud-based storage to store such content;
   d. interfaces to provide multiple options to such user(s) for retrieving such content, including, email, direct download, DVD, e-book reader, or mailed storage media;
   e. audio/video-to-text transcription engine for converting audio in such recorded content to text;
   f. sharing protocol to provide the user with the option to authorize dissemination of such content to authorized designees via email, direct download, DVD, e-book reader, mailed storage media and/or social media platforms; and
   g. an artificial intelligence engine for analyzing the specific user content;
   wherein said graphical user interface further comprises
      a log-in process module for accessing a secure computer technology-based software platform for use by one or more authorized users over a computer network using one or more of the multimedia computer devices, the one or more computer devices capable of recording content in audio, video, photographic, and/or text format and/or combinations thereof;
      an auto question prompt module for prompting the user with a series of questions, one or more visual content images, audio files, music files, and/or one or more visual content videos stored within the system pertaining to topics of interest to prompt the user to provide answers to such questions to form part of the content;
      a tell a story process module for creating a recorded audio visual story capable of being played back by the one or more users by permitting the one or more users to access previously existing multimedia content available to the one or more computer devices, to review the new or previously existing content from the one or more computer devices from within the platform, to edit the new or previously existing content from the one or more computer devices from within the platform, and/or to delete the new or previously existing content from the one or more computer devices; wherein the step of editing the preexisting one or more visual content images and/or one or more visual content videos comprises selecting the desired visual content for display within the audio visual story, recording any desired audio content to accompany any of such selected visual content, such audio content being tied to such respective visual content so that such audio content becomes audible when such selected visual content is displayed during the playback of the recorded story;

a save a story process module for permitting the one or more users to store the recorded content on the one or more computer devices, a platform server or a platform cloud-based storage system; and a share a story process module for permitting the one or more users to share the recorded content with others.

8. A computer implemented multimedia method of capturing, storing, retrieving and disseminating personal and/or group legacy and history information comprising the steps of:

a. providing a secure computer technology-based software platform for access by one or more authorized users over a computer network using one or more multimedia computer devices, the one or more computer devices capable of recording content in audio, video, photographic, and/or text format and/or combinations thereof;

b. providing a graphical user interface for use by the one or more users with the one or more multimedia computer devices for interfacing with the platform over the network;

c. interfacing the one or more computer devices with the platform;

d. providing the ability within the platform for the one or more users to record new multimedia content from the one or more computer devices;

e. providing the ability within the platform for the one or more users to access previously existing multimedia content available to the one or more computer devices;

f. providing the ability for the one or more users to review or play back the new or previously existing content from the one or more computer devices from within the platform;

g. providing the ability for the one or more users to edit the new or previously existing content from the one or more computer devices from within the platform;

h. providing the ability for the one or more users to delete the new or previously existing content from the one or more computer devices;

i. providing a platform server or platform cloud-based storage system for use by the one or more users for storing the recorded content within the platform;

j. storing the recorded content onto the platform server or platform cloud-based storage; and k. providing the one or more users with the ability to retrieve the stored content from the platform server or platform cloud-based storage;

wherein said graphical user interface further comprises a log-in process module for accessing a secure computer technology-based software platform for use by one or more authorized users over a computer network using one or more multimedia computer devices, the one or more computer devices capable of recording content in audio, video, photographic, and/or text format and/or combinations thereof;

an auto question prompt module for prompting the user with a series of questions, one or more visual content images, audio files, music files, and/or one or more visual content videos stored within the system pertaining to topics of interest to prompt the user to provide answers to such questions to form part of the content;

a tell a story process module for creating a recorded audio visual story capable of being played back by the one or more users by permitting the one or more users to access previously existing multimedia content available to the one or more computer devices, to review the new or previously existing content from the one or more computer devices from within the platform, to edit the new or previously existing content from the one or more computer devices from within the platform, and/or to delete the new or previously existing content from the one or more computer devices; wherein the step of editing the preexisting one or more visual content images and/or one or more visual content videos comprises selecting the desired visual content for display within the audio visual story, recording any desired audio content to accompany any of such selected visual content, such audio content being tied to such respective visual content so that such audio content becomes audible when such selected visual content is displayed during the playback of the recorded story;

a save a story process module for permitting the one or more users to store the recorded content on the one or more computer devices, a platform server or a platform cloud-based storage system; and a share a story process module for permitting the one or more users to share the recorded content with others.

9. The method of claim 8 wherein the platform prompts the user with a series of questions, images, audio files, music files, and/or videos stored within the system pertaining to topics of interest to prompt the user to provide answers to such questions to form part of the content.

10. The method of claim 9 wherein the prompt is generated automatically by the system.

11. The method of claim 9 wherein the system provides the user with the ability to request the prompt.

12. The method of claim 9 wherein the questions, images, audio files, music files and/or videos are randomly selected by the platform.

13. The method of claim 9 wherein the questions, images, audio files, music files and/or videos are submitted by other platform users.

14. The method of claim 9 further comprising the step of providing an artificial intelligence engine to analyze the specific user content, wherein the artificial intelligence engine analyzes specific user content, user data and user metadata, to design prompts to the user, the method further comprising the step of prompting the user with such designed prompts.

15. The method of claim 8 wherein the users retrieve the stored content from the platform storage via direct interface with the platform, by email, by direct download, by DVD, by e-book reader, or by mailed storage media.

16. The method of claim 8 further comprising the step of providing the user with the ability to authorize dissemination of the stored recorded content to authorized designees via email, direct download, DVD, e-book reader, mailed storage media and/or social media platforms.

17. The method of claim 8 further comprising the step of providing audio/video-to-text transcription of such recorded content.

18. The method of claim 8 further comprising the step of further providing an e-book creation system; and an e-book creation system interface to permit the one or more users to import recorded content from the platform into the e-book creation system for use in creating an e-book.

19. The method of claim 18 comprising the further steps of: sharing the e-book creation system with other permitted users; permitting the other permitted users to collaborate in creating a jointly created e-book using recorded content from within the platform or recorded content that the other permitted users import into the platform; editing the jointly created e-book as desired; saving the jointly created e-book; and sharing the jointly created e-book.

20. The method of claim 8 wherein the multimedia computer devices are selected from the group consisting of smartphones, tablets, personal computers, and laptops.

21. The method of claim 8 wherein the graphical user interface is mobile-based and web-based or mobile-app-based.

22. A computer implemented multimedia system for capturing, storing, retrieving and disseminating personal and/or group legacy and history information comprising:
 a. a processor and memory;
 b. a secure computer technology-based software platform embodied on one or more computer-readable medium for access by authorized users using one or more multimedia computer devices, the one or more computer devices capable of recording content in audio, video, photographic, and/or text format and/or combinations thereof;
 c. a graphical user interface embodied on one or more computer-readable medium for use by the one or more users with the one or more multimedia computer devices for interfacing with the platform over the network;
 d. an interface embodied on the one or more computer-readable medium for the one or more users to record new multimedia content from the one or more computer devices;
 e. an interface embodied on the one or more computer-readable medium for the one or more users to access previously existing multimedia content available to the one or more computer devices;
 f. an interface embodied on the one or more computer-readable medium for the one or more users to review the new or previously existing content from the one or more computer devices from within the platform;
 g. an interface embodied on the one or more computer-readable medium for the one or more users to edit the new or previously existing content from the one or more computer devices from within the platform;
 h. an interface embodied on the one or more computer-readable medium for the one or more users to delete the new or previously existing content from the one or more computer devices;
 i. a platform server or platform cloud-based storage system embodied on one or more computer-readable medium for use by the one or more users for storing the recorded content within the platform; and
 j. an interface embodied on the one or more computer-readable medium providing the one or more users with the ability to retrieve the stored content from the platform server or platform cloud-based storage;

wherein said graphical user interface further comprises
 a log-in process module for accessing a secure computer technology-based software platform for use by one or more authorized users over a computer network using one or more multimedia computer devices, the one or more computer devices capable of recording content in audio, video, photographic, and/or text format and/or combinations thereof;
 an auto question prompt module for prompting the user with a series of questions, one or more visual content images, audio files, music files, and/or one or more visual content videos stored within the system pertaining to topics of interest to prompt the user to provide answers to such questions to form part of the content;
 a tell a story process module for creating a recorded audio visual story capable of being played back by the one or more users by permitting the one or more users to access previously existing multimedia content available to the one or more computer devices, to review the new or previously existing content from the one or more computer devices from within the platform, to edit the new or previously existing content from the one or more computer devices from within the platform, and/or to delete the new or previously existing content from the one or more computer devices; wherein the step of editing the preexisting one or more visual content images and/or one or more visual content videos comprises selecting the desired visual content for display within the audio visual story, recording any desired audio content to accompany any of such selected visual content, such audio content being tied to such respective visual content so that such audio content becomes audible when such selected visual content is displayed during the playback of the recorded story;
 a save a story process module for permitting the one or more users to store the recorded content on the one or more computer devices, a platform server or a platform cloud-based storage system; and
 a share a story process module for permitting the one or more users to share the recorded content with others.

23. The system of claim 22 further comprising an artificial intelligence engine embodied on the one or more computer-readable medium for analyzing the specific user content within the platform.

24. A computer program product embodied on one or more non-transitory computer-readable media, said computer program product adapted to be executed to implement a method of capturing, storing, retrieving and disseminating personal and/or group legacy and history information, said method comprising providing a computer-implemented system, wherein the computer implemented system comprises distinct software modules on the one or more computer-readable medium, and wherein the distinct software modules comprise:
 a. a log-in process module for accessing a secure computer technology-based software platform for use by one or more authorized users over a computer network using one or more multimedia computer devices, the one or more computer devices capable of recording content in audio, video, photographic, and/or text format and/or combinations thereof;
 b. an auto question prompt module for prompting the user with a series of questions, one or more visual content images, audio files, music files, and/or one or more visual content videos stored within the system pertaining to topics of interest to prompt the user to provide answers to such questions to form part of the content;

c. a tell a story process module for creating a recorded audio visual story capable of being played back by the one or more users by permitting the one or more users to access previously existing multimedia content available to the one or more computer devices, to review the new or previously existing content from the one or more computer devices from within the platform, to edit the new or previously existing content from the one or more computer devices from within the platform, and/or to delete the new or previously existing content from the one or more computer devices; wherein the step of editing the preexisting one or more visual content images and/or one or more visual content videos comprises selecting the desired visual content for display within the audio visual story, recording any desired audio content to accompany any of such selected visual content, such audio content being tied to such respective visual content so that such audio content becomes audible when such selected visual content is displayed during the playback of the recorded story;

d. a save a story process module for permitting the one or more users to store the recorded content on the one or more computer devices, a platform server or a platform cloud-based storage system; and e. a share a story process module for permitting the one or more users to share the recorded content with others.

25. The computer program product of claim 24 further comprising an e-book process module for permitting the one or more users to import recorded content into an e-book creation system.

26. The computer program product of claim 25 wherein the e-book process module further permits one or more users to collaborate in creating a jointly created e-book using recorded content from within the platform or recorded content that the other permitted users import into the platform; editing the jointly created e-book as desired; saving the jointly created e-book; and sharing the jointly created e-book.

27. The computer program product of claim 24 wherein the audio editing comprises voice narration or commentary, singing a song or music.

28. The computer program product of claim 24 wherein the recorded audio visual story is recorded as a slide show presentation wherein the presentation may be played on a presentation device where the presentation of slides proceeds from one slide to another slide manually or automatically.

29. The method of claim 1 wherein the audio editing comprises voice narration or commentary, singing a song or music.

30. The method of claim 1 wherein the recorded audio visual story is recorded as a slide show presentation wherein the presentation may be played on a presentation device where the presentation of slides proceeds from one slide to another slide manually or automatically.

31. The multimedia system of claim 7 wherein the audio editing comprises voice narration or commentary, singing a song or music.

32. The multimedia system of claim 7 wherein the recorded audio visual story is recorded as a slide show presentation wherein the presentation may be played on a presentation device where the presentation of slides proceeds from one slide to another slide manually or automatically.

33. The computer implemented multimedia method of claim 8 wherein the audio editing comprises voice narration or commentary, singing a song or music.

34. The computer implemented multimedia method of claim 8 wherein the recorded audio visual story is recorded as a slide show presentation wherein the presentation may be played on a presentation device where the presentation of slides proceeds from one slide to another slide manually or automatically.

35. The computer implemented multimedia system of claim 22 wherein the audio editing comprises voice narration or commentary, singing a song or music.

36. The computer implemented multimedia system of claim 22 wherein the recorded audio visual story is recorded as a slide show presentation wherein the presentation may be played on a presentation device where the presentation of slides proceeds from one slide to another slide manually or automatically.

* * * * *